United States Patent
Yamabuchi et al.

(10) Patent No.: US 7,990,495 B2
(45) Date of Patent: Aug. 2, 2011

(54) LIQUID CRYSTAL PANEL HAVING POLARIZER PLATES ON BOTH SURFACES THEREOF

(75) Inventors: Koji Yamabuchi, Nara (JP); Tomohisa Komoda, Mie (JP); Kazuya Kaida, Nara (JP); Akinori Izumi, Nara (JP); Takane Horiuchi, Yamanashi (JP); Shinya Takabe, Fujiyoshida (JP); Toshimitsu Furuya, Yamanashi (JP); Tetsuro Katayama, Fujiyoshida (JP)

(73) Assignees: Sharp Kabushiki Kaisha, Osaka (JP); Citizen Seimitsu Co., Ltd., Yamanashi (JP)

( * ) Notice: Subject to any disclaimer, the term of this patent is extended or adjusted under 35 U.S.C. 154(b) by 151 days.

(21) Appl. No.: 12/320,108

(22) Filed: Jan. 16, 2009

(65) Prior Publication Data
US 2009/0201444 A1 Aug. 13, 2009

Related U.S. Application Data

(62) Division of application No. 10/494,565, filed as application No. PCT/JP02/11540 on Nov. 5, 2002, now Pat. No. 7,553,390.

(30) Foreign Application Priority Data

| Nov. 8, 2001 | (JP) | 2001-342951 |
|---|---|---|
| Nov. 20, 2001 | (JP) | 2001-354771 |
| Jul. 25, 2002 | (JP) | 2002-216190 |
| Aug. 29, 2002 | (JP) | 2002-249984 |

(51) Int. Cl.
*G02F 1/1335* (2006.01)
*G02F 1/1345* (2006.01)

(52) U.S. Cl. ............................................ 349/96; 349/151
(58) Field of Classification Search .............. 349/96–98, 349/149–154
See application file for complete search history.

(56) References Cited

U.S. PATENT DOCUMENTS

| 3,565,309 A | 2/1971 | Gross |
|---|---|---|
| 3,693,675 A | 9/1972 | Allen et al. |
| 4,061,418 A | 12/1977 | Poensgen et al. |
| 4,300,417 A | 11/1981 | Teunissen et al. |
| 4,549,063 A | 10/1985 | Ang et al. |
| 4,680,083 A | 7/1987 | Kashiwaba et al. |
| 5,276,541 A | 1/1994 | Terada et al. |
| 5,511,671 A | 4/1996 | Zumstein et al. |
| 5,576,070 A | 11/1996 | Yaniv |

(Continued)

FOREIGN PATENT DOCUMENTS

JP 54030051 A 3/1979

(Continued)

*Primary Examiner* — Dung T. Nguyen
(74) *Attorney, Agent, or Firm* — Birch, Stewart, Kolasch & Birch, LLP

(57) ABSTRACT

A method for cutting apart a glass substrate is provided whereby scribing of the glass substrate is possible without being affected by the presence or thickness of a deposited film formed thereon and without scratching the deposited film. To treat a glass substrate having a deposited film, such as a thin film or resin film, formed on one surface thereof, there are provided a shaving device, which is a blade that removes strip-shaped portions of the deposited film to expose strip-shaped regions on the glass substrate, and a wheel cutter (14*a*) that forms scribed lines along the strip-shaped regions exposed on the glass substrate. The glass substrate is cut apart along the scribed lines.

3 Claims, 37 Drawing Sheets

U.S. PATENT DOCUMENTS

| | | | |
|---|---|---|---|
| 5,622,540 A | 4/1997 | Stevens | |
| 5,739,887 A | 4/1998 | Ueda et al. | |
| 5,934,982 A | 8/1999 | Vianello et al. | |
| 5,963,289 A | 10/1999 | Stefanov et al. | |
| 5,997,964 A | 12/1999 | Klima, Jr. | |
| 6,007,886 A | 12/1999 | Takigami et al. | |
| 6,204,906 B1 | 3/2001 | Tannas, Jr. | |
| 6,437,846 B1 | 8/2002 | Ono et al. | |
| 6,760,091 B2 * | 7/2004 | Uehara | 349/152 |
| 7,179,523 B2 | 2/2007 | Lai et al. | |
| 7,202,923 B2 * | 4/2007 | Yamabuchi et al. | 349/96 |
| 2001/0009474 A1 | 7/2001 | Umemoto et al. | |
| 2001/0030728 A1 | 10/2001 | Takasugi et al. | |
| 2002/0153355 A1 | 10/2002 | Kazama et al. | |

FOREIGN PATENT DOCUMENTS

| | | |
|---|---|---|
| JP | 62066227 A | 3/1987 |
| JP | 62075420 A | 8/1988 |
| JP | 63189840 A | 8/1988 |
| JP | 6-342139 A | 12/1994 |
| JP | 9-118546 A | 5/1997 |
| JP | 9-255350 A | 9/1997 |
| JP | 11-064834 A | 3/1999 |
| JP | 11-116260 A | 4/1999 |
| JP | 2001-83492 A | 3/2001 |
| JP | 2001-133760 A | 5/2001 |
| JP | 2001-281689 A | 10/2001 |
| JP | 2001-305502 A | 10/2001 |
| JP | 2001-337336 A | 12/2001 |
| JP | 2002-182185 A | 6/2002 |
| KP | 10/0203672 | 6/1999 |
| KP | 1998-066523 | 10/1999 |
| KP | 2000-40563 A | 7/2000 |
| KP | 2000-0077441 | 12/2000 |
| WO | WO 94/22044 A1 | 9/1994 |
| WO | WO-02/062715 A1 | 8/2002 |

* cited by examiner (a)　　　　　　　　(b)

(a)

(b)

FIG.16
(a)
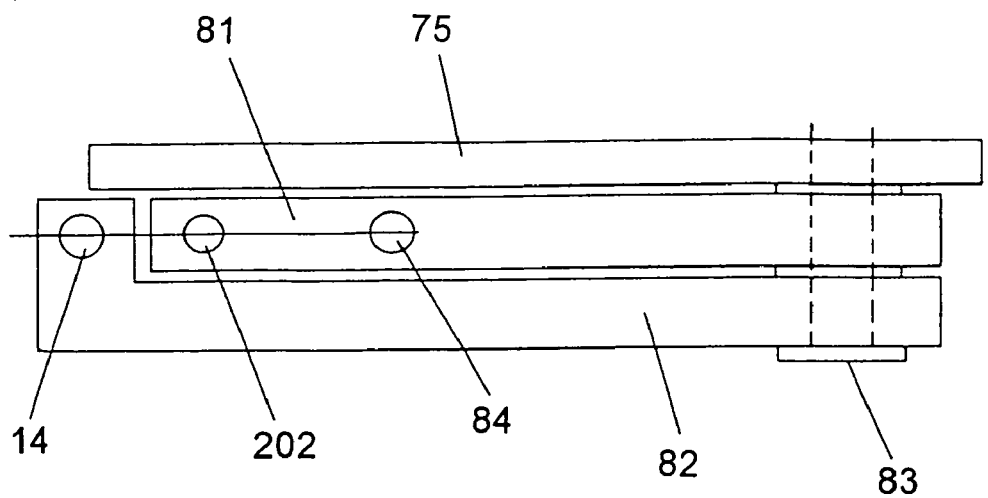
(b)
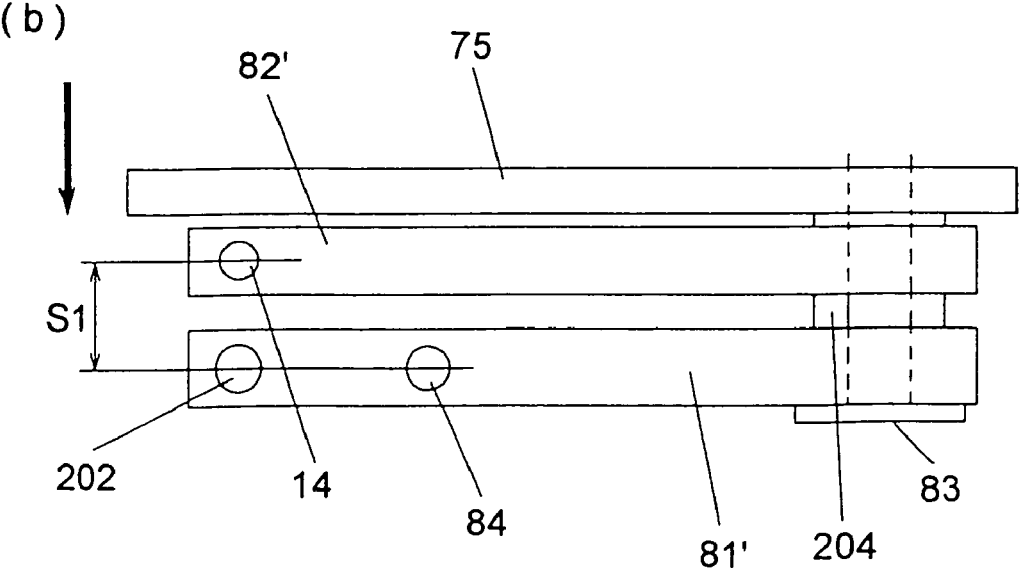

FIG.26

| INCLINATION ANGLE α [°] (BLADE ANGLE) | 90 | ~ | 135 | ~ |
|---|---|---|---|---|
| PROTRUSION STRENGTH | GOOD | GOOD | FAIR | FAIR |
| DELTA-SHAPED CHIPPING | POOR | GOOD | GOOD | GOOD |
| PROTECTIVE FILM EXFOLIATION | POOR | GOOD | GOOD | FAIR |
| ADHESIVE RESIDUES | POOR | GOOD | FAIR | POOR |

(a)    (b)

FIG.32
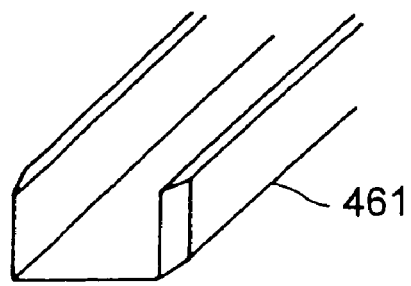
(a)
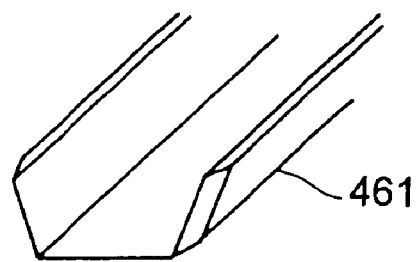
(b)
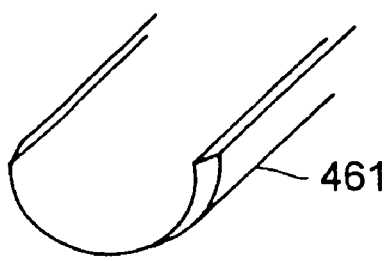
(c)
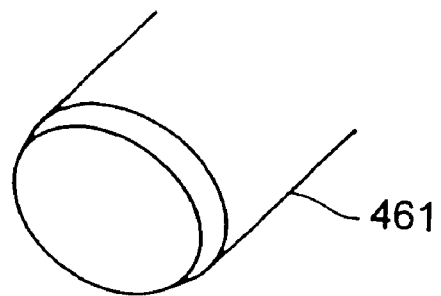
(d)

(a)　　　(b)

US 7,990,495 B2

LIQUID CRYSTAL PANEL HAVING POLARIZER PLATES ON BOTH SURFACES THEREOF

This application is a Divisional of application Ser. No. 10/494,565, filed on Oct. 27, 2004, now U.S. Pat. No. 7,553,390 and claims priority thereto and to PCT International Application No. PCT/JP02/11540 filed Nov. 5, 2002 under 35 U.S.C. §120. This Application also claims priority under 35 U.S.C. §119 on Japanese Application Nos. JP 2001-342951, JP 2001-354771, JP 2002-216190 and JP 2002-249984, each filed on Nov. 8, 2001, Nov. 20, 2001, Jul. 25, 2002 and Aug. 29, 2002, respectively. The entire contents of which are hereby incorporated by reference in their entirety.

TECHNICAL FIELD

The present invention relates to a method and an apparatus for cutting apart a glass substrate, as used as a glass substrate of a liquid crystal display element or the like, that has a deposited-film layer, such as a thin film or film layer, formed on at least one surface thereof. The present invention relates also to a liquid crystal panel composed of a pair of substrate cells bonded together with liquid crystal sealed in between and with polarizer plates bonded to the outer surfaces of the substrate cells, and to an apparatus for fabricating a plurality of such liquid crystal panels by cutting apart a glass substrate that has a plurality of pairs, arranged adjacent to one another, of glass substrate cells bonded together with liquid crystal sealed in between and that has polarizer plates bonded to both surfaces thereof.

BACKGROUND ART

Conventionally, a glass substrate is generally cut apart by so-called scribing, specifically by first securing the glass substrate on a workpiece stage of a cutting machine by vacuum chucking or the like, then forming a linear scratch called a scribed line, which actually is a kind of crack (hereinafter referred to as a crack also), on one surface of the glass substrate by the use of a wheel-shaped cutter having the outermost edge thereof formed of a superhard material, such as superhard alloy or diamond, and then pressing the glass substrate from behind the opposite surface thereof along the scribed line by the use of a pressing means, such as a press or roller, so that the crack that has been formed in the scribed line on the glass substrate in the direction perpendicular to the substrate surface develops until eventually the glass substrate breaks apart.

Today, liquid crystal display elements and other display devices similar thereto are fabricated, with a view to fabricating them at low costs, by cutting apart a large-format glass substrate material, having thin films, such as a transparent electrode like an ITO film, an insulating film, an orientation film, and the like formed on the surface thereof beforehand, into a shape having desired dimensions. When such a glass substrate having deposited-film layers (hereinafter referred to as deposited films also) formed thereon is cut apart, various problems arise that were unimaginable in the scribing of a conventional glass substrate. For example, scribing the film-deposited surface results in destroying the deposited films around the scribed lines. This makes the deposited films scatter in the form of fine particles, and may lead to unacceptable product quality. Even scribing the opposite, non-film-deposited surface results in the deposited films being scratched or deformed as a result of the film-deposited surface making contact with the stage of the cutting machine.

A solution to these inconveniences is proposed in Japanese Patent Application Laid-Open No. H11-64834, which discloses a conventional method for scribing a large-format glass substrate having deposited films formed thereon into strip-shaped sections having desired dimensions. This method attempts to overcome the above inconveniences by scribing the glass surface opposite to the film-deposited surface.

Now, with reference to FIG. 52, the method disclosed in Japanese Patent Application Laid-Open No. H11-64834 will be described, mainly by quoting from its specification. A glass substrate 101 has a deposited film 102 formed on one surface thereof. The glass substrate 101 is secured, with the deposited film 102 up, on the top surface of a surface plate 103 serving as a workpiece stage by an unillustrated chucking means, such as vacuum. In the surface plate 103, rectilinear openings 104 are formed at predetermined intervals so as to permit a scribing means 105 serving as a crack-forming means for forming a scribed line, i.e., a crack, to move along the openings 104 while scribing the bottom surface of the glass substrate 101. A pushing means 106 and a positioning means 107, each realized with an air cylinder or the like, work together to move the glass substrate 101 into one predetermined position after another. The pushing means 106 has a pushing pin 110 provided at the tip thereof, and the positioning means 107 has a positioning pin 111 provided at the tip thereof. A pressing means 109 presses the glass substrate 101, from above the film-deposited surface thereof, against the top surface of the surface plate 103 so as to hold the glass substrate 101 in position.

Next, how the method works will be described. When the surface plate 103 is located in position "a" indicated with dotted lines, the glass substrate 101 is placed thereon by a unillustrated transporting machine, and then the positioning pin 111 at the tip of the positioning means 107 swoops down on the surface of the surface plate 103 in response to a positioning signal from a unillustrated controlling means. Next, the pushing pin 110 at the tip of the pushing means 106 extends so as to move the glass substrate 101 on the surface plate 103 in the direction indicated by a horizontal arrow in the figure until the glass substrate 101 makes contact with the positioning pin 111. In this way, the places at which to cut apart the glass substrate 101 are aligned with the openings 104. Next, the controlling means gives instructions to chuck the glass substrate 101 onto the surface plate 103, then move the pressing means 109 to the place where scribing is going to be performed and press it against the top surface of the glass substrate 101, and then make the scribing means 105 scribe the bottom surface of the glass substrate 101. The scribing means 105 repeats scribing while traveling from one opening to another by being fed at the intervals at which to form scribed lines. Thus, according to this method, the glass substrate 101 is scribed from below the bottom surface thereof through the openings 104 formed in the surface plate 103. Here, the force with which the glass substrate 101 is chucked onto the surface plate 103 by the chucking means is not sufficient to counter the scribing load exerted by the scribing means 105, and this insufficiency needs to be compensated for by pressing the glass substrate 101 from above the film-deposited surface thereof with the pressing means 109.

The conventional method and apparatus for scribing (cutting-apart) described above are intended mainly for the cutting-apart of a glass substrate having a protective film formed on a large-format glass material. With a glass substrate having a thin film, such as an ITO film, formed thereon, however, the use of a common pressing means, such as the weight-shaped one 109 shown in FIG. 52, for countering the scribing load from below results in the thin film being destroyed by the load of the pressing means itself.

For further cost reduction of liquid crystal display elements, attempts have been made to cut apart a large-format glass material after forming films, such as a polarizer plate and a protective sheet, thereon instead of bonding those films after the cutting-apart of the glass substrate as conventionally practiced. It has been customary to bond polarizer plates to the outer surfaces of an upper and a lower glass substrate in the last step of the process of fabricating a liquid crystal cell. This, involving positioning of the films relative to the glass substrates and requiring an extra step, hampers cost reduction The thickness of a deposited film varies according to its type; while a thin film, such as an ITO film, is a few μm thick or thinner, a film layer, such as a polarizer plate, is 10 μm to 0.6 mm thick. With a glass substrate having such a film layer formed thereon, it is impossible to directly scribe the film-deposited surface thereof. With the conventional method and apparatus for scribing described above, the presence of the film layer makes it impossible to cut apart the substrate after scribing.

On the other hand, in the case of medium- to small-size liquid crystal panels, in particular those with screen sizes up to about 5 inches, it has been customary to fabricate them by first cutting apart large-format glass substrates already bonded together roughly into strip-shaped glass substrates, then processing them in predetermined manners, as by putting and sealing liquid crystal in between, then further cutting them apart finely into a predetermined panel size to produce a plurality of individual cells, and then bonding polarizer plates to the individual cells to produce a plurality of liquid crystal panels.

Now, with reference to FIG. 53, the liquid crystal panel fabricated by this conventional method will be described. In FIG. 53, there are shown perspective external views of the conventional liquid crystal panel, with the figure at (a) showing the top side thereof and the figure at (b) showing the bottom side thereof. This liquid crystal panel 550 is composed of a pair of substrate cells 551a and 551b bonded together and having liquid crystal sealed in between. One end of one 551a of the substrate cells protrudes from one end of the other 551b, and, on the inner surface of the protruding portion 551aa are formed connection terminals 553 by way of which the liquid crystal panel is driven. Moreover, on the outer surfaces of the substrate cells 551a and 551b, polarizer plates 552a and 552b are respectively bonded so as to cover the display region (not shown). When the liquid crystal panel is designed for use in a so-called backlit liquid crystal display device that achieves display by transmitting light from a light source, the polarizer plates 552a and 552b have roughly equal sizes and are so arranged as to face each other with the liquid crystal cells 551a and 551b sandwiched in between.

The conventional method described above involves bonding polarizer plates one by one to individual cells, resulting in extremely poor fabrication efficiency. Even when a dedicated machine is used for that purpose, the influence of static electricity imposes a limit on the rate at which polarizer plates can be bonded (typically, 8 to 10 seconds required per polarizer plate). Thus, to cope with demands for high yields (fabrication of as many liquid crystal panels as possible) on the market, a large number of polarizer plates need to be treated concurrently on a large number of machines. This greatly increases plant-and-equipment spending, and thus increases the costs of liquid crystal panels as end products.

A way to avoid this is proposed, for example, in Japanese Patent Application Laid-Open No. H6-342139, which discloses a method for fabricating a liquid crystal panel whereby first a polarizer plate having cut lines, marking where to cut apart, formed at predetermined places thereon is bonded to a plastic substrate, and then the plastic substrate is cut apart along the cut lines to produce a plurality of liquid crystal panels. According to this method, the polarizer plate is bonded to the substrate before the substrate is cut apart. This helps greatly scale down the step itself of bonding the polarizer plate. Thus, it is possible to improve fabrication efficiency without unduly increasing plant-and-equipment spending.

This method, however, has the following disadvantages. First, a polarizer plate itself is formed of polyvinyl alcohol sandwiched between layers of cellulose triacetate or coated with an acrylic resin, and is formed as a thin film about 0.2 to 0.6 mm thick. Therefore, when cut lines are formed in this polarizer plate, unexpected application of a load thereto may deform the portion thereof around the cut lines, eventually leading to warping or breakage of the polarizer plate. In particular, when bonded to a substrate, the polarizer plate needs to be bonded thereto so that the cut lines are located at predetermined places on the substrate. This necessitates the use of a high-precision machine, which is disadvantageous to cost reduction of liquid crystal panels.

Second, when the substrate is cut apart, the polarizer plate is also cut apart (even where a cut line is formed, the portions of the polarizer plate across it are separated from each other). In particular when a glass substrate, which is brittle, is used as the substrate, the substrate and the polarizer plate have quite different properties, and therefore, unless special care is taken, the glass substrate may break at inappropriate places, or the polarizer plate may exfoliate unexpectedly. That is, it is extremely difficult to cut them apart without degradation in quality. Thus, this method leaves room for improvement. Incidentally, Japanese Patent Application Laid-Open No. H6-342139 presupposes the use of a plastic substrate, of which the material is similar to the material of the polarizer, as the substrate, and therefore, quite naturally, it gives no special consideration to the method for cutting them.

On the other hand, in the conventional liquid crystal panel shown in FIG. 53, the individual substrate cells 551a and 551b are thin (when formed of glass, about 0.4 to 0.7 mm), and therefore the protruding portion 551aa, in particular, is mechanically weak. Thus, when the liquid crystal panel is transported from one place to another or assembled into a liquid crystal display device, if it is hit or dropped, the protruding portion 551aa may be cracked or deformed, or broken at a corner. Accordingly, extremely cautions handling is required.

Moreover, in recent years, a polarizer plate itself has come to be given multiple functions, and is formed of a plurality of sheets having various optical properties laid on one another. As a result, at the edges of a polarizer plate bonded to a substrate cell, there are often observed burrs and the like. This makes it difficult to assemble a liquid crystal panel into a liquid crystal display device, or causes the polarizer plate to exfoliate from the substrate cell unexpectedly. Furthermore, in a case where a removable protective film is laid on the outer surface of a polarizer plate so as to be integral therewith, when the liquid crystal panel is transported from one place to another or assembled into a liquid crystal display device, the film may exfoliate from the polarizer plate unexpectedly and scratch the polarizer plate itself.

DISCLOSURE OF THE INVENTION

It is a feature of the present invention to provide a method and an apparatus for cutting apart a glass substrate having a deposited-film formed thereon whereby the glass substrate can be cut apart without being affected by the presence or the thickness of the deposited film with respect to the scribing of the glass substrate. As used herein, the phrase "cutting apart" describes a process of scoring glass and then breaking or separating the glass substantially along the score line.

It is another feature the present invention to provide a liquid crystal panel free from local weakening of mechanical strength and free from unexpected exfoliation of a polarizer plate. Simultaneously, it is also a feature of the present invention to provide an apparatus for fabricating a plurality of liquid crystal panels by cutting apart a glass substrate having a polarizer plate bonded thereto wherewith liquid crystal panels as described above can be fabricated without degradation in quality and with improved fabrication efficiency.

To achieve the above features, according to embodiments of the present invention, in a method of cutting apart a glass substrate having a deposited film formed thereon, there are provided glass substrate exposing means for removing strip-shaped portions of the deposited film so as to expose strip-shaped regions on the substrate, and crack forming means for forming cracks so as to permit the glass substrate to be cut apart along the strip-shaped regions exposed thereon by the glass substrate exposing means. Here, the glass substrate is cut apart along the cracks. Moreover, according to embodiments of the present invention, in an apparatus for cutting apart a glass substrate, including a workpiece stage on which a glass substrate having a deposited film formed thereon is placed, securing means for securing the glass substrate in a predetermined position on the workpiece stage, crack forming means for forming cracks on the glass substrate so as to permit the glass substrate to be cut apart along the cracks, and actuating means for moving the crack forming means to a predetermined position, wherein the apparatus cuts apart the glass substrate into a plurality of blocks along the cracks, there is provided a glass substrate exposing means for removing strip-shaped portions of the deposited film so as to expose strip-shaped regions on the glass substrate. Here, the cracks are so formed that the glass substrate is cut apart along the strip-shaped regions exposed thereon by the glass substrate exposing means.

By this method and with this apparatus, it is possible to remove portions of the deposited film sufficient to form cracks and then form cracks along strip-shaped regions exposed on the glass substrate to permit the glass substrate to be cut apart along the cracks. This makes it possible to cut apart a glass substrate having any type of deposited film formed thereon, from a thin film such as an overcoating film or transparent electrode to a film such as a polarizer plate or a deposited film up to 1 to 2 mm thick such as a resin film or protective film, without being affected by the presence of the deposited film.

Moreover, to achieve the above features, according to embodiments of the present invention, a liquid crystal panel is composed of a pair of substrate cells bonded together with liquid crystal sealed in between and with polarizer plates bonded to outer surfaces of the substrate cells. In addition, one end of one of the substrate cells protrudes from one end of the other of the substrate cells so as to form a protruding portion, connection terminals by way of which the liquid crystal panel is driven is formed on the inner surface of the protruding portion, and the polarizing plate so extends as to cover the outer surface of the protruding portion. Thus, the protruding portions is reinforced by the polarizer plate. This enhances mechanical strength.

Moreover, according to the present invention, a liquid crystal panel is composed of a pair of substrate cells bonded together with liquid crystal sealed in between and with polarizer plates bonded to outer surfaces of the substrate cells. In addition, the edges of the polarizer plates are so formed as to have a vertical section that becomes thinner and thinner toward the substrate cells. This prevents the edges of the polarizer plates from being caught accidentally, and thus helps prevent exfoliation thereof.

Moreover, to achieve the above features, according to the embodiments of the present invention, in an apparatus for fabricating a liquid crystal panel, more specifically one for fabricating a plurality of the liquid crystal panel described above by cutting apart a glass substrate that has a plurality of pairs, arranged adjacent to one another, of glass substrate cells bonded together with liquid crystal sealed in between and that has polarizer plates bonded to both surfaces thereof, there are provided glass substrate exposing means for removing strip-shaped portions of the polarizer plates so as to expose strip-shaped regions on the glass substrate, and crack forming means for forming cracks so as to permit the glass substrate to be cut apart along the strip-shaped region exposed thereon by the glass substrate exposing means. Here, the glass substrate is cut apart along the cracks. Thus, first, portions of the polarizer plates are removed along the boundaries between the substrate cells, then cracks for cutting-apart are formed along the strip-shaped regions exposed on the glass substrate as a result, and then the glass substrate is cut apart along the cracks. In this way, individual substrate cells are produced that each form a liquid crystal panel. That is, it is possible to cut apart the glass substrate without degradation in quality. Moreover, there is no need to use special equipment to bond the polarizer plates on the glass substrate. This enhances fabrication efficiency.

BRIEF DESCRIPTION OF DRAWINGS

FIG. 16 is a plan view of the cutting apparatuses of the ninth and a tenth embodiment of the invention as seen from above;

FIG. 26 is a diagram schematically showing how the properties of the liquid crystal panel of the fifteenth embodiment vary as the edge angle of the polarizer plate varies;

FIG. 32 is an external perspective view showing examples of the blade shape used in the liquid crystal panel fabricating apparatus of the third embodiment;

BEST MODE FOR CARRYING OUT THE INVENTION

Figure 1:
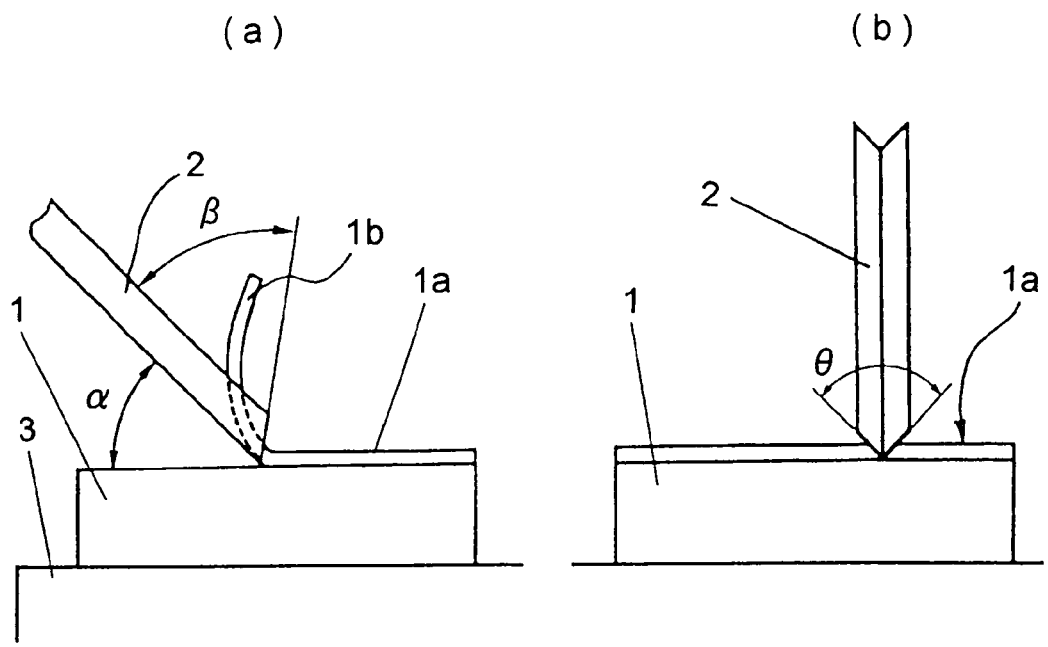
FIG. 1 is a diagram schematically showing how a deposited film is removed in the glass substrate cutting method of a first embodiment of the invention, with a side view shown at (*a*) and a front view shown at (*b*).

Hereinafter, methods and apparatuses for cutting apart a glass substrate, liquid crystal panels, and method for fabricating a liquid crystal panel, all embodying the present invention, will be described one by one in detail with reference to the drawings. In the drawings referred to in the descriptions of the individual embodiments, such components as have the same functions among different embodiments are identified with the same reference numerals as far as possible, and overlapping explanations will not be repeated.

Figure 2:
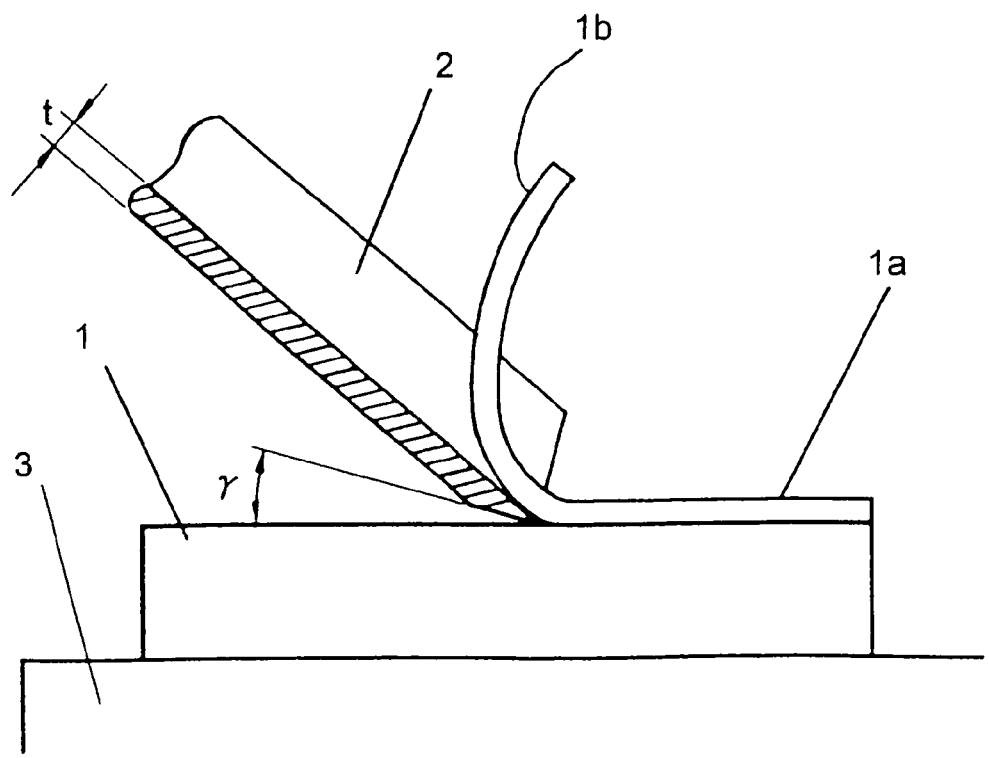
FIG. 2 is an enlarged view of FIG. 1(*a*).
Figure 3:
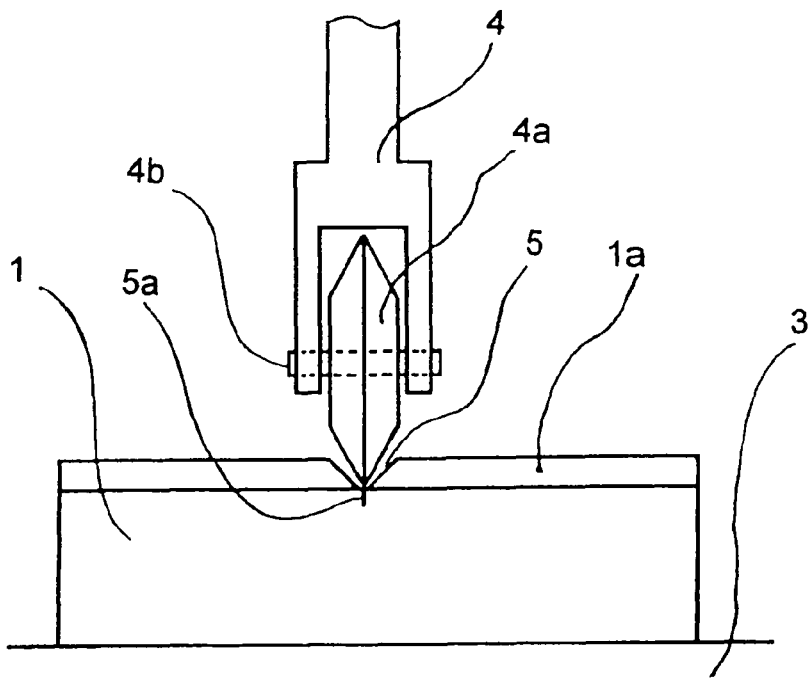
FIG. 3 is a front view schematically showing how a crack (scribed line) is formed in the first embodiment.

First, the glass substrate cutting method of a first embodiment of the invention will be described. FIGS. 1 to 3 show the glass substrate cutting method of the first embodiment. FIG. 1(a) is a side view schematically showing how a deposited film formed on a glass substrate is removed, and FIG. 1(b) is a front view of FIG. 1(a) as seen from the left thereof. FIG. 2 illustrates in more detail the operation shown in FIG. 1, and FIG. 3 shows how a scribed line (crack) is formed on the glass substrate. Here, a deposited film may be any type of film, from a thin film such as a overcoating film or electrode film to a thicker film such as a polarizer plate, or a resin film or protective film.

In FIG. 1, reference numeral 1 represents a glass substrate having a deposited film 1a formed thereon, reference numeral 2 represents a shaving cutter, like a wood chisel, serving as a glass substrate exposing means for cutting, shaving off, and thereby removing strip-shaped portions of the deposited film 1a so as to expose the glass substrate 1, and reference numeral 3 represents a workpiece stage on which the glass substrate is placed and secured. As shown in FIG. 1(b), the shaving cutter 2 has a cross section that is substantially V-shaped with an opening angle θ. As the shaving cutter 2 is moved from left to right as seen in FIG. 1(a) parallel to the top surface of the glass substrate 1, with the cutting edge at the tip of the shaving cutter 2 pressed against the glass substrate 1 so as to make contact with the bottom surface of the deposited film 1a, i.e. the glass surface of the glass substrate 1, the deposited film 1a is cut, shaved, and thereby removed in the form of a waste strip 1b as shown in FIG. 1(a) that comes off along the substantially V-shaped groove of the cutting edge. The force with which the shaving cutter 2 is pressed against the glass substrate is adjusted according to the thickness and material of the deposited film 1a. Typically, the pressure is not higher than 1 N (newton) for a deposited film, such as a resin film, of up to a few tens of μm thick, but is equal to a few tens of N for a film of about 0.5 mm thick.

In FIG. 1(a), the optimum angle α between the shaving cutter 2 and the surface of the glass substrate 1 is adjusted according to the thickness and material of the deposited film 1a, and the shaving of the deposited film is performed with the optimum angle. The angle β between the shaving cutter 2 and its cutting edge is usually about 90°. Where the deposited film 1a is a thin film a few tens of μm thick, or a quite thick film layer, or in other situations, however, the angle β is adjusted according to the thickness and material of the deposited film so that the shaving thereof is performed with optimum results.

FIG. 2 shows in more detail how the cutting and shaving of the deposited film 1a is achieved by the shaving cutter 2 shown in FIG. 1(a). In its simplest form, the shaving cutter 2 is formed as a blade, like a V-shaped wood chisel by bending a plate-shaped material with a thickness t into a substantially V-like shape with an opening angle θ as shown in FIG. 1(b) and then forming a clearance angle γ all along the cutting edge as shown in FIG. 2.

FIG. 3 shows how a scribed line (crack) 5a is formed, in the shaved groove 5 formed by the shaving cutter 2, by making a wheel-shaped scribing cutter 4 serving as a crack forming means roll along the shaved groove while pressing it downward. The scribing means 4 serving as the crack forming means has a cutter wheel 4a, of which the edge is formed of diamond, superhard alloy, or the like, rotatably pivoted on a support shaft 4b. The edge angle of the wheel cutter 4a is varied in the range of from about 60° to 140° according to the thickness and material of the glass substrate. Accordingly, the opening angle θ of the shaving cutter 2 shown in FIG. 1(b) is determined in such a way as to permit the shaved groove 5 to be so shaped and sized that the cutter wheel 4a, when forming the scribed line 5a on the surface of the glass substrate 1, does not interfere with the deposited film 1a or otherwise affect adversely.

Figure 4:
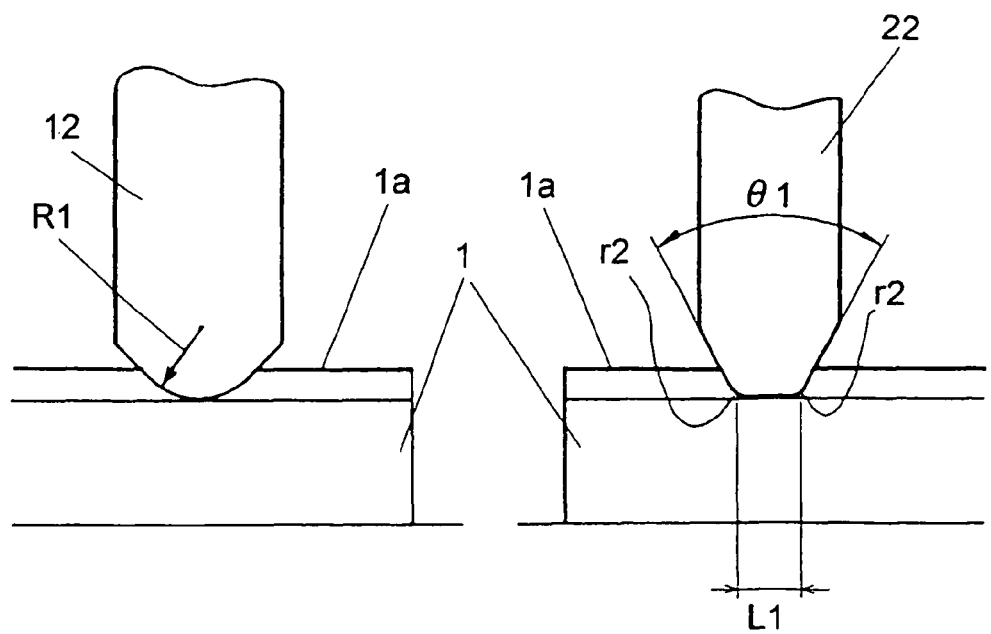
FIG. 4 is a front view schematically illustrating how a deposited film is removed in the cutting methods of a second and a third embodiment of the invention.

FIG. 4(a) is a diagram showing the cutting method of a second embodiment of the invention. As compared with FIG. 1, which illustrates the first embodiment, the shaving cutter 12 here has a different cross-sectional shape. The second embodiment shown in FIG. 4(a) differs from the first embodiment in that the cutting edge at the tip of the shaving cutter 12, where it makes contact with the surface of the glass substrate, has not a V-shaped opening but an arc-shaped opening with a radius R1 as shown in FIG. 4(a). The second embodiment, which is characterized by the arc-shaped cross section of the cutting edge of the shaving cutter 12, has, among others, the following advantages. It is possible to secure a wider width at the bottom of the shaved groove 5 shown in FIG. 3, i.e., a wider width in the exposed region (strip-shaped region) on the glass substrate, than in the first embodiment. This results in a greater margin in the positioning of the edge of the cutter wheel 4a. Moreover, the pressing force does not concentrate on one point at the cutting edge of the shaving cutter as in the first embodiment. This helps maintain the sharpness of the cutting edge of the shaving cutter 12 for a longer period. The radius R1 and the opening angle of the cutting edge are, as in the first embodiment, determined appropriately according to the edge angle of the cutter wheel 4a and the thickness of the deposited film 1a. In other respects, including how scribed lines are formed, the second embodiment works in the same manner as the first embodiment, and therefore overlapping explanations will not be repeated.

FIG. 4(b) shows the cutting method of a third embodiment of the invention. In the third embodiment, the feature of the second embodiment is further developed. Specifically, here, the cross-sectional shape of the cutting edge at the tip of the shaving cutter 22 is composed of a linear portion with a width L1, which makes contact with the surface of the glass substrate 1, and slanted portions with an opening angle θ1, which cut the deposited film 1a. Where the linear portion meets the slanted portions, they are connected together by two small arcs r2. This helps perform the cutting and shaving of the deposited film 1a with satisfactory results, and also helps prolong the working life of the cutting edge of the shaving cutter 22. As compared with the second embodiment, the third embodiment, in which the width at the bottom of the shaved groove 5 is determined by L1, permits easier setting of the dimensions of the shaved groove. As in the second embodiment, the shape and dimensions of the cutting edge, specifically the values of L1 and θ1, are determined appropriately according to the edge angle of the cutter wheel 4a and the thickness of the deposited film 1a. In other respects, including how scribed lines are formed, the third embodiment works in the same manner as the first embodiment, and therefore overlapping explanations will not be repeated.

Figure 5:
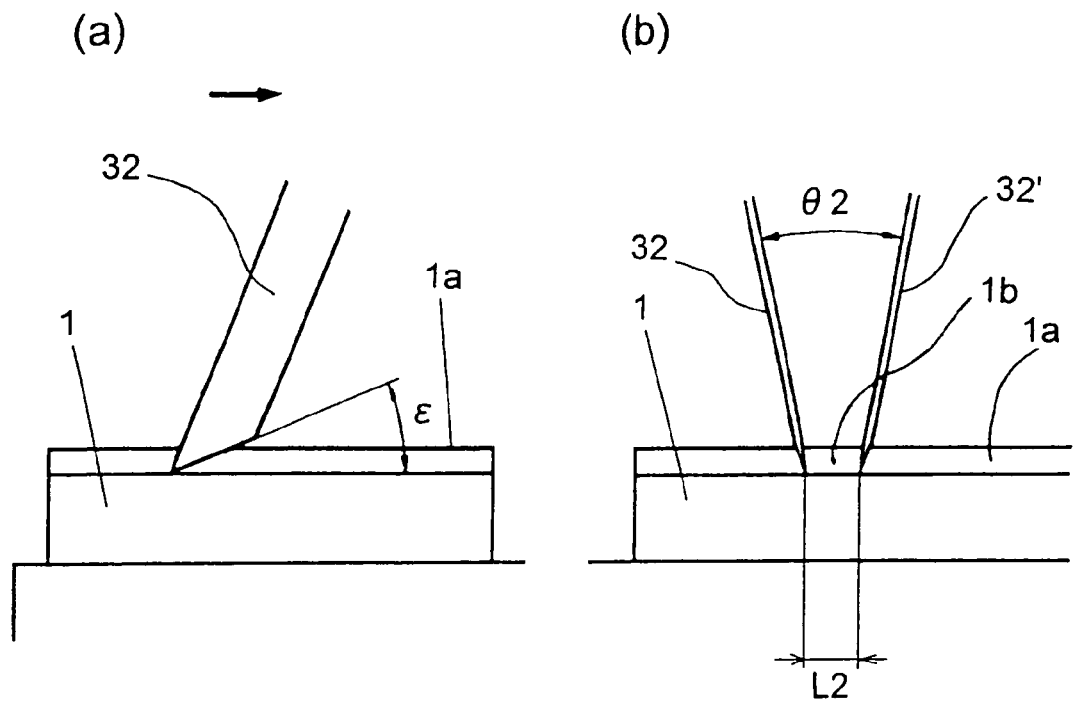
FIG. 5 is a diagram schematically illustrating how a deposited film is removed in the cutting method of a fourth embodiment of the invention, with a side view shown at (*a*) and a front view shown at (*b*).
Figure 6:
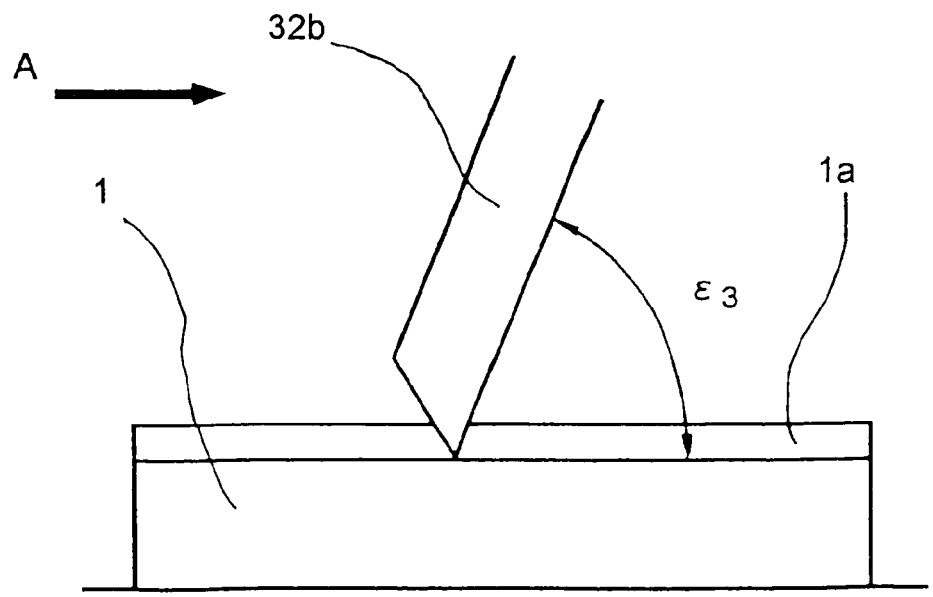
FIG. 6 a side view schematically showing another example of the fourth embodiment.

FIGS. 5 and 6 show the cutting method of a fourth embodiment of the invention. FIG. 5(a) is a side view showing how a deposited film 1a formed on the glass substrate 1 is cut by two flat-plate-shaped cutters 32 and 32' arranged so as to face each other in the fourth embodiment, and FIG. 5(b) is a front view of the FIG. 5(a) as seen from the direction indicated by an arrow therein. In this embodiment, to bring the edge of a cutter wheel 4a into contact with the glass surface of a glass substrate 1 when it is scribed, a shaved groove is formed in the deposited film 1a by moving two cutters, arranged substantially parallel to each other and kept in contact with the deposited film 1a, in the direction indicated by an arrow in FIG. 5(a) so as to cut the deposited film 1a. For example, the two cutters 32 and 32' are formed so as to have a side shape as shown in FIG. 5(a), are arranged with a cutting angle ε appropriately determined in the range of, for example, from 20° to 50° according to the thickness and material of the deposited film 1a, and are moved parallel to the glass substrate 1 as indicated by the arrow while being pressed against it so as to cut the deposited film 1a. As shown in FIG. 5(b), as in the third embodiment, the interval L2 and the inclination angle θ2 between the two cutters 32 and 32' are so determined that the edge of the cutter wheel, when scribing the glass substrate 1, does not interfere with the deposited film 1a.

In the fourth embodiment, even after the deposited film 1a is cut by the two flat-plate-shaped cutters 32 and 32', the deposited film 1a remains in the form of a waste strip 1b as shown in FIG. 5(b), and therefore this waste strip 1b needs to be shaved off and removed in a downstream step. This is achieved, for example, by shaving off and removing it with a shaving cutter, as the one shown in FIG. 4(b), having a trapezoidal or C-shaped cross section and having a bottom width L1 equal to or slightly smaller than L2 shown in FIG. 5(b). In the fourth embodiment, cutting and shaving are performed in different steps. This, however, makes it possible to cut the deposited film 1a more sharply than in the first to third embodiments. Thus, even a deposited film as thick as 1 to 2 mm can be cut with satisfactory quality in cut surfaces. Moreover, it is possible to purchase the cutter cheaply by using a well-known, commercially available cutter blade 32b as shown in FIG. 6.

Figure 7:
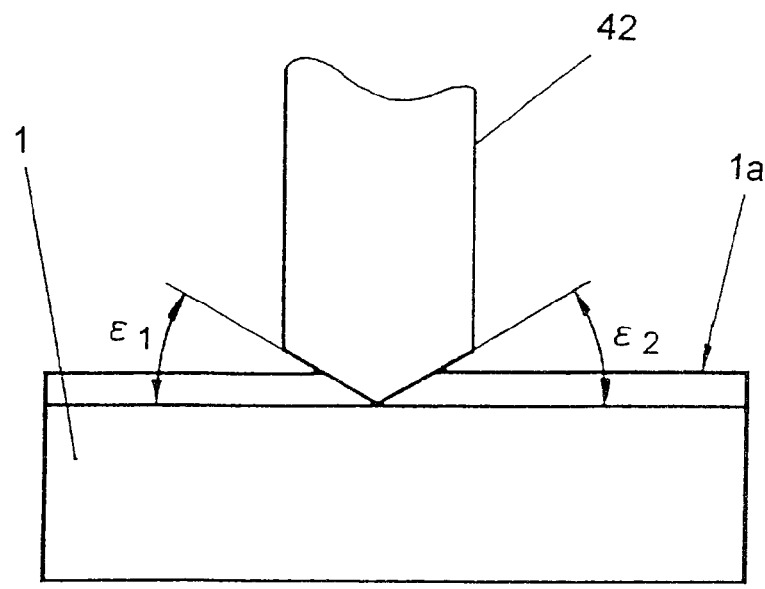
FIG. 7 is a front view schematically illustrating how a deposited film is removed in the cutting method of a fifth embodiment of the invention.

FIG. 7 shows the cutting method of a fifth embodiment of the invention. This embodiment is a further developed version of the fourth embodiment. Specifically, how cutting, shaving, and scribing are performed in this embodiment is the same as in the fourth embodiment except that a cutter 42 as shown in FIG. 7 is used instead of the cutter 32 shown in FIG. 5. Accordingly, a left or right side view of FIG. 7 is identical with FIG. 5(b), and is therefore omitted. Whereas in the first to fourth embodiments the cutter permits the cutting and shaving of the deposited film 1a only in one direction, i.e., in the direction in which the cutter moves, in this embodiment the cutter 42 is given a side shape as shown in FIG. 7 so as to permit cutting also in the leftward and rightward directions as seen in FIG. 7 without requiring a change in the arrangement of the cutter when the cutting direction is changed. The cutting angles ϵ1 and ϵ2 of the cutter 42 are so determined as to offer the optimum cutting conditions that fit the thickness and material of the deposited film 1a. When the cutter 42 is used to cut in both directions, the cutting angles ϵ1 and ϵ2 are usually set equal to each other. The shaving and removal of the waste strip 1b is performed separately in the leftward and rightward directions in a manner similar to that used in the fourth embodiment.

Figure 8:
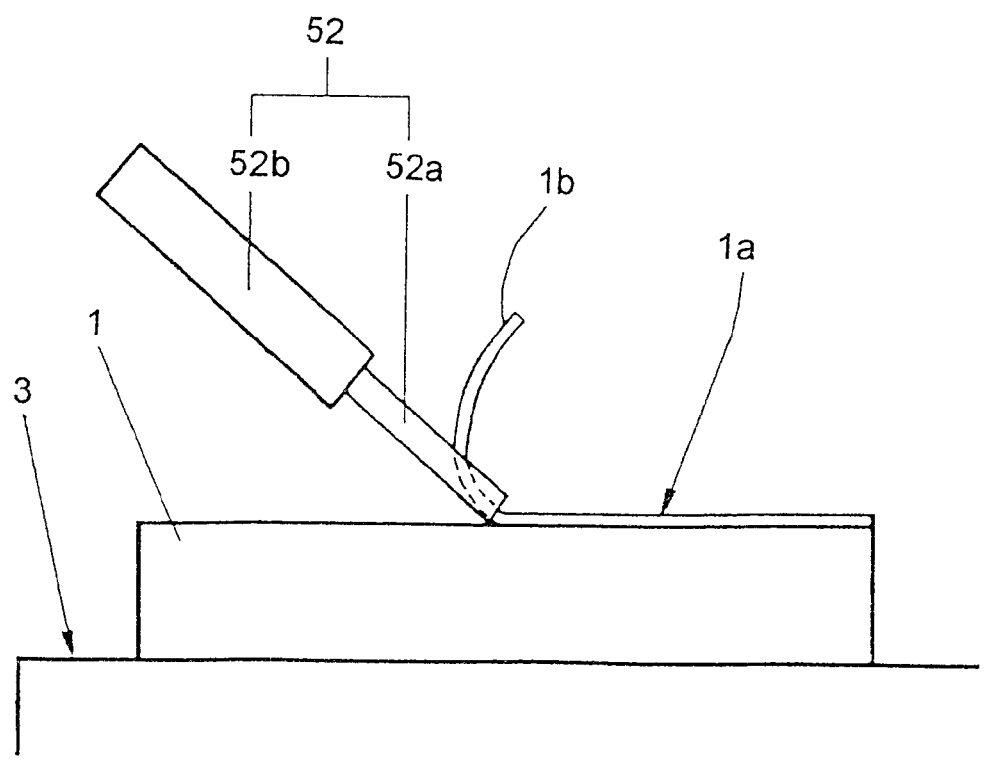
FIG. 8 is a side view schematically illustrating how a deposited film is removed in the cutting method of a sixth embodiment of the invention.

FIG. 8 shows the cutting method of a sixth embodiment of the invention. In this embodiment, a shaving cutter 52 composed of a cutter blade 52a and a holder portion 52b is used. Any of the cutters used to cut and shave the deposited film 1a in the cutting methods of the first to fifth embodiments described above may be adapted to the cutter blade 52a of this embodiment. The holder portion 52b serves as a handle that holds the cutter blade 52a when the deposited film 1a is cut and shaved. In addition, by unifying and standardizing the length and the cross-sectional shape of the holder portion 52b, for example into a rectangular shape having predetermined dimensions, it is possible, where a deposited film is cut and shaved with the shaving cutter 52 fixed to a jig or machine, to use any of the cutters of the first to fifth embodiments by interchanging them on a single jig or machine.

The holder portion 52b is formed preferably of an appropriately elastic material, for example resin such as Duracon or Delrin, or more flexible rubber such as silicone rubber or nitrile rubber, or, in some cases, wood. By so doing, even if there are variations or the like in the thickness or hardness of the deposited film to be shaved, the elasticity of the holder portion 52b absorbs variations in the resistance to cutting and shaving. This can be used as a safety mechanism in a cutting apparatus to which the techniques of this embodiment are applied. The shaving cutter 52 may be given elasticity by exploiting the action of coil springs 77a and 77b (see FIGS. 15 and 17), which will be described later in connection with a ninth embodiment.

The blade of the cutter used to cut and shave the deposited film 1a in the first to sixth embodiments is formed of a common material, such as carbon tool steel or martensitic stainless steel, hardened by heat treatment or the like as required. However, there is no restriction on the material of the cutter so long as it can appropriately cut and shave various deposited films 1a made of different materials and having different thicknesses. Moreover, the cutter used to cut and shave the deposited film 1a in this embodiment has its cross-sectional shape, such as shown in connection with the first to fifth embodiments, formed along an extended length. This makes it possible to grind the cutting edge again and again and use the blade for a longer period.

Figure 9:
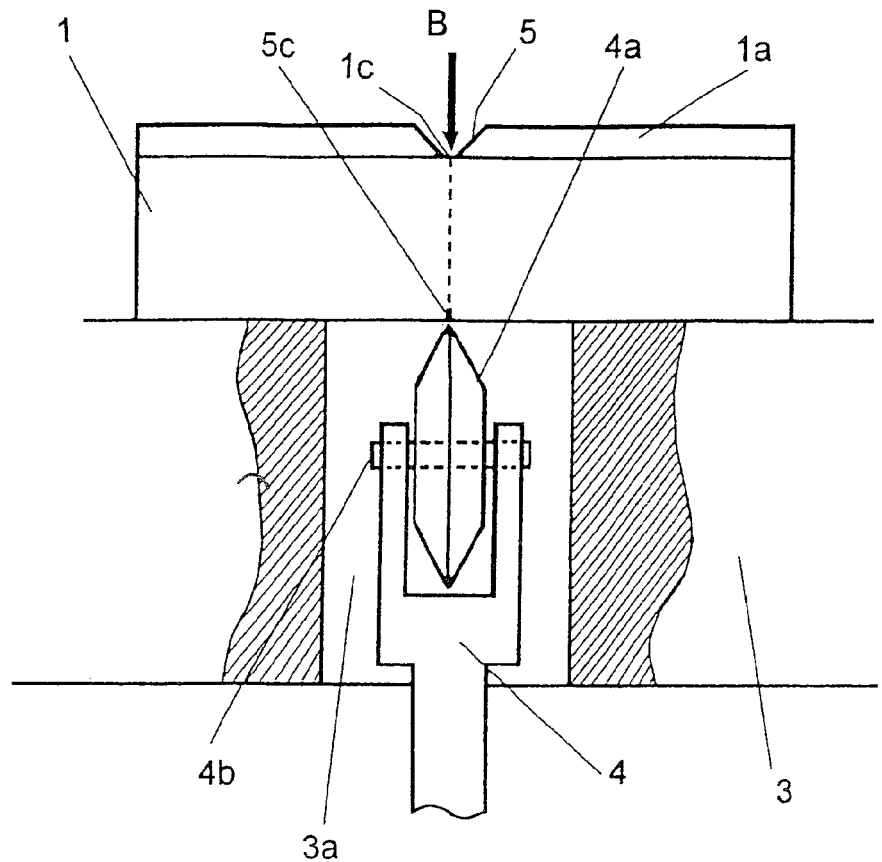
FIG. 9 is a front view schematically showing how a crack is formed in the cutting method of a seventh embodiment of the invention.

FIG. 9 shows the cutting method of a seventh embodiment of the invention. In the cutting method of this embodiment, in an upstream step prior to scribing, the deposited film 1a is shaved and removed in the same manner as in one of the first to sixth embodiments described above. Specifically, in the first to sixth embodiments, as shown in FIG. 3, the deposited film 1a is cut, shaved, and removed so as to form a shaved groove 5 in the deposited film 1a, and then a scribing means is made to roll along the bottom 1c of the shaved groove 5, i.e. along a strip-shaped region on the glass substrate 1, while pressing it so as to form a scribed line 5a. In the seventh embodiment, the glass substrate is cut apart by scribing the surface thereof opposite to the film-deposited surface thereof.

As shown in FIG. 9, the glass substrate 1 is secured on the workpiece stage 3 by an unillustrated securing means such as vacuum chucking. In the workpiece stage 3, an elongate opening 3a is formed to permit the scribing means 4 to scribe the bottom surface of the glass substrate 1. In this embodiment, a scribed line 5c is formed on the bottom surface of the glass substrate 1, right below the bottom 1c of the shaved groove 5 formed on the top surface of the glass substrate 1 by one of the methods described in connection with the first to sixth embodiments.

In the glass substrate cutting step following the scribing step, a pressing force is applied to the surface opposite to that on which the scribed line is formed so that the crack in the scribed line develops until the glass substrate breaks apart. In methods in which scribing is performed on the bottom 1c of the shaved groove 5 formed in the deposited film 1a, in the cutting step following the scribing step, it is necessary to apply a pressing force and cut the glass substrate from below the surface thereof opposite to the scribed surface. Thus, for example, in methods in which the scribed surface, i.e., the film-deposited surface, of the glass substrate is placed directly on the surface plate and a load is applied thereto from above by a press or roller, the pressing force applied to cut apart the glass substrate may destroy or deform the deposited film layer placed directly on the workpiece stage. By contrast, in the cutting method of the seventh embodiment, a pressing force exerted by a plate-shaped pressing jig or a roller adapted to the shape and dimensions of the shaved groove 5 can be applied in the direction indicated by an arrow B so as to concentrate on the bottom 1c of the shaved groove 1c shown in FIG. 9. This permits the scribed line 5c to develop vertically to achieve cutting. Thus, it is possible to cut apart the glass substrate without pressing or touching the deposited film 1a.

FIGS. 10 to 13 show the cutting method of an eighth embodiment of the invention. This embodiment is devised to achieve satisfactory shaving and removal of a deposited film before scribing when dealing with a glass substrate having a relatively thick deposited film, about 0.05 mm to 2 mm thick, typically such as a resin film, formed thereon. Here, the advantages of the shaving cutters used in the first and second embodiments are combined together; specifically, the shape of the cutting edge used in the first or second embodiment is formed out of a round-bar-shaped material. This permits the deposited film to be shaved with better results.

Figure 10:
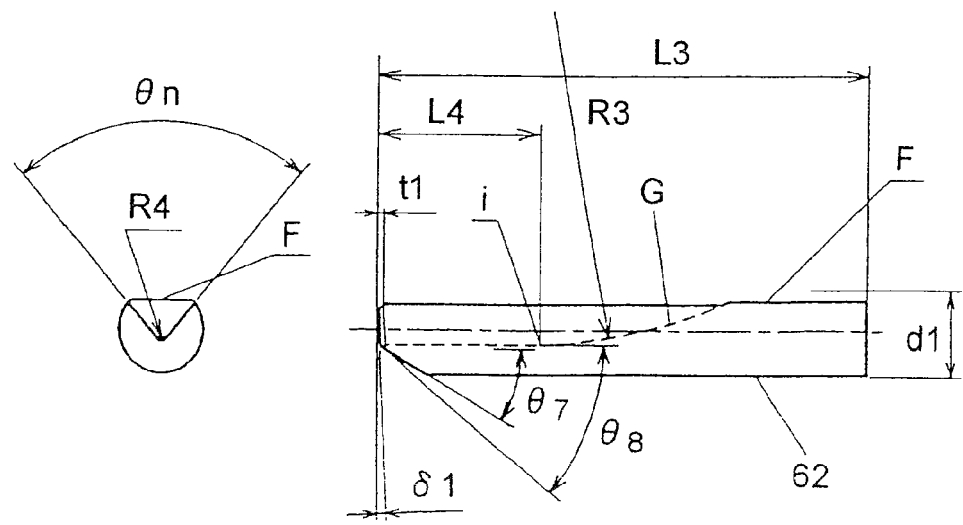
FIG. 10 is an external view of the cutter used in the cutting method of an eighth embodiment of the invention.
Figure 12:
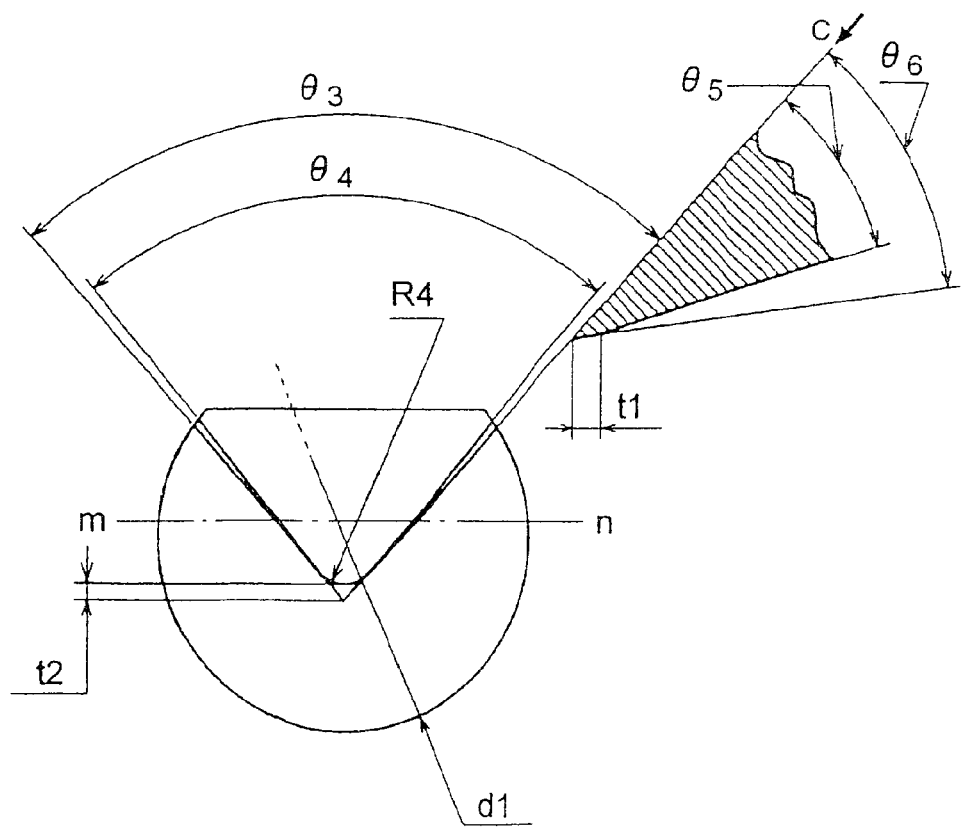
FIG. 12 is a front detail view of the cutter used in the eighth embodiment.
Figure 13:
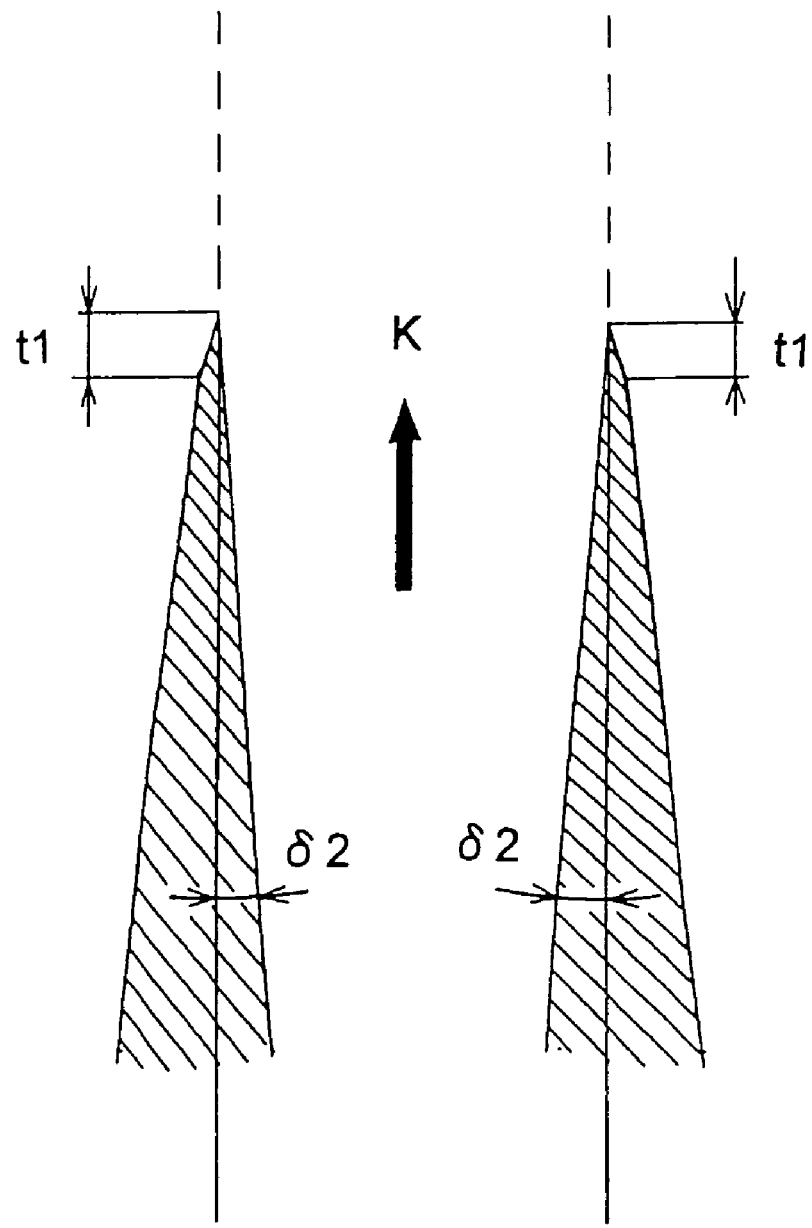
FIG. 13 is a sectional view along line m-n shown in FIG. 12.

FIG. 10 shows a front view and a side view of the shaving cutter 62 used in this embodiment. A round-bar-shaped material, such as superhard alloy or carbon tool steel, is formed into the shape of the shaving cutter. The external diameter d1 of the round-bar-shaped material is determined appropriately according to the thickness of the deposited film to be shaved, and is typically 5 to 10 mm. The symbol F represents a flat holder portion that is formed by cutting away a portion of the circumference d1 parallel thereto as shown in FIG. 10. The holder portion serves as a reference surface relative to which other portions are formed, and also serves a function similar to that of the holder portion 52b shown in FIG. 8. The total length L3 of the shaving cutter 62 is so determined as to fit the member by which it is held and the apparatus on which it is used, and is set equal to 35 mm in this embodiment. As shown in the front view of FIG. 10, a shaving blade having a substantially V-shaped cross section with an opening angle of $\theta n$ is formed from an end surface of the shaving cutter 62 over a length L4. The value of $\theta n$ will be discussed in detail later. The blade length L4 is determined in the range of from 5 to 10 mm according to the material and thickness of the deposited film to be shaved, and is set equal to 7 mm in this embodiment. The portion of the blade groove located on the right of the portion "i" shown in the figure is formed as an arc-shaped groove with a mild curve R3, and serves to smoothly eject the linear waste strip 1b that has been shaved off. In this embodiment, R3 is set equal to 38 mm. The curve R4 of the bottom of the blade having a V-shaped cross section is determined in the range from about 0.5 to 1 mm according to the material and thickness of the deposited film and the dimensions of the scribing cutter. In this embodiment, R4 is set equal to 0.5 mm. The cutting edge needs to be designed to shave and remove the deposited film completely, and is therefore so formed as to have tip angles $\theta 7$ and $\theta 8$ in two stages. In FIGS. 10 and 13, t1 represents the distance from the cutting edge to the boundary between $\theta 7$ and $\theta 8$. The details are shown in a view seen from the direction C in FIG. 12. In this embodiment, t1 is set equal to 0.3 mm, $\theta 7$ is set equal to 30°, and $\theta 8$ is set equal to 40°. By setting t1 equal to as small as about 0.3 mm, it is possible to set the effective tip angle $\theta 7$ relatively small, i.e., equal to 30°, to achieve satisfactory shaving performance while setting the tip angle $\theta 8$ in the cutting edge portion t1 equal to 40° to secure sufficient mechanical strength at the cutting edge of the shaving cutter 62.

Figure 11:
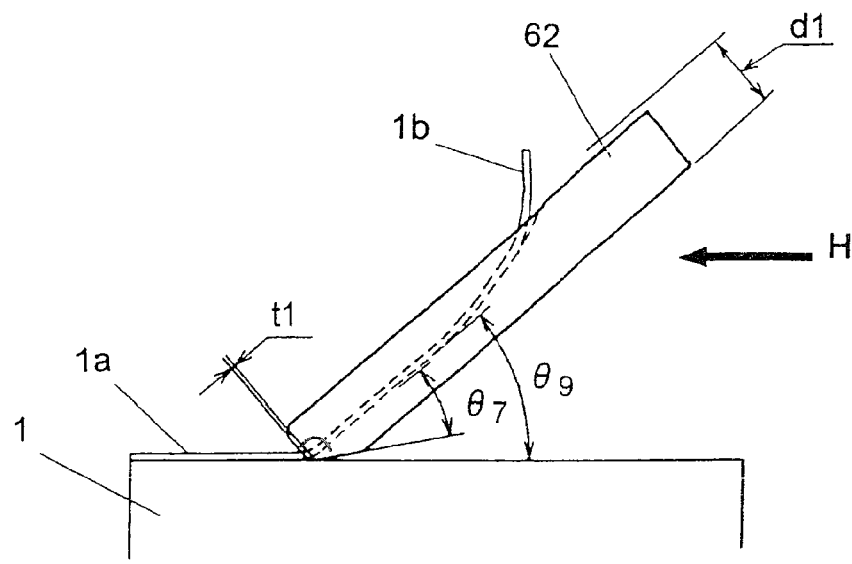
FIG. 11 is a side view schematically illustrating how a deposited film is removed in the eighth embodiment.

Next, the workings of the eighth embodiment will be described with the focus placed on what is illustrated in the figures. FIG. 11 shows how a deposited film 1a formed on a glass substrate 1 is shaved and removed by a shaving cutter 62. The angle $\theta 9$ at which the shaving cutter is arranged relative to the glass substrate corresponds to the rake angle with which cutting and shaving are performed, and is determined appropriately in the range of from 35° to 45° according to the thickness and material of the deposited film. In this embodiment, when this angle was set equal to 43°, a 1 mm-thick rubber-based deposited film was cut and shaved with satisfactory results. FIG. 11 shows how the shaving cutter 62, while moving in the direction H, cuts and shaves the deposited film 1a. The waste strip 1b shaved off is smoothly ejected along an arc-shaped groove marked as G in FIG. 10. The pressing force with which the shaving cutter 62 is pressed vertically downward against the surface of the glass substrate 1 is about 1 to 40 N. A stronger pressing force produces a scratch on the glass surface below the deposited film, which adversely affects scribing.

Now, a description will be given of $\theta n$ shown in FIG. 10 with reference to FIG. 12, which is an enlarged front view of the shaving cutter 62. The opening angle $\theta 3$ formed by the cutting edge of the shaving cutter 62 is determined in the range of from 50° to 140° according to the tip angle of the scribing cutter. The opening angle $\theta 4$ measured at a distance of 3 to 10 mm from the cutting edge is made smaller than $\theta 3$ by an angle in the range of from 3° to 6°. The purpose and advantage of making $\theta 4$ smaller than $\theta 3$ will be described with reference to FIG. 13. FIG. 13 is a sectional view of the cutting edge of the shaving cutter 62 shown in FIG. 12, taken along line m-n, as seen from above. With $\theta 4$ smaller than $\theta 3$, when the shaving cutter 62 moves in the direction K to cut and shave the deposited film 1a, it forms an angle $\delta 2$ relative to the cutting direction. The presence of this angle $\delta 2$ serves to increase what is called the shear angle in the theory of cutting, and thereby permits the deposited film to be cut and shaved with better results. In experiments, a 1 mm-thick resin deposited film was cut and shaved with far higher cutting/shaving workability and cutting quality than when no $\delta 2$ was present, i.e., when $\theta 3$ and $\theta 4$ were set equal. In this embodiment, for example, when $\theta 4$ was set equal to 80° and $\theta 3$ was set equal to 84°, i.e., with $\theta 4$ smaller than $\theta 3$ by 4°, the deposited film was cut with the best results, and, as describe above, almost comparably satisfactory cutting quality was obtained when $\theta 4$ was made smaller than $\theta 3$ by an angle in the range of from 3° to 6°. The improvement of cutting quality achieved by making the opening angle $\theta 4$, at a distance from the tip of the shaving cutter, smaller than the opening angle $\theta 3$, at the tip of the shaving cutter, was observed markedly with a resin or rubber-based deposited film 0.5 mm or more thick.

In FIG. 10, $\delta 1$ indicates that the cutting edge is not perpendicular to the circumference of the shaving cutter 62, but is slightly inclined inward from top to bottom as seen in the figure. This means that making $\theta 3$ smaller than $\theta 4$ results in producing $\delta 1$. On the other hand, in FIG. 12, $\theta 5$ and $\theta 6$ are shown in a sectional view of and around the cutting edge as seen from the direction C. This means that, for example, when $\theta 3$ is set equal to 84° and $\theta 4$ is set equal to 80°, even if $\theta 7$ is set equal to 30° and $\theta 8$ is set equal to 40° in FIGS. 10 and 12, $\theta 5$ is equal to about 22° and $\theta 6$ is equal to about 31°.

As described earlier, the shaving cutter 62 is produced by forming a heat-treatable material such as superhard alloy or carbon tool steel into its shape and then subjecting it to heat treatment either only at the cutting edge or in entirety. The eighth embodiment is characterized by the shape of the shaving cutter used to shave the deposited film and by how it is shaved, and the scribing step following the shaving step is performed by the method exemplified by the first embodiment or the method of the seventh embodiment.

Figure 14:
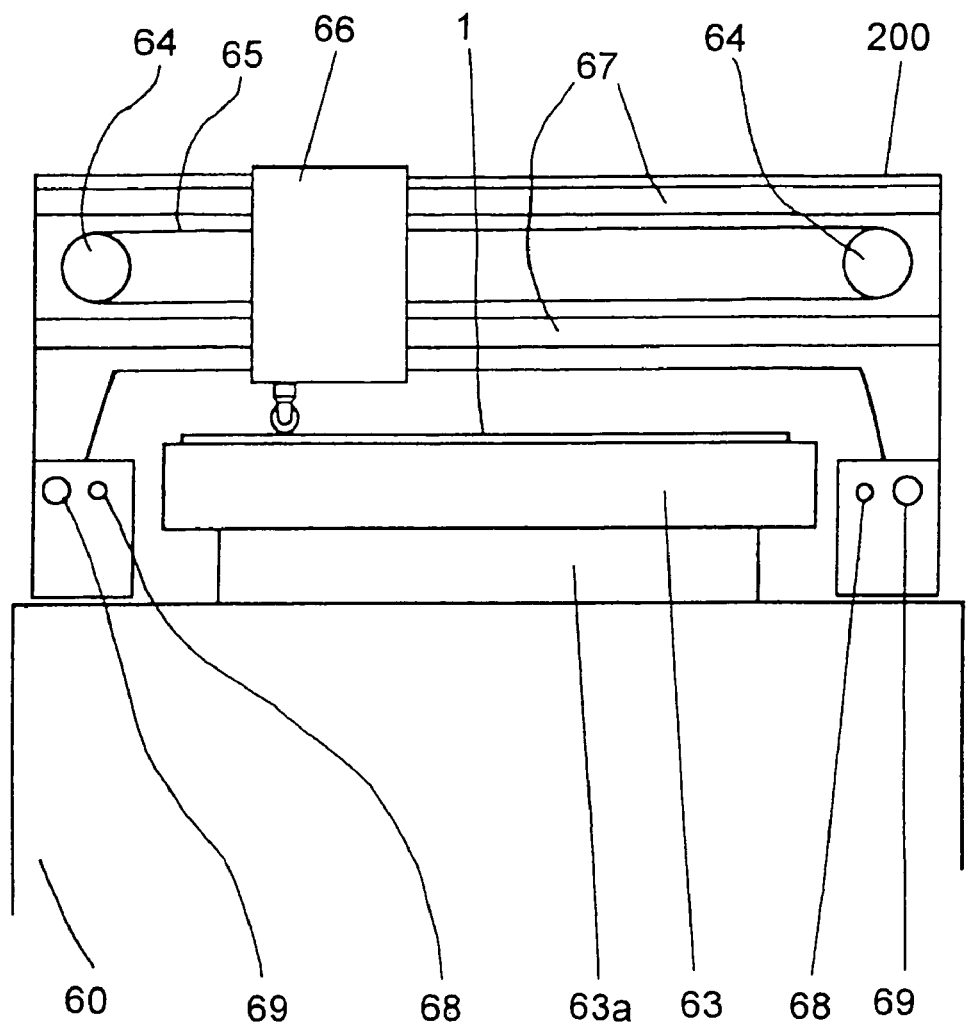
FIG. 14 is a front view of the glass substrate cutting apparatus of a ninth embodiment of the invention.

Next, as a ninth embodiment of the invention, a cutting apparatus employing the cutting methods of the first to eighth embodiments will be described. FIG. 14 is a diagram illustrating the front face of the cutting apparatus employing the cutting methods of the first to eighth embodiments. Reference numeral 66 represents a scribing unit that has a scribing cutter and/or a shaving cutter provided at the bottom. The scribing unit 66 moves the scribing cutter and the shaving cutter from side to side as seen in the figure along a guide rail 67 composed of a well-known ball slide or the like while pressing them with a predetermined load against a glass substrate 1 by the use of an unillustrated well-known pressing means exploiting hydraulic pressure, compressed air pressure, the resilience of a spring, or the like. In the example shown in FIG. 14, part of the scribing unit 66 is fixed to a timing belt 65. As an unillustrated driving means such as a motor rotates a pulley 64, the timing belt 65, passed around the pulley 64, travels a desired distance along the guide rail 67. In the diagram, the scribing unit 66 is driven by the timing belt; however, it may be driven by a combination of an well-known actuating means such as a ball screw and a motor and a controller that drive it.

A chassis 60, a workpiece stage 63, and a support stand 63a are formed integrally. In the workpiece stage 63, suction holes are formed vertically at appropriate places to permit the glass substrate 1 to be secured on the top surface of the workpiece stage 63 by an unillustrated securing means such as vacuum chucking. The workpiece stage 63 and the support stand 63a are rotatable through 90° as seen from above or below FIG. 14 by the action of a rotating means housed inside the chassis 60. A C-shaped movable block 200 strides over the top face of the chassis 60, and is moved frontward or backward as seen in the figure over a desired distance at a time relative to the chassis 60 by an unillustrated driving means such as a motor and an unillustrated controlling means. As described above, in the cutting apparatus of this embodiment, the sliding movement of the scribing unit 66 and the 90° rotation of the workpiece stage 63 permit the glass substrate 1 to be scribed in the X and Y directions, i.e., in a grid-like pattern.

Figure 15:
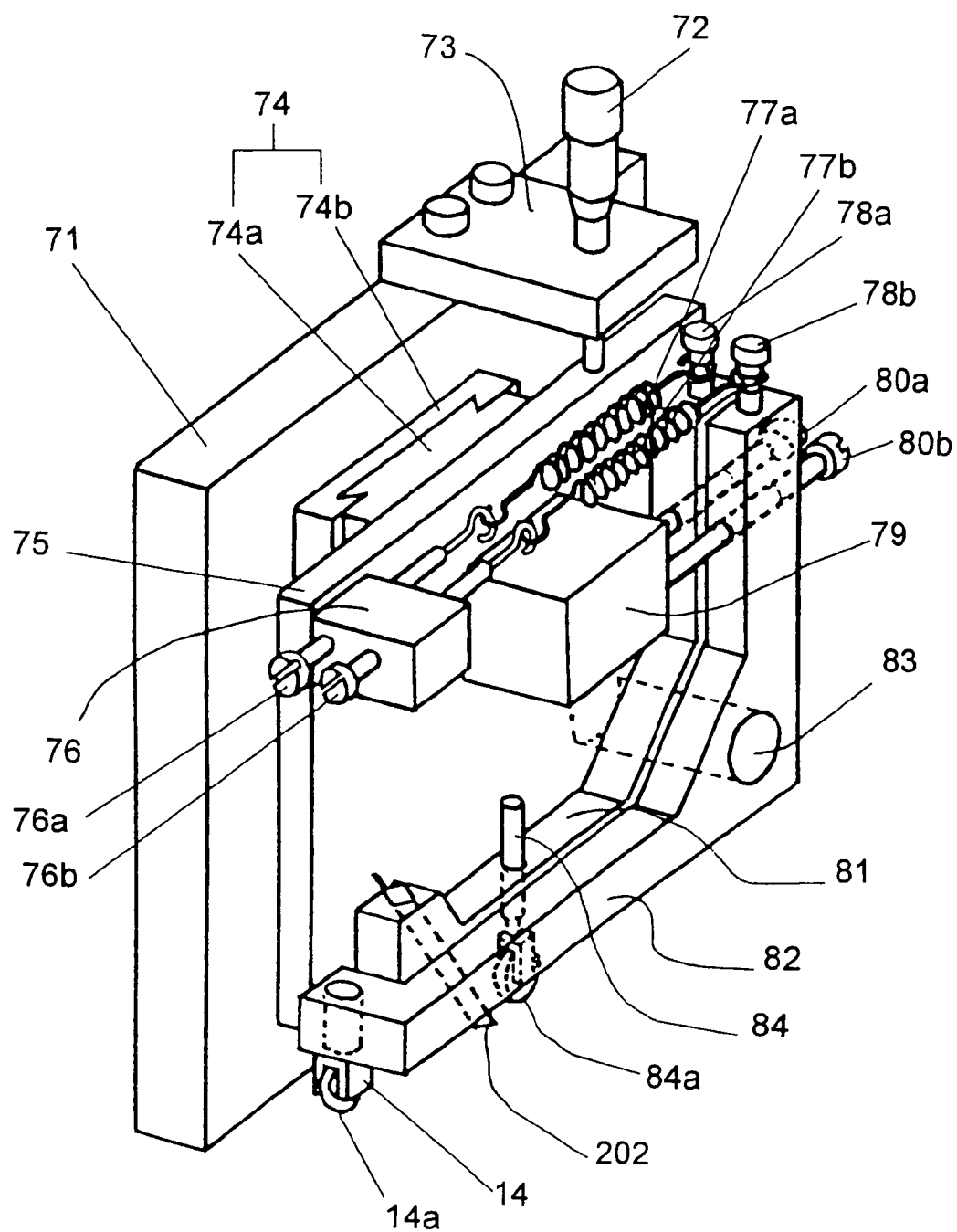
FIG. 15 is a perspective view of the crack forming means (scribing unit) used in the cutting apparatus of the ninth embodiment.

FIG. 15 is a diagram showing in detail the structure of the scribing unit 66 shown in FIG. 14. A unit base plate 71 engages with the timing belt 65 and the guide rail 67 shown in FIG. 14 to permit the entire scribing unit 66 to slide. A joint 74 joins the unit base plate 71 to a scribing base plate 75. The rear portion 74b of the joint 74 is fixed integrally to the unit base plate 71 with screws or the like put through the unit base plate 71 from behind it. The front portion 74a and the rear portion 74b of the joint 74, together with the scribing base plate 75 fixed integrally to the front portion 74a, can slide up and down by the action of a sliding means such as a dovetail joint as shown in the figure or a well-known sliding means such as a ball slide. The front portion 74a of the joint 74 and the scribing base plate 75 joined integrally thereto are kept pulled upward relative to the unit base plate 71 all the time by the tension exerted by unillustrated coil springs. The upward tension is stopped by the tip of a micrometer screw 72 fixed through a micrometer fitting block 73 to the unit base plate 71. The micrometer screw 72 is used to fine-adjust and appropriately set the vertical position of the entire unit including the scribing base plate 75 and the vertical position of the tip of the shaving means and the scribing means described later.

On the scribing base plate 75, there are supported a shaving block 81 and a scribing block 82, both substantially L-shaped, so as to be coaxially rotatable about a rotation shaft 83. On the scribing base plate 75, there is fixed a support block 76, with which adjustment screws 76a and 76b are screw-engaged, each having a hook formed at the tip. From these hooks, coil springs 77a and 77b are stretched to spring end screws 78a and 78b that are screwed into the top of the shaving block 81 and the scribing block 82, respectively. In this structure, the shaving block 81 and the scribing block 82 are all the time loaded with a force that tends to rotate them counter-clockwise about the rotation shaft 83 as seen from the front right-hand side of FIG. 15. That is, the shaving means 202 and the scribing means 14 are pressed downward all the time. This counter-clockwise rotation is stopped by contact between the tips of stopper screws 80a and 80b screw-engaged with the vertical arm portions of the shaving block 81 and the scribing block 82 and tips 79a and 79b formed on a stopper/pressing means 79 fixed to the scribing base plate 75. While the shaving means 202 is pressed downward with a pressing force of about 10 to 20 N, the scribing means 14 is pressed downward with a pressing force of about 1 to 40 N; that is, they are pressed downward with different pressing forces. Therefore, the coil springs 77a and 77b are individually set at tensions that produce appropriate loads for them. The tensions are fine-adjusted by screwing the adjustment screws 76a and 76b into and out of the support block 76. A deposited film surface detecting means 84, by extending a spindle integral with a detector fitted at the tip thereof and by the use of a well-known electrical detecting means such as a linear scale or differential transformer, detects the vertical position of the deposited film formed on the glass substrate as an electric signal by way of an unillustrated signal cable. The tip 84a of the detecting means 84 for detecting the deposited film surface is formed as a roller made of resin such as nylon or Teflon (R), and the detector operates with a sensing force as low as 0.2 N (newton) or lower so as not to scratch or deform the surface of the deposited film 1a. FIG. 16(a) is a plan view showing the main components shown in FIG. 15, such as the shaving block 81, the scribing block 82, the shaving means 202 serving as a glass substrate exposing means, the scribing means 14, and the deposited film surface detecting means 84, as seen from above. This figure shows that, as the result of the deposited film detecting means 84, the shaving means 202, and the scribing means 14 being arranged in a row, it is possible to shave the deposited film 1a and scribe the top surface of the glass substrate 1 simultaneously as the scribing unit 66 is moved along one path.

Figure 17:
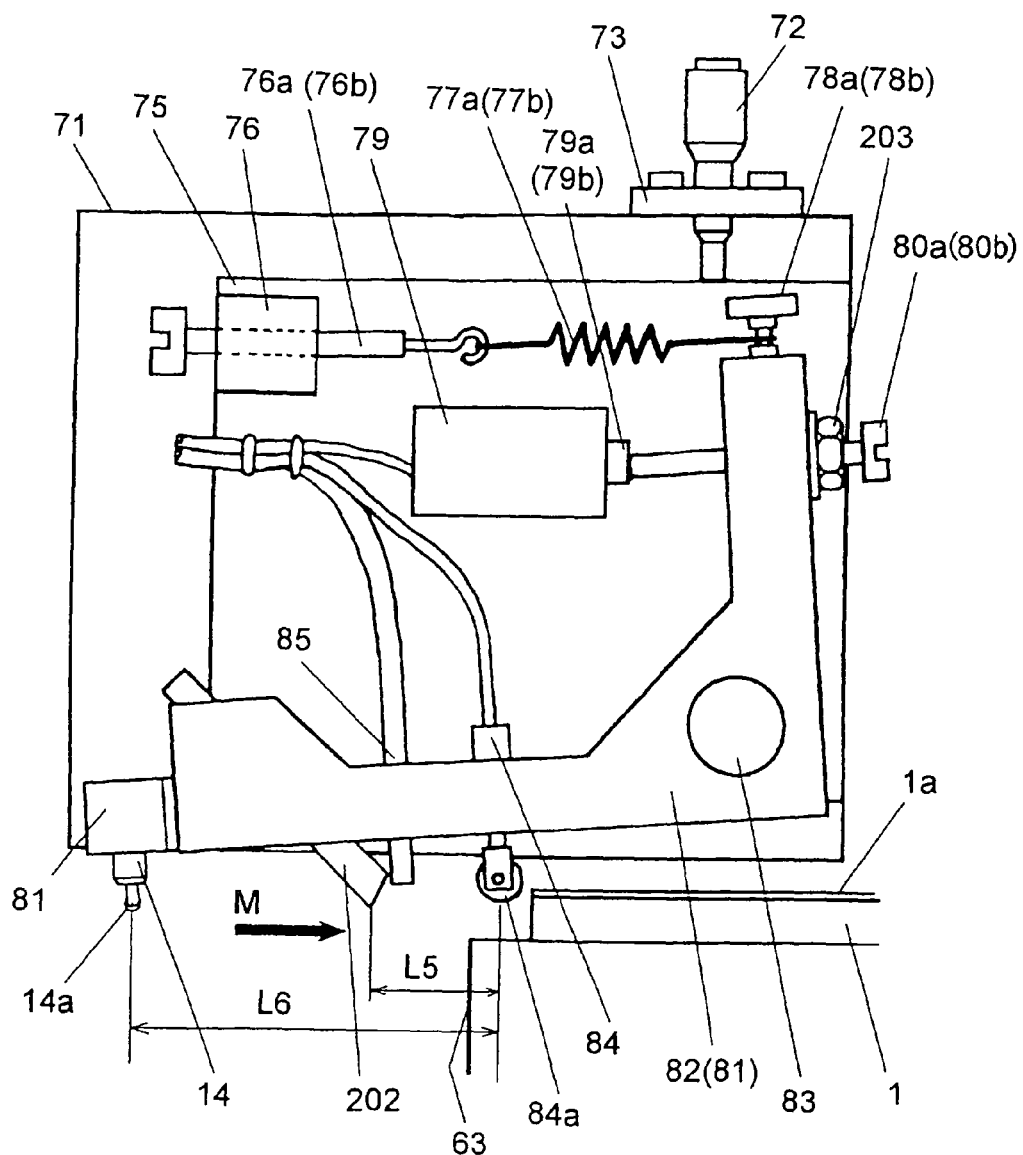
FIG. 17 is a front view of the cutting apparatus of the ninth embodiment, in the state before deposited-film removal operation.
Figure 18:
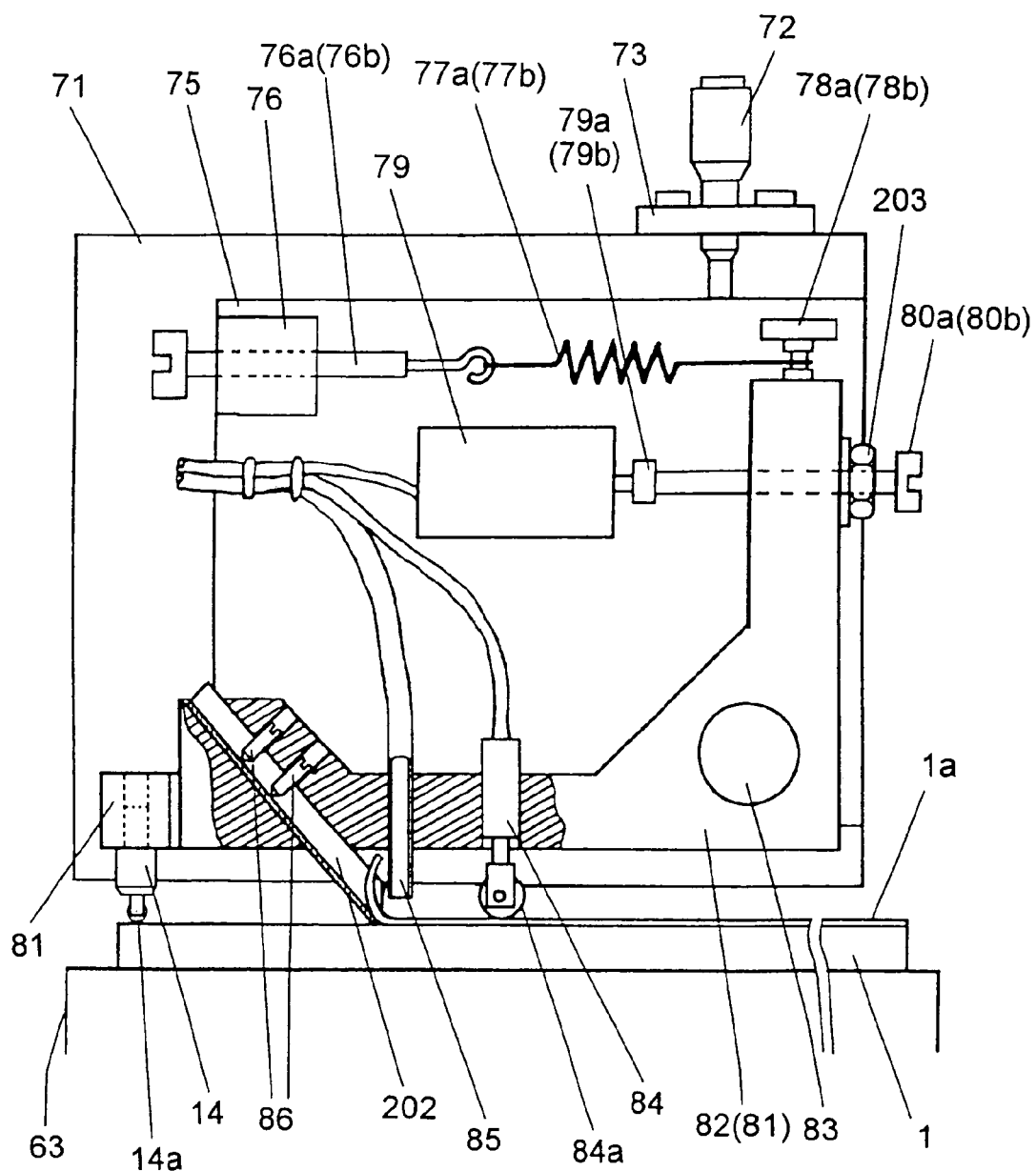
FIG. 18 is a front view of the cutting apparatus of the ninth embodiment, in the state in the middle of deposited-film removal operation.

Next, the operation and workings of the cutting apparatus of a ninth embodiment of the invention will be described. FIG. 17 is a front view showing the cutting apparatus of FIG. 14 in a state in which the scribing unit 66 is located in the leftmost, stand-by position, i.e., the detecting tip 84a of the deposited film surface detecting means 84, the shaving means 202, and the scribing means 14 are all located away from the top surface of the glass substrate 1. In this state, the shaving block 81 and the scribing block 82 are loaded with a force that tends to rotate them counter-clockwise about the rotation shaft 83 by the tension of the coil springs 77a and 77b, but this counter-clockwise rotation is stopped by the tips of the stopper screws 80a and 80b making contact with the tips 79a and 79b of the stopper/pressing means 79, and thus the shaving block 81 and the scribing block 82 remain at rest. The cutting apparatus operates as follows. First, in response to the first movement command signal, the scribing unit 66 moves in the direction indicated by an arrow M in FIG. 17. As the shaving block 81 moves rightward, the detecting tip 84a of the deposited film surface detecting means 84 runs onto the glass substrate 1 and detects the position of the surface of the deposited film 1a. Then, the air cylinder provided in the stopper/pressing means 79 extends, and its tip 79a presses the stopper screw 80 to a predetermined degree so that the tip of the shaving means 202 is so controlled as to reach the glass surface on the basis of the thickness of the deposited film 1a on the glass substrate 1 as corrected according to the result of detection by the detecting means 84. When the scribing unit 66 moves over a distance L5 shown in FIG. 17, the shaving means 202 starts cutting and shaving the deposited film 1a. When the scribing unit 66 further moves and completes a distance L6 shown in FIG. 17, the cutter wheel 14a at the tip of the scribing means 14 runs onto the top surface of the glass substrate 1 where the deposited film 1a has been shaved off. The scribing block 82 is loaded with a force that tends to rotate it counter-clockwise by the tension of the coil spring 77b, and thus the cutter wheel 14a exerts, at its tip, a predetermined pressing force acting downward. This pressing force permits scribing of the top surface of the glass substrate 1. FIG. 18 shows how the shaving means 202 shaves the deposited film 1a and how the scribing means 14 scribes the top surface of the exposed glass substrate 1 where the deposited film 1a has been shaved off. As described earlier, the cutter wheel 14a at the tip of the scribing means 14 is formed as a roller like the tip of the detecting means 84a, and does not require the detection of the surface position of the glass substrate 1 or the adjustment of the vertical position of the tip of the cutting wheel 14a as does the shaving means 202. Thus, scribing of the top surface of the glass substrate 1 is achieved simply by moving the cutter wheel 14a, formed as a roller, while pressing it downward. Accordingly, in the state shown in FIG. 18, the tip 79b of the stopper/pressing means 79 for rotating the scribing block 82 clockwise is not operating.

In FIGS. 17 and 18, there is shown an example of a dust removing means 85. The dust removing means 85 is a hose made of soft resin or rubber, and is flexibly movable together with the scribing unit 66. The dust removing means 85 has its opening located near the shaving means 202 and the scribing means 14, and serves to remove particulate dust produced during shaving and scribing by the use of a negative pressure supplying means such as vacuum. Depending on the particle size and the amount of particulate dust produced, a positive pressure supplying means such as sprayed air may be used instead. The deposited film that has been shaved off can be removed by a removing means, like G shown in FIG. 10, provided in the shaving means 202. For the removal of fine shavings, a brush-like remover may be provided immediately behind the shaving means 202.

In FIG. 18, when the scribing unit 66 further moves until the detecting tip 84a of the detecting means 84 falls below the surface position of the deposited film 1a, a signal indicating the end of the scribing step is generated. From this time point, the scribing unit 66 further moves over a distance longer than the distance between the detecting tip 84a and the tip of the shaving means 202, i.e., the dimension L5 shown in FIG. 17. After completion of shaving, the tip 79a of the stopper/pressing means 79 further extends its air cylinder under the control of an unillustrated controlling means so that the shaving means 202 is moved upward, away from the surface of the glass substrate 1. The scribing means 14 needs to be controlled in a similar manner. As with the shaving means, the scribing means 14 may be released upward after the scribing unit 66 has moved over a distance corresponding to the distance L6 between the detecting tip 84a and the cutter wheel 14a shown in FIG. 17. However, the tip 79b of the stopper/pressing means 79 is kept away from the tip of the stopper screw 80b during scribing, and the tip 79b makes contact with the tip of the stopper screw 80b under the tension of the coil spring 77b as soon as the cutter wheel 14a falls below the top surface of the glass substrate 1 on completion of scribing. Thus, this may be used to turn on an electric contact to extend an air cylinder and thereby release the scribing means 14 to above the glass substrate. The latter method is technically simpler. After, in this way, the deposited film 1a is shaved and the surface of the glass substrate 1 is scribed where the deposited film 1a has been shaved, the scribing unit 66 is moved back to the stand-by position with the shaving means 202 and the scribing means 14 lifted up so as not to interfere with the glass substrate. Thereafter, as the movable block 200 described with reference to FIG. 14 is moved frontward or backward over a desired distance at a time, shaving and scribing are repeated. In this way, the glass substrate having a deposited film formed thereon can be scribed into strip-shaped sections arranged at desired intervals. Then, the workpiece stage 63 described with reference to FIG. 14 is rotated through 90° and similar steps are performed to scribe the film-deposited glass substrate into a grid-like pattern.

The shaving of the deposited film in a grid-like pattern from a film-deposited glass substrate and the scribing thereof in a grid-like pattern can be achieved also by exploiting the facts, described earlier with reference to FIG. 14, that the scribing unit 66 moves from side to side, as seen in FIG. 14, and that the movable block 200 moves back and forth, as seen in FIG. 14. The workpiece stage 63 may be so structured as to move back and forth as seen in FIG. 14. In that case, the scribing means and the shaving means fitted at the bottom of the scribing unit 66 shown in FIG. 14 needs to be so structured as to be integrally rotatable through 90° relative to the glass substrate surface. Specifically, a structure like that of the movable unit 410 shown in FIG. 41, which shows the eighteenth to twenty-first embodiments described later, is adopted. In the movable unit 410 shown in FIG. 41, reference numeral 430 represents a combination of two wheel cutters arranged so as to face each other for cutting a polarizer plate. By adopting this integrated structure, with the two wheel cutters replaced with a single cutter wheel for scribing, and with 460 replaced with a shaving means, it is possible to add the above-mentioned capability of 90° rotation. Furthermore, by adding the capability of 180° rotation, it is possible to remove the deposited film and scribe in both of the X and Y directions.

The shaving means 202 and the scribing means 14 start and stop shaving and scribing, respectively, with different timing. When, after shaving and scribing are complete, the scribing unit 66 returns to the stand-by position, the shaving means 202 and the scribing means 14 need to be released by being lifted up so as not to make contact or interfere with the glass substrate. Thus, the air cylinder that is provided in the stopper/pressing means 79 and of which the degree and timing of extension are controlled by an unillustrated controller needs to be provided separately at two different places to individually actuate the tip 79a for the shaving block and the tip 79b for the scribing block. In the ninth embodiment, as shown in FIG. 18, the shaving means 202 has the shaving cutter described in connection with the first embodiment fixed to the shaving block with cutter fitting screws 86. However, any of the shaving cutters used in the cutting methods described in connection with the first to sixth and eighth embodiments may be applied to the cutting apparatus of this embodiment. When the deposited film 1a is shaved, the tip of the shaving means 202 needs to be accurately positioned at the surface of the glass substrate 1. The vertical position of each tip can be set appropriately by screwing in or out the corresponding one of the stopper screws 80a or 80b. The vertical position of the tip of the shaving means 202 requires the finest positioning, and this tip needs to be positioned at the top surface of the glass substrate 1 immediately before the shaving step is started. Ultimately, the position of the tip is adjusted accurately by adjusting the micrometer screw 72. After the stopper screw 80 has been screwed in and out for adjustment, it is fixed with a nut 203. Moreover, in the ninth embodiment, as shown in FIG. 18, the shaving means 202 is fixed by being screwed into a groove formed in the shaving block 81. However, the cutting angle of the shaving means relative to the glass substrate surface may be made adjustable. Specifically, though not illustrated, this is achieved by separating the horizontal arm portion of the shaving block 81 so that its portion somewhat closer to the shaving means 202 than its own center is loosely fixed so as to be rotatable about a rotation shaft, and providing a mechanism that permits this portion to be clamped with a clamping means after the angle with which the shaving means 202 shaves the deposited film 1$a$ is adjusted to the optimum angle.

Next, the cutting apparatus of a tenth embodiment of the invention will be described. In the ninth embodiment, as shown in FIG. 16($a$), the shaving means 202 and the scribing means 14 are arranged in a row with respect to the direction in which the scribing unit moves, so that shaving of the deposited film and scribing are performed simultaneously as the scribing unit is moved along one path. In the tenth embodiment, the shaving means 202 and the scribing means 14 are arranged at an interval equal to the intervals at which scribing is performed to form strip-shaped sections. FIG. 16($b$) shows the positional relationship between the shaving block 81' and the scribing block 82' as seen in a plan view in this embodiment.

If it is assumed that the scribing unit moves in the direction indicated by an arrow in FIG. 16($b$) as scribing is performed to form strip-shaped sections, then the shaving block 81' needs to be disposed at the front in the movement direction so that the shaving step is performed first. The interval S1 between the shaving means 202 and the scribing means 14 is adjusted, as by adjusting the thickness of a spacer 204, to the intervals, i.e., the pitch, at which scribing is performed to form strip-shaped sections. Thus, this embodiment is the same as the ninth embodiment in that both shaving of the deposited film and scribing are performed as the scribing unit is moved along one path, but is different therefrom in that the scribing unit moves across a distance corresponding to the pitch to a groove where the shaving of the deposited film is already complete and then performs scribing along that groove. When a large-format glass substrate is scribed at a predetermined pitch, this embodiment requires the scribing unit to be moved two more times than does the ninth embodiment. However, as compared with the ninth embodiment, here, it is not necessary to extend the cutting apparatus in the direction in which the scribing unit moves, and this helps make the cutting apparatus compact in its width direction. Moreover, it is possible to dispose an appropriate waste shaving removing means with ample space at the rear in the movement direction of the shaving means 202, and this helps alleviate the effects of waste shavings that are left in the shaved grooves during scribing. In other respects, the cutting apparatus of this embodiment has basically the same structure as that of the ninth embodiment, and therefore overlapping explanations will not be repeated.

Figure 19:
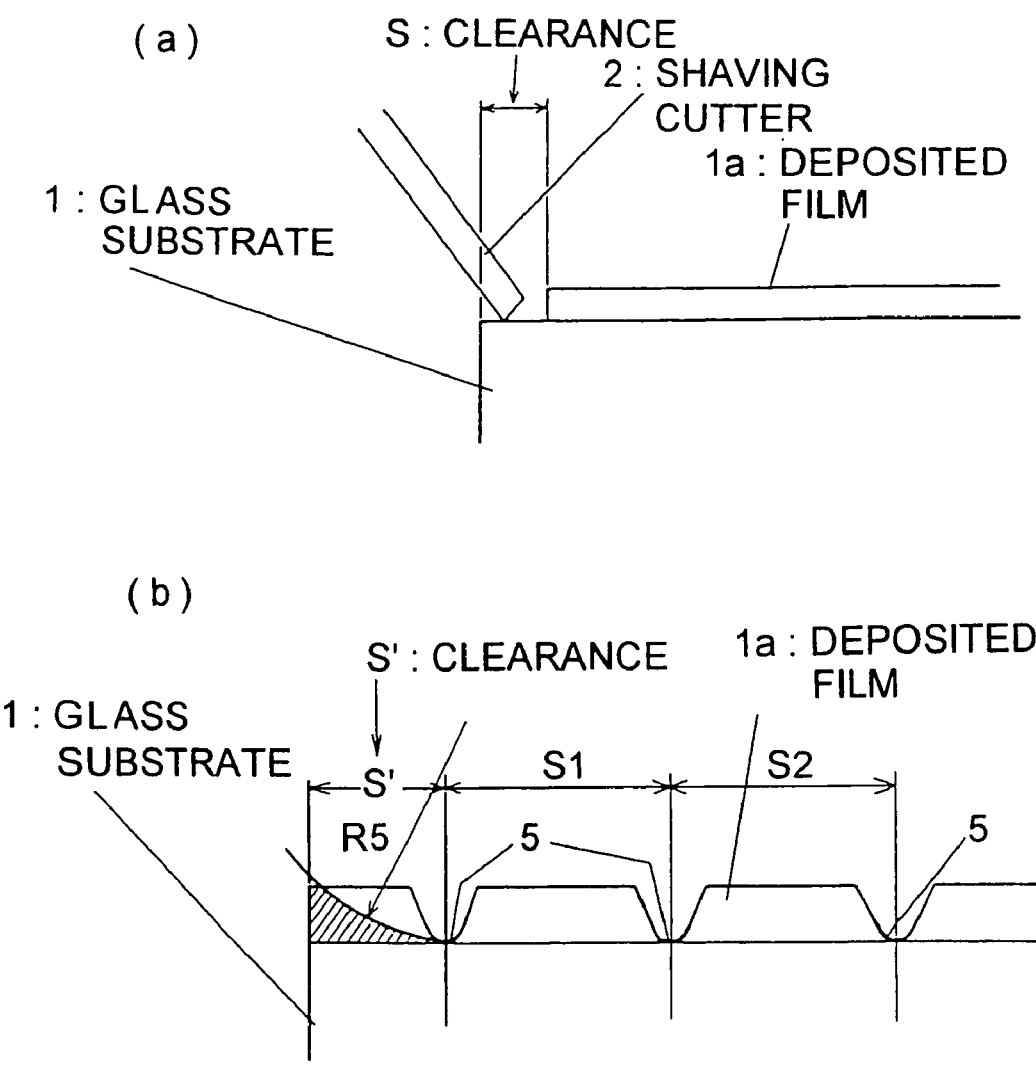
FIG. 19 is a diagram schematically illustrating the principles of the glass substrate cutting method of an eleventh embodiment of the invention and how a part of a deposited film is removed by an apparatus employing the method.

The glass substrate cutting method and apparatus of an eleventh embodiment of the invention will be described below with reference to FIG. 19. In the ninth embodiment, a detecting means for detecting an electric signal, which serves as a means for positioning the tip of the shaving cutter accurately at the top surface of the glass substrate at the start of the shaving step, is provided at the front of the shaving means in order to detect the position of the top surface of the deposited film, then correct the thickness of the deposited film by a controlling means such as programmable control, and then position the tip of the shaving means at the top surface of the glass substrate. However, with a deposited film 1$a$ 1 mm or more thick, variations in its thickness and other factors may cause the tip of the shaving means to be positioned above the glass substrate surface, leading to insufficient shaving of the deposited film, with the deposited film left at the bottom of the shaved groove, or may cause the tip of the shaving means to be positioned below the glass substrate surface, leading to interference of the tip of the shaving means with the edge of the glass substrate and, in the worst case, even to the destruction of the scribing unit. This problem is likely to arise especially at the edge of the glass substrate, i.e., when the deposited film 1$a$ starts being shaved. The eleventh embodiment is devised to overcome this problem. Specifically, a clearance portion (non-film-deposited portion) is formed along the edges of a large-format glass substrate to be shaved, and, when the glass substrate is cut apart, the non-film-deposited portion is discarded. In the method shown in FIG. 19($a$), a clearance portion S, where no deposited film is formed, is formed along the edges of a large-format glass substrate, i.e., the raw material. The dimension S varies according to the thickness of the deposited film and the control ability of the cutting apparatus, and is set equal to, for example, 2 to 10 mm. In this method, first, the tip of the shaving means is brought into contact with the glass surface within the portion S having the dimension S, and then the scribing unit is moved. Variations in the control of the tip of the shaving cutter are absorbed within the dimension S so that the tip is securely brought into contact with the glass substrate surface, and the deposited film can be shaved with a margin secured from the edge of the deposited film. In the method shown in FIG. 19($b$), instead of removing the deposited film in a clearance portion S beforehand, the fact that the deposited film is shaved with the tip of the shaving means loaded with a downward pressing force of about 1 to 40 N is exploited. The tip of the shaving means starts shaving the deposited film from a point near the edge of the film-deposited glass at the left of the figure, and then reaches the glass substrate surface within the portion S' while describing a curve R5 as shown in the figure. Part of the deposited film is left in the hatched portion in the figure, and therefore the portion S' is discarded when the glass substrate is cut apart. If FIG. 19($b$) is assumed to show scribing in the Y direction, then it shows how, after shaving and scribing have been performed in the X direction to form the shaved groove 5, shaving and scribing are performed in similar manners in a direction 90° apart therefrom to form a grid-like pattern. In this embodiment, when the glass substrate is scribed into a grid-like pattern, it is necessary to form the clearance portion S or S' all around the edges in both of the methods (a) and (b). S1 and S2 represent the pitch at which scribing is performed to form strip-shaped sections, and are usually set equal to each other.

The eleventh embodiment applies to both a cutting method and a cutting apparatus as described above. In a method for scribing a film-deposited glass, even in an extreme case in which the deposited film is shaved manually, there arises the problem of the deposited film being left unshaved at the edges of a large-format glass substrate before scribing and cutting. This problem is overcome by forming a non-film-deposited portion along the edges as described in the eleventh embodiment. On the other hand, in the cutting apparatus of the ninth embodiment, the tip of the shaving means is positioned at the glass surface of the glass substrate at the start of shaving by detecting the position of the surface of the deposited film by the use of a detecting means, then correcting the thickness of the deposited film, and then setting the vertical position of the tip of the shaving means at the start of shaving. This, however, is difficult to realize with satisfactory accuracy when there are large variations in the thickness of the deposited film. This problem also is solved by forming a non-film-deposited portion along the edges of the glass substrate as in the eleventh embodiment. This greatly alleviates the burden on the design and construction of the cutting apparatus.

Figure 20:
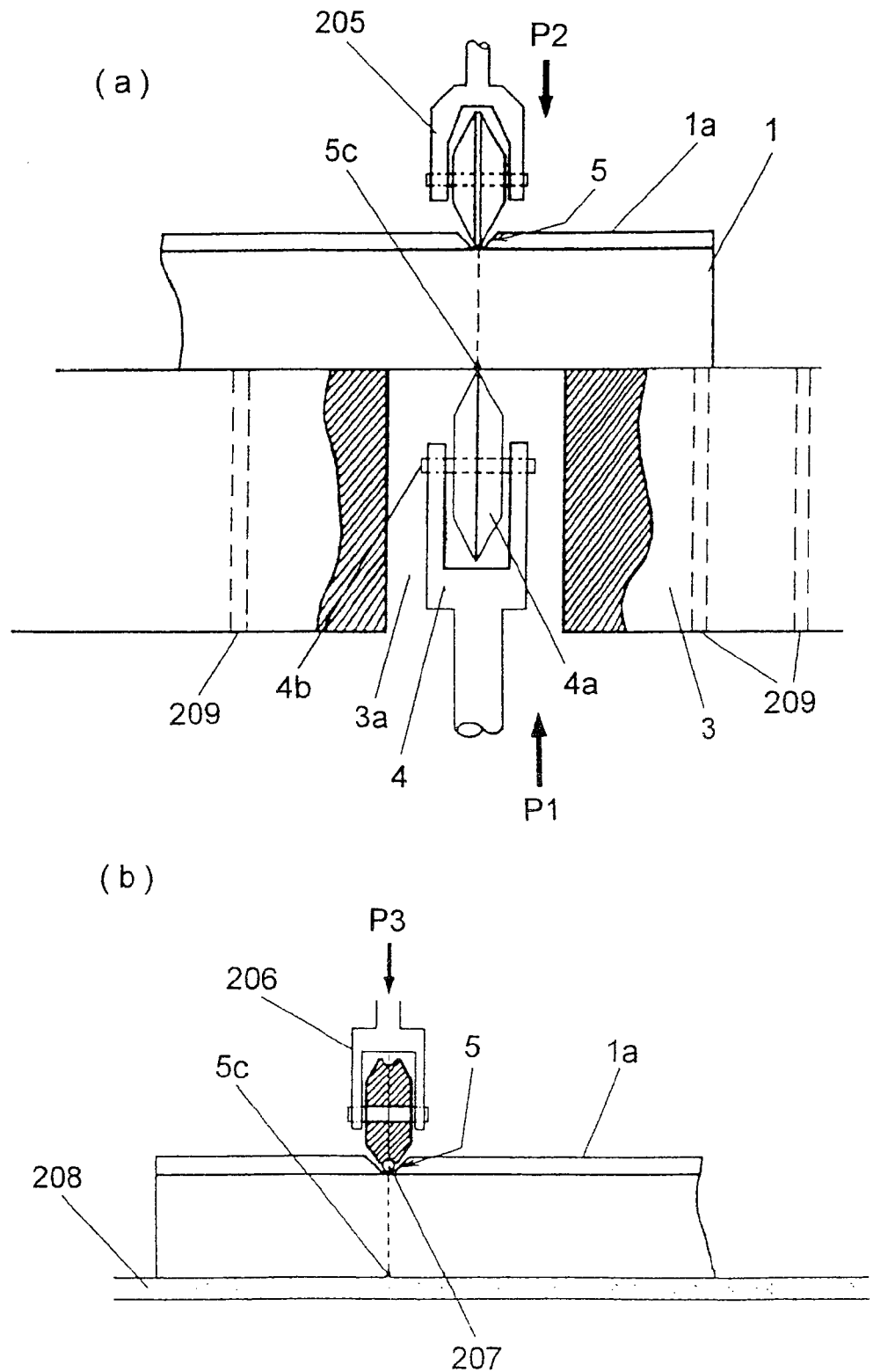
FIG. 20 is a diagram schematically illustrating the principles of the glass substrate cutting method of a twelfth embodiment of the invention and how a part of a deposited film is removed and how a crack is formed by an apparatus employing the method.

FIG. 20 is a diagram illustrating the principles of the cutting apparatus of a twelfth embodiment of the invention. In this embodiment, the cutting method of the seventh embodiment described earlier with reference to FIG. 9 is applied to a cutting apparatus. In the cutting apparatus of this embodiment, as shown in FIG. 20(a), in the workpiece stage 3, there are formed a plurality of negative pressure supplying paths 209 in an appropriate arrangement to permit the glass substrate 1 to be secured by an unillustrated negative pressure supplying means such as vacuum, and there are also formed elongate openings 3a at intervals corresponding to the pitch of scribing to permit the scribing means 4 to scribe the glass substrate 1 from below the bottom surface thereof. In the cutting apparatus of this embodiment, the tip of the shaving means for shaving the deposited film 1a formed on the glass substrate 1 and the tip of the scribing means 4 are located on a vertical line as seen from the direction of their movement, and move together. Thus, a scribed line 5c is formed right below the shaved groove 5 formed by the shaving means. In this embodiment, cutting needs to be performed, in the glass substrate cutting step after scribing, along the shaved groove 5 formed in the deposited film. Thus, as shown in FIG. 20(a), the cutter wheel 4a at the tip of the scribing means 4 needs to be located, as described above, vertically right below the shaved groove 5 as seen from the direction of its movement, but not so accurately in the frontward/backward direction, i.e., in the direction of the movement of the cutter. The glass substrate needs to be scribed with a load of about 10 N applied thereto, depending on the thickness of the glass. Thus, in a cutting apparatus in which the glass substrate is scribed from below, the upward pressing force exerted by the scribing means 4 may cause the glass substrate 1 to come off the chucking means provided on the workpiece stage 3. To prevent this, a balance wheel 205 shown in FIG. 20(a) for balancing with the load is disposed immediately at the rear of the shaving means in the direction of its movement. The balance wheel 205 has, at its tip, a freely rolling wheel having substantially the same dimensions and shape as the cutter wheel 4a at the tip of the scribing means 4 and formed of a soft material such as polyurethane rubber. To stably secure the glass substrate 1 on the workpiece stage 3, the balance wheel 205 is located immediately at the rear of the shaving means so as to move as if following the shaving means while applying a pressing force P2 that balances with the scribing load P1. Using a weight-shaped load applying means to apply a load directly to the film-deposited surface to reinforce the force with which the glass substrate is secured may destroy or scratch the protective film. By contrast, in this embodiment, at the same time that the glass substrate is scribed from below the bottom surface thereof, the load balance wheel, loaded with the desired pressing force, is made to roll along the bottom of the shaved groove formed on the top surface of the glass substrate by the shaving means shaving the film-deposited surface. This makes it possible to perform scribing with the glass substrate stably secured, without the risk of touching and thereby scratching or otherwise damaging the deposited film 1a. In FIG. 20(a), the shaving means is omitted.

After scribing, the glass is cut apart (separated) by applying a load from below the surface opposite to the scribed surface so as to develop the crack in the scribed line. Accordingly, in the ninth to eleventh embodiments, a scribed line is formed along the bottom of the shaved groove 5, and a load is applied from below the surface opposite to the film-deposited surface to achieve cutting. By contrast, in the twelfth embodiment, at the same time that scribing is performed on the bottom surface of the glass substrate, the deposited film right above the scribed line is shaved to form a shaved groove having a cross section with the desired dimensions and shape. Then, as shown in FIG. 20(b), a wire 207 formed of resin, such as urethane, or metal and having appropriate dimensions is laid in the shaved groove 5 right above the scribed line 5c, and a roller 206 having, at its tip, a groove that moderately engages with the wire is placed on the wire so as to roll along it while applying, through the wire, a load P3 of 50 to 200 N. In this way, it is possible to realize a cutting apparatus that permits the shaving of a deposited film from a glass substrate and the scribing and cutting of the glass substrate without reversing the glass substrate. Reference numeral 208 represents a cushion material used at the time of cutting. In this embodiment, the cleaving of glass after scribing may be integrated into a cutting apparatus provided additionally with a cleaving function which is capable of both scribing and cleaving, or glass may be first scribed on a cutting apparatus and then cleaved on a cleaving machine. In this embodiment, in any of the steps from the scribing to cutting of the glass substrate, including the securing thereof on the apparatus, there is no need at all to touch or press the film-deposited surface. This makes it possible to maintain and protect the quality of the deposited film. Instead of the roller 206, a plate-shaped pressing member that positionally fits the bottom of the shaved groove 5 may be used to achieve cutting.

Figure 21:
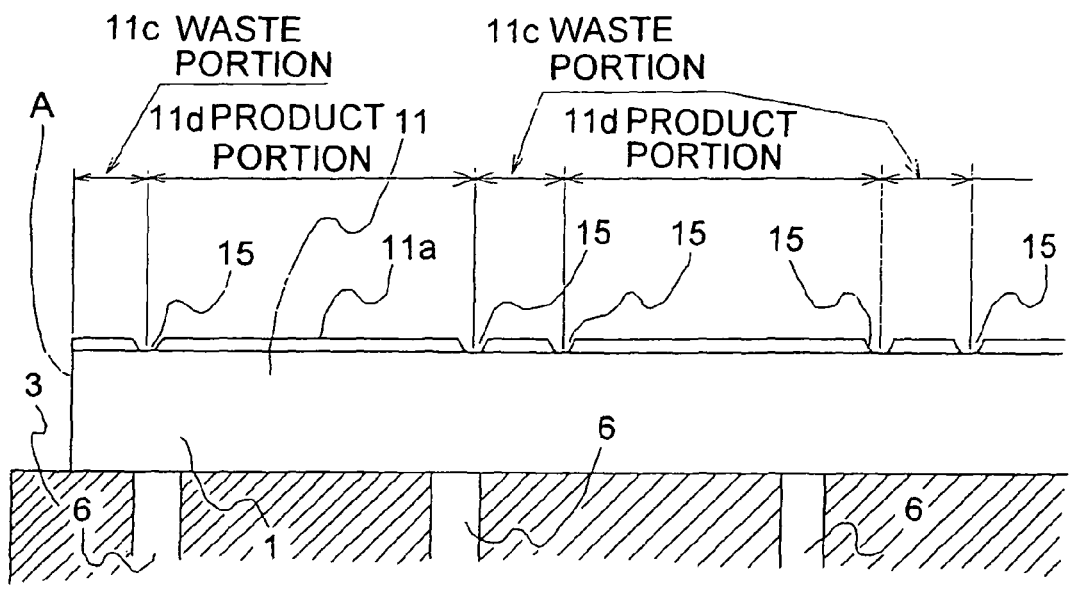
FIG. 21 is a sectional view showing how parts of a deposited film are removed in the glass substrate cutting method of a thirteenth embodiment of the invention.
Figure 22:
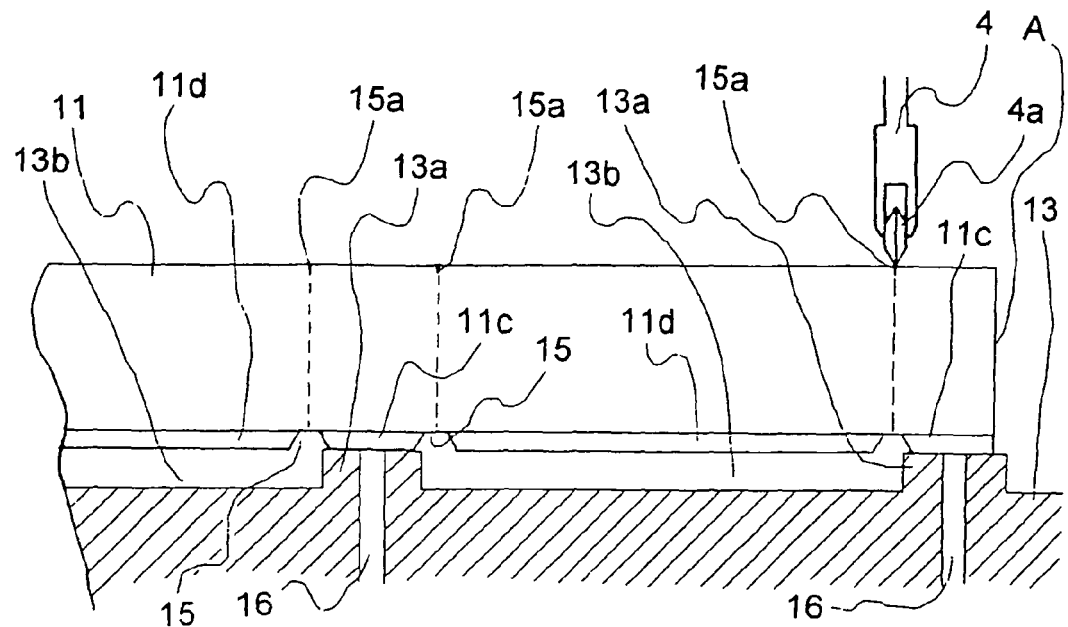
FIG. 22 is a sectional view showing how cracks are formed in the cutting method of the thirteenth embodiment.

FIGS. 21 and 22 show a thirteenth embodiment of the invention. This embodiment is characterized in that, in principle, the step of shaving the deposited film and the step of scribing are performed as separate steps, and that, in the step of scribing, which is the downstream step, waste portions 11c are formed on the film-deposited surface so that the glass substrate is supported, at the waste portions 11c formed on the film-deposited surface thereof, on projections 13a formed on the workpiece stage shown in FIG. 22.

FIG. 21 illustrates how the deposited film 11a is shaved in such a way as to separate product portions, which are to be used as products such as liquid crystal display devices, and waste portions. FIG. 22 shows how scribing is performed on the opposite surface of the glass substrate, right below (in the positional relationship shown in FIG. 22, right above) the shaved groove, after the deposited film 11a is shaved in FIG. 21.

Now, the workings and other features of this embodiment will be described with reference to what is shown in the figures. The glass substrate 11, like the ones used in the embodiments described above, has a deposited film 11a formed on one surface thereof. In the workpiece stage 3, there are formed a plurality of suction paths 6 at a predetermined pitch to permit the glass substrate 11 to be secured by a negative pressure supplying means such as vacuum. From and relative to one edge, indicated as A, of the glass substrate 11, shaved grooves 15 are formed by an unillustrated shaving cutter at pitches corresponding to the width-direction dimensions of the waste portions 11c and the product portions 11d. How the shaved grooves 15 are formed is the same as in the first and second embodiments, and therefore detailed explanations will not be repeated. The dimensions of the waste portions 11c are determined according to the thicknesses of the glass substrate and the deposited film 11a and the conditions related to mechanical strength such as the dimensions of the product portions 11d and the dimensions of the suction paths 16 shown in FIG. 22. The waste portions 11, which will eventually be discarded, should be made as small as possible. However, in the step of breaking (cutting) the glass substrate, in a case where it is cut apart by applying a load to the surface opposite to the scribed surface, if the waste portions are made too small as compared with the thickness of the glass substrate 11, it may be difficult to perform cutting. This needs to be taken into consideration when the dimensions of the waste portions are determined, while seeing to it that they are larger than the minimum required dimensions of the workpiece stage projections 13a shown in FIG. 22 and described later. The dimensions of the product portions 11d are determined according to the size of the products, such as liquid crystal display devices, with finishing margins added thereto.

FIG. 22 illustrates how, after the shaving step shown in FIG. 21, the glass substrate 11 is turned upside down and secured on the workpiece stage 13 so that the surface opposite to the shaved surface is scribed. In this embodiment, the workpiece stage 13 used to perform scribing is different from the workpiece stage 3 shown in FIG. 21, and has projections 13a and recesses 13b arranged, as shown in the figure, alternately in positions corresponding to the dimensions and pitch of the waste portions formed in the shaving step. The top surfaces of the projections 13a are level, and securely support the film-deposited-surface side of the waste portions 11c shown in FIG. 21 from which the deposited film 11a has been shaved and removed. Here, secure supporting is achieved through the suction paths 16 by the same negative pressure supplying means as used conventionally. In this state, scribed lines are formed by a scribing cutter 4 right above, as seen in the positional relationship shown in FIG. 22, the shaved grooves 15 formed on the glass substrate 11. Scribing right above the shaved grooves 15 is achieved as follows. Relative to the edge A, by the use of a combination of a well-known detecting means, such as an optical sensor, or a positioning jig, a means for driving the scribing cutter 4, such as a ball screw or a timing belt driven by a servo motor, and a controlling means, such as a numerical controller, scribed lines can easily be formed at desired places on the opposite surface of the glass substrate corresponding to the places where the shaved grooves 11a shown in FIG. 21 are formed. The recesses 13b help prevent the film-deposited portions of the product portions 11d from touching the workpiece stage and thereby being scratched or destroyed.

In this embodiment, scribing is performed on the surface of the glass substrate opposite to the film-deposited surface. This makes it possible to perform scribing without being affected by the deposited film in the scribing step. Moreover, the deposited film on the surface opposite to the scribed surface is shaved to form grooves at places corresponding to the scribed lines. Thus, even the step of breaking the glass substrate is not affected by the presence of the deposited film layer. This embodiment is described above as a method in which first the step of shaving the deposited film is performed and then scribing is performed. However, since, as described above, it is easy to control where to form the shaved grooves 15a and the scribed lines 15a by the use of the controlling means mentioned above, it is also possible to perform the scribing step shown in FIG. 22 first.

Figure 23:
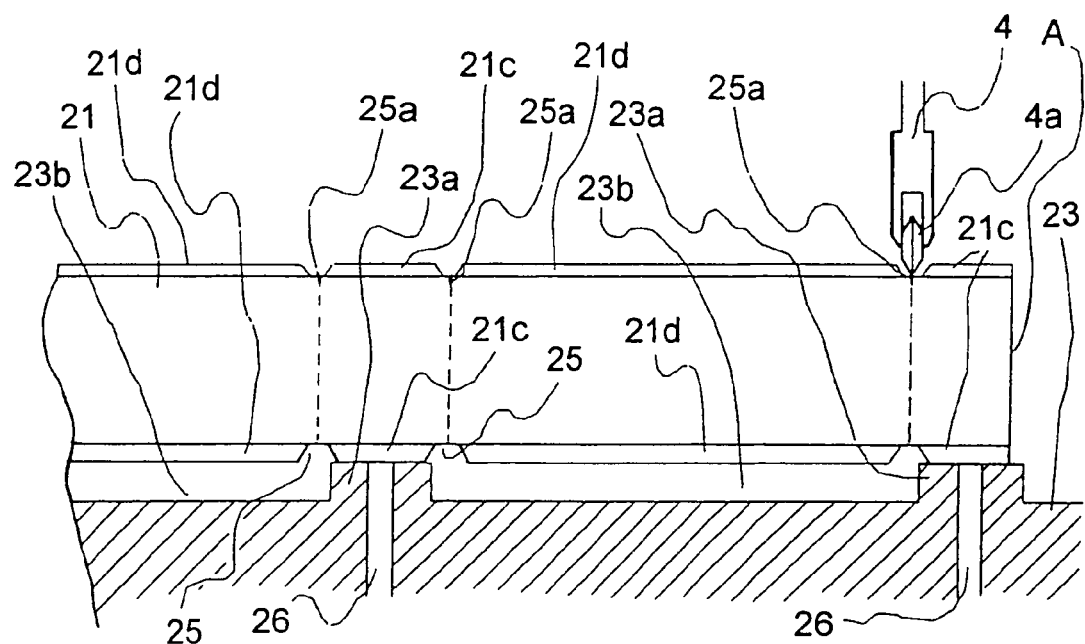
FIG. 23 is a sectional view showing how parts of a deposited film are removed and how cracks are formed in the cutting method of a fourteenth embodiment of the invention.

Next, a fourteenth embodiment of the invention will be described with reference to FIG. 23. The third embodiment described above deals with the shaving of a deposited film and scribing performed on a glass substrate having a deposited film formed on one surface thereof. This embodiments deals with a cutting method for a glass substrate having deposited films formed on both surfaces thereof. This embodiment is the same as the third embodiment in that a glass substrate 21 is divided into waste portions 21c and product portions 21d. A workpiece stage 23 having projections 23a and recesses 23b formed at places dimensionally corresponding to those portions is used in both of the shaving and scribing steps. The shaving of the deposited films is performed, by the use of the workpiece stage 23 having the projections 23a and the recesses 23b formed as shown in FIG. 23, by first shaving the deposited film on one surface of the glass substrate having the deposited films formed on both surfaces thereof, and then turning the glass substrate 21 upside down and shaving the deposited film on the opposite surface. Vertical alignment of the places at which to form shaved grooves and the places at which to form scribed lines on both surfaces is achieved easily relative to the edge A by the use of the controlling means mentioned above. In this embodiment, it is possible to shave the deposited film on one surface and then on the opposite surface and then perform scribing on one surface and then on the opposite surface; alternatively, it is also possible to shave the deposited film and then perform scribing on one surface and then perform those two steps on the opposite surface.

As described above, in the embodiments described hereinbefore, strip-shaped portions of a deposited film as wide as necessary to form cracks are removed, and then cracks for cutting are formed along the exposed strip-shaped regions on a glass substrate. In this way, it is possible to realize a cutting method and a cutting apparatus that permit the cutting of a glass substrate having any type of deposited film formed thereon, from a thin film such as an overcoating film or transparent electrode to a film such as a polarizer plate or a deposited film up to 1 to 2 mm thick such as a resin film or protective film, without being affected by the presence of the deposited film. It is to be understood that the present invention may be carried out in any other manner than specifically described above as embodiments, and that various variations and modifications are possible within the scope of the invention.

Figure 24:
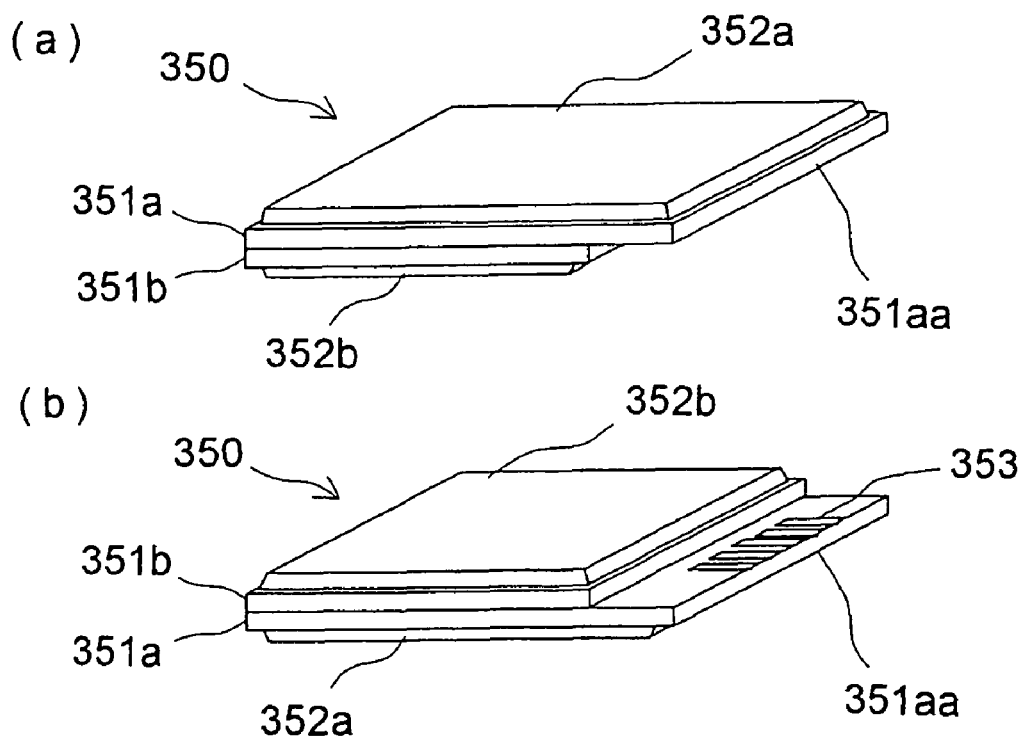
FIG. 24 is a perspective view showing the appearance of the liquid crystal panel of a fifteenth embodiment of the invention.
Figure 25:
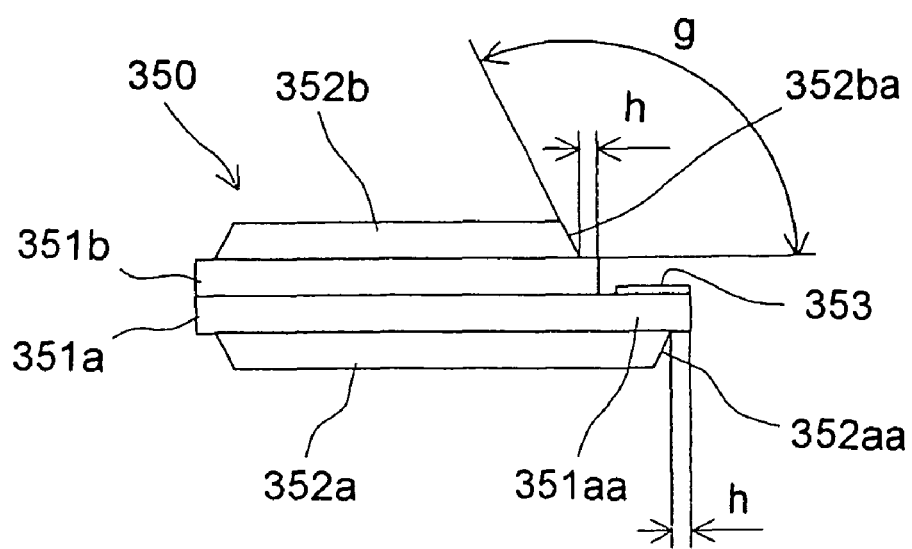
FIG. 25 is a vertical sectional view of the liquid crystal panel of the fifteenth embodiment.

In the following part of the specification, liquid crystal panels and apparatuses for fabricating them according to the invention will be described with reference to the drawings. First, the liquid crystal panel of a fifteenth embodiment of the invention will be described in detail. FIG. 24 is a perspective view showing the appearance of the liquid crystal panel of the fifteenth embodiment, with the obverse side shown at (a) and the reverse side shown at (b), and FIG. 25 is a vertical sectional view of the liquid crystal panel.

This liquid crystal panel 350 is composed of a pair of substrate cells 351a and 351b bonded together with liquid crystal sealed in between (here, the substrate cell 351a is a TFT substrate and will hereinafter be referred to as the "TFT substrate cell" also; the substrate cell 351b is a color filter substrate and will hereinafter be referred to as the "color filter substrate cell" also). One end of the TFT substrate cell 351a protrudes from one end of the color filter substrate cell 351b to form a protruding portion 351aa, and connection terminals 353 by way of which the liquid crystal panel is driven are formed on the inner surface of the protruding portion 351aa. To these connection terminals 353 is connected an FPC (flexible printed circuit) or COG (chip on glass) that, when the liquid crystal panel 350 is incorporated in a liquid crystal display device, receives electric signals and achieves display on the liquid crystal panel 350.

The liquid crystal panel 350 is designed for use in a backlit liquid crystal display device, and thus has polarizer plates 352a and 352b bonded to the outer surfaces of the substrate cells 351a and 351b, respectively, almost all over the entire areas thereof (here, the polarizer plate 352a is located on the side of the TFT substrate cell 351a and will hereinafter be referred to as the "TFT-side polarizer plate cell" also; the polarizer plate 352b is located on the side of the color filter substrate cell 351b and will hereinafter be referred to as the color-filter-side polarizer plate cell" also). From the viewpoint of the functions required of the polarizer plates 352a and 352b, they simply have to cover the display area (not shown); that is, they have only to be made substantially equally large and arranged so as to face each other with the substrate cells 351a and 351b sandwiched in between. In the liquid crystal panel 350 of this embodiment, however, the TFT-side polarizer plate cell 352a is extended so as to cover the outer surface of the protruding portion 351aa. The reason is as follows.

The substrate cells 351a and 351b constituting the liquid crystal panel 350 are each very thin, for example about 0.4 to 0.7 mm when formed of glass. Thus, while they have increased mechanical strength where they are bonded together to have twice the thickness, i.e., over and around the display area, the protruding portion 351aa, where the TFT substrate cell 351a alone appears and is as thick as it is, has low mechanical strength. On the other hand, the TFT-side polarizer plate cell 352a is about 0.2 to 0.6 mm thick, and this thickness is exploited to reinforce the protruding portion 351aa. This is the reason that the TFT-side polarizer plate cell 352a is extended so as to cover the outer surface of the protruding portion 351aa. This increases the mechanical strength of the protruding portion 351aa. As a result, when the liquid crystal panel is transported from one place to another or assembled into a liquid crystal display device, even if it is hit or dropped, the protruding portion 351aa is less likely to be cracked or deformed, or broken at a corner.

The mechanical strength of the protruding portion 351aa can be satisfactorily increased by leaving 1 mm or less as a distance h (see FIG. 25) between the edge of the TFT-side polarizer plate cell 352a and the edge of the protruding portion 351aa, i.e., the width over which glass is exposed outward. Similar widths are secured between the other edges of the polarizer plates 352a and 352b and the edges of the substrate cells 351a and 351b.

Moreover, the edges 352aa and 352ba of the polarizer plates 352a and 352b are all so formed as to have a vertical section that becomes thinner and thinner toward the substrate cells 351a and 351b. Specifically, these edges 352aa and 352ba are formed so as to have inclined or curved surfaces by a laser radiating mechanism 420 or cutting mechanism 460 provided in the liquid crystal panel fabricating apparatus that will be described in detail later. This prevents, when the liquid crystal panel 350 is transported from one place another or assembled into a liquid crystal display device, the edges 352aa and 352ba (especially at corners) of the polarizer plates 352a and 352b from being caught accidentally, and thereby prevents exfoliation. In a case where protective films are formed on the outer surfaces of the polarizer plates 352a and 352b so as to be integral therewith, the above structure prevents exfoliation of those films from the polarizer plates 352a and 352b.

Now, the preferred configuration of the edges 352aa and 352ba will be described. To evaluate various configurations of the edges 352aa and 352ba, by using, as a representative, the liquid crystal panel fabricating apparatus 400 of the eighteenth embodiment described in detail later, experiments were conducted to see how varying the shape of the cutting edge of the blade 461 of its cutting mechanism 460 (as by interchanging blades having C-shaped and trapezoidal cross sections as shown in FIGS. 32(a) and 32(b)) affects the substrate cells 351a and 351b. The results are shown in FIG. 26.

FIG. 26 is a diagram schematically showing the relationship between the inclination angle g of the edges of the polarizer plates 352a and 352b shown in FIG. 25 (i.e., the rising angle of the side cutting edges of the blade 461) and the resulting properties, i.e., how the angle g affects the polarizer plates 352a and 352b and the substrate cells 351a and 351b. For angles from 90° to over 135°, the following four items were evaluated: the mechanical strength of the protruding portion 351aa, delta-shaped chipping in the polarizer plates 352a and 352b, exfoliation of protective films, and residues of the adhesive bonding together the substrate cells 351a and 351b and the polarizer plates 352a and 352b. For different ranges of inclination angles g, the result of the evaluation of each item was classified into one of three grades, specifically good, fair, and poor. As shown in FIG. 26, when the inclination angle g is in the range of from over 90° to 135°, good or fair properties are obtained in all of the items. Thus, the preferred configuration of the edges 352aa and 352ba is forming them as surfaces inclined at an angle in that range.

It is to be noted that the preferred condition found out in the above experiments applies in cases where the edges 352aa and 352ba are formed so as to have inclined surfaces. Needless to say, the edges 352aa and 352ba may be formed to have curved surfaces instead so long as they have a vertical section that becomes thinner and thinner toward the substrate cells 351a and 351b. The substrate cells 352aa and 352ba may be formed of any other material than glass. Where fabrication efficiency is not given the highest priority, the bonding of the polarizer plates 352a and 352b may be achieved by first cutting apart individual substrate cells 351a and 351b and then bonding thereto polarizer plates already cut into predetermined sizes.

Now, liquid crystal panel fabricating apparatuses according to the invention which are suitable to fabricate the liquid crystal panel 350 described above will be described with reference to the drawings. How the liquid crystal panel 350 is fabricated will be described specifically last.

Figure 27:
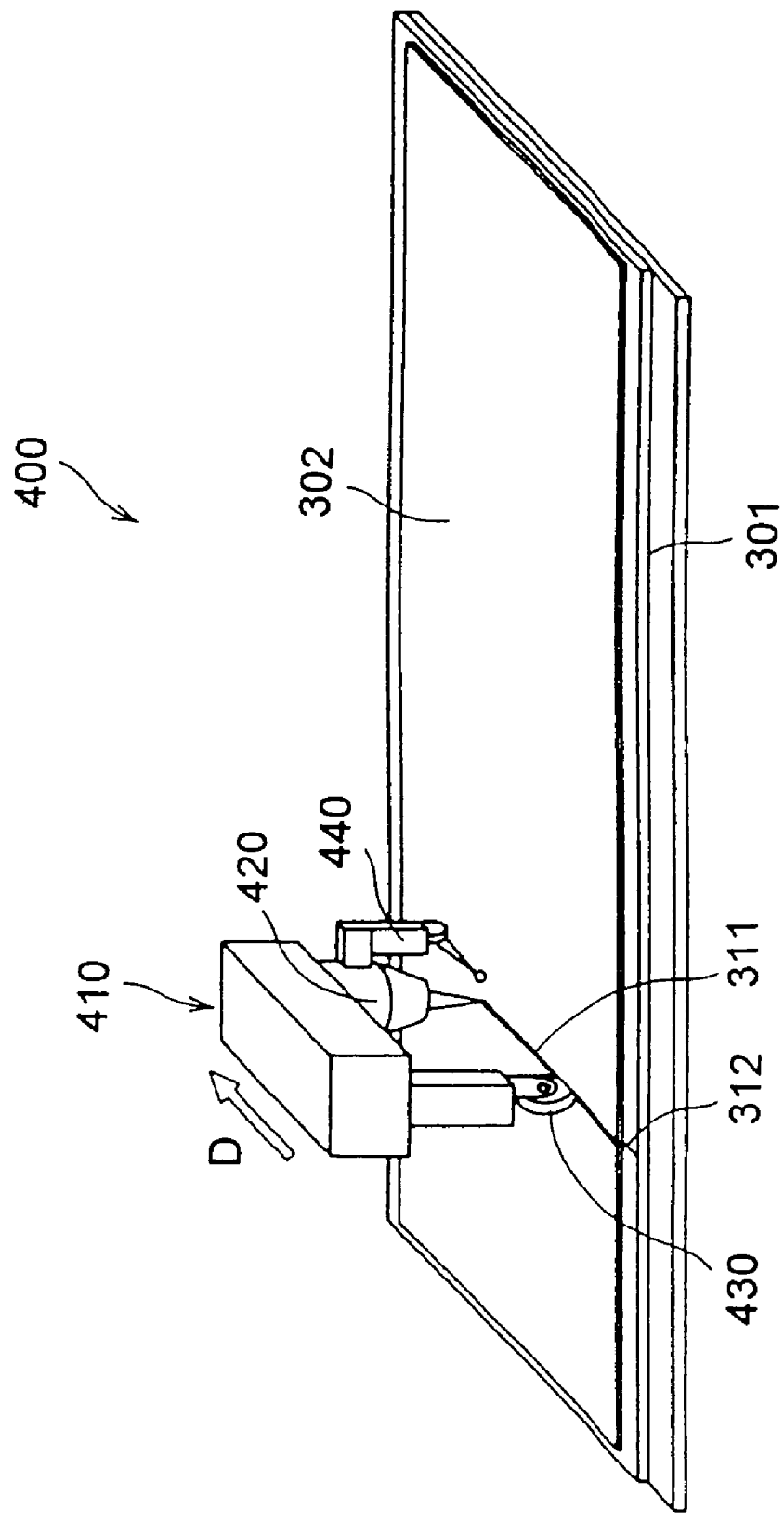
FIG. 27 is a perspective view schematically showing the appearance of the liquid crystal panel fabricating apparatus of a sixteenth embodiment of the invention.
Figure 28:
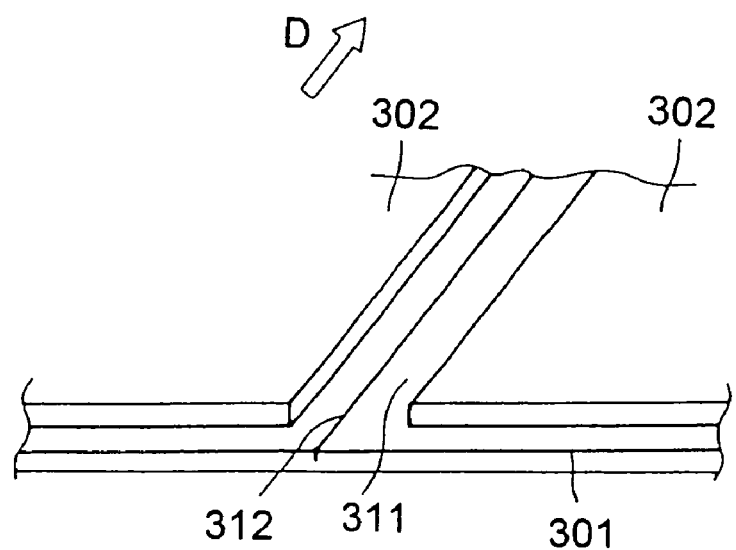
FIG. 28 is an enlarged view of a principal portion of the glass substrate.

First, the liquid crystal panel fabricating apparatus of a sixteenth embodiment of the invention will be described. FIG. 27 is a perspective view schematically showing the appearance of the liquid crystal panel fabricating apparatus of the sixteenth embodiment, and FIG. 28 is an enlarged view of a principal portion of the glass substrate. As shown in FIG. 27, the liquid crystal panel fabricating apparatus 400 is composed essentially of a bed (not shown) serving as a workpiece stage, on which a strip-shaped glass substrate 301 having a polarizer plate 302 bonded on the top surface thereof is placed, and a movable unit 410 horizontally movable over the bed. The movable unit 410 has a laser radiating mechanism 420, a wheel cutter 430 for scribing, and a distance sensor 440 fitted thereto so as to protrude downward. These move together with the movable unit 410.

The laser radiating mechanism 420 is a $CO_2$ laser device as used in a common laser cutting/shaping machine, and emits a high power laser beam. The wheel cutter 430, as will be described later, forms cracks in the glass substrate 301 to permit it to be cut apart. The wheel cutter 430 has a diameter u1 of about 2.5 mm, and has an obtuse cutting edge angle w1 of about 120 to 150° (see FIG. 29). The wheel cutter 430 is supported through a spring or air spring on the movable unit 410 so as to apply a predetermined pressing force to the glass substrate 301. The distance sensor 440 is a touch sensor for detecting the displacement of the top surface of the polarizer plate 302 on the glass substrate 301 placed on the bed, and is used to keep constant the distances from the laser radiating mechanism 420 and the wheel cutter 430 to the top surface of the polarizer plate 302. This control is performed to stabilize the focus of the laser beam emitted by the laser radiating mechanism 420 and to stabilize the pressing force exerted by the wheel cutter 430. Incorporating these, the movable unit 410 is moved at a speed of about 200 to 500 mm/sec, which is the appropriate speed at which to move the wheel cutter 430. Needless to say, the laser radiating mechanism 420 is supposed to yield a laser output sufficient to cope with that speed.

Next, the operation of the liquid crystal panel fabricating apparatus 400 described above will be described. As shown in FIG. 27, the movable unit 410 moves in the direction indicated by an arrow D along the boundary between cells on the glass substrate 301. Here, the laser radiating mechanism 420, radiating a laser beam toward the polarizer plate 302, moves ahead of the wheel cutter 430. Thus, the portion of the polarizer plate 302 irradiated with the laser beam is melted and removed by heat, exposing the glass substrate 301 there so as to form a strip-shaped region 311. Following the laser radiating mechanism 420, the wheel cutter 430 moves along the strip-shaped region 311 and forms there a crack 312 for cutting (hereinafter referred to as a "scribed line" also) (see FIG. 28).

In this way, the crack 312 is formed along the boundary between cells on the glass substrate 301. Thereafter, when a load is applied to the glass substrate 301 as required, the glass substrate 301 readily breaks apart along the crack 312, producing liquid crystal panels. Even without a load applied to the glass substrate 301, when the crack 312 is formed, it may immediately develop to cause the glass substrate 301 to break apart. In this case also, the glass substrate 301 is cut apart along the crack 312. In practice, for higher fabrication efficiency, the movable unit 410 is moved horizontally along all of a plurality of boundaries between cells to repeat the above-described operation of the liquid crystal panel fabricating apparatus 400, then the glass substrate 301 is turned upside down, then scribing is performed also on the reverse side of the glass substrate 301 by the use of the wheel cutter 430, and then the glass substrate 301 is cut apart. In a case where a polarizer plate 302 is bonded also to the reverse side, the above-described operation of the liquid crystal panel fabricating apparatus 400 is performed also on this side.

As described above, the liquid crystal panel fabricating apparatus 400 is highly effective in efficiently producing high-quality liquid crystal panels because it prevents a glass substrate 301 from breaking at inappropriate places and prevents a polarizer plate 302 from exfoliating accidentally even when dealing with a glass substrate 301 having a polarizer plate 302 bonded thereto.

The laser radiating mechanism 420 may be of any other type than a CO2 laser device. The wheel cutter 430 may have any other shape and dimensions. The distance sensor 440 may be of any other type than a touch sensor.

Figure 29:
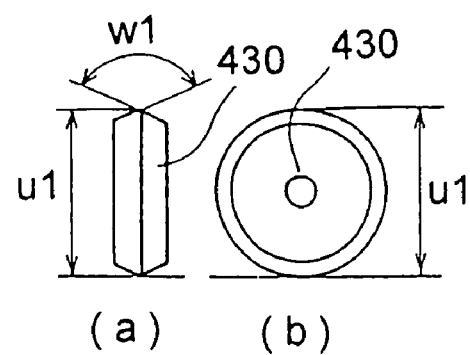
FIG. 29 is an external view of the wheel cutter for scribing.
Figure 30:
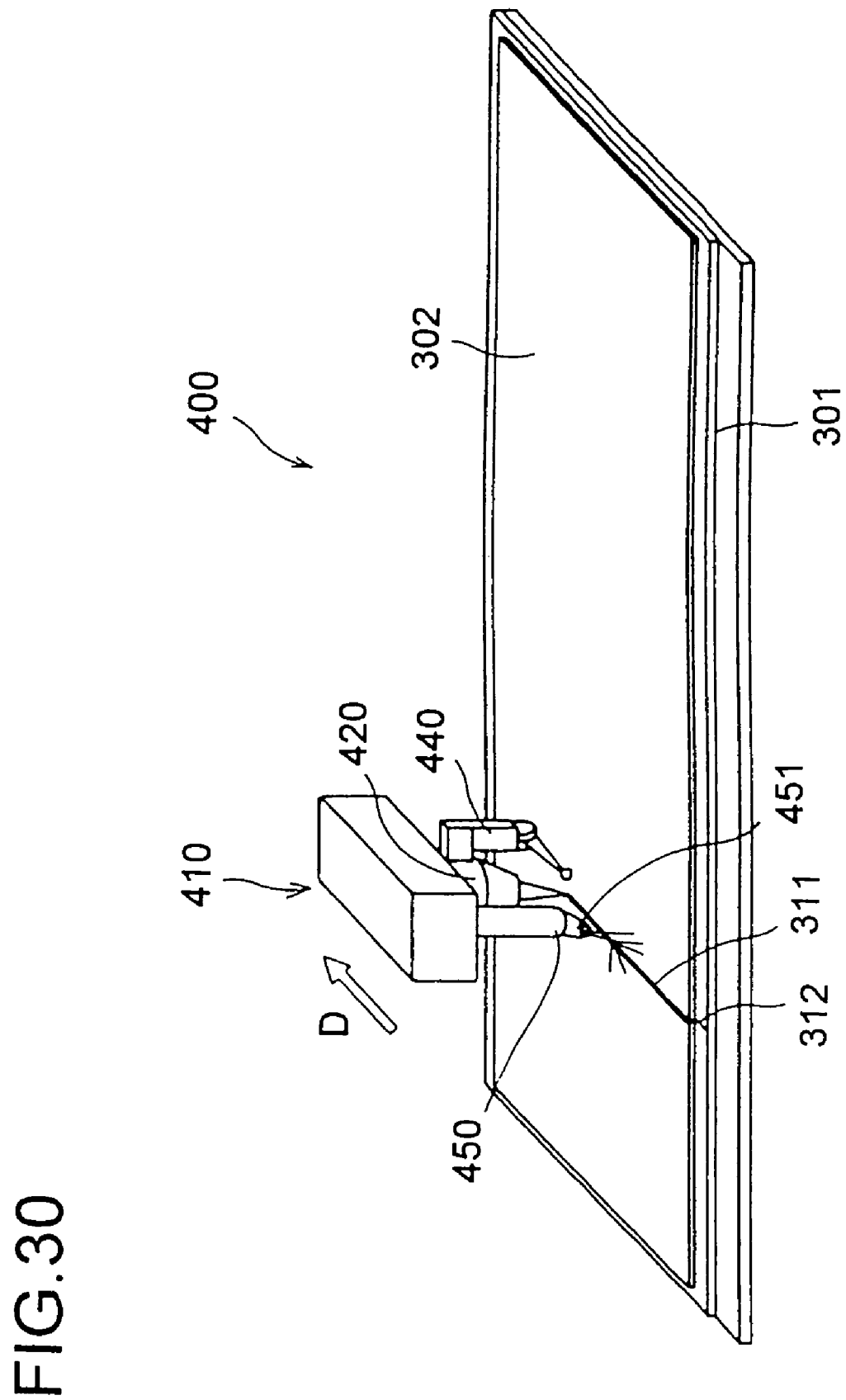
FIG. 30 is a perspective view schematically showing the appearance of the liquid crystal panel fabricating apparatus of a seventeenth embodiment of the invention.

Next, the liquid crystal panel fabricating apparatus of a seventeenth embodiment of the invention will be described with reference to FIG. 30. In this figure, such portions as have the same names and serve the same purposes as in FIGS. 27 to 29 are identified with the same reference numerals, and overlapping explanations will be omitted. This applies also to the eighteenth to twenty-first embodiments described later. The seventeenth embodiment differs from the sixteenth embodiment in that the wheel cutter 430 is replaced with a gas spraying mechanism 450. As shown in FIG. 30, the movable unit 410 has, in the stage following the laser radiating mechanism 420, a gas spraying mechanism 450 having a nozzle 451 through which a gas is sprayed to the strip-shaped region 311 on the glass substrate 301. The gas sprayed through the nozzle 451 is, for example, compressed air or an inert gas (such as nitrogen).

This liquid crystal panel fabricating apparatus 400 operates basically in the same manner as that of the sixteenth embodiment described above, but operates differently therefrom when forming scribed lines. The difference is as follows. The laser beam radiated from the laser radiating mechanism 420 not only heats and melts and thereby removes a portion of the polarizer plate 302, but simultaneously heats the strip-shaped region 311 exposed on the glass substrate 301 as a result, making the strip-shaped region 311 hot. The hot strip-shaped region 311 is then rapidly cooled by the gas sprayed from the nozzle 451 of the gas spraying mechanism 450, which follows the laser radiating mechanism 420. This causes the strip-shaped region 311 to contract and produce a crack. In this embodiment, this crack is used as the crack 312.

Figure 31:
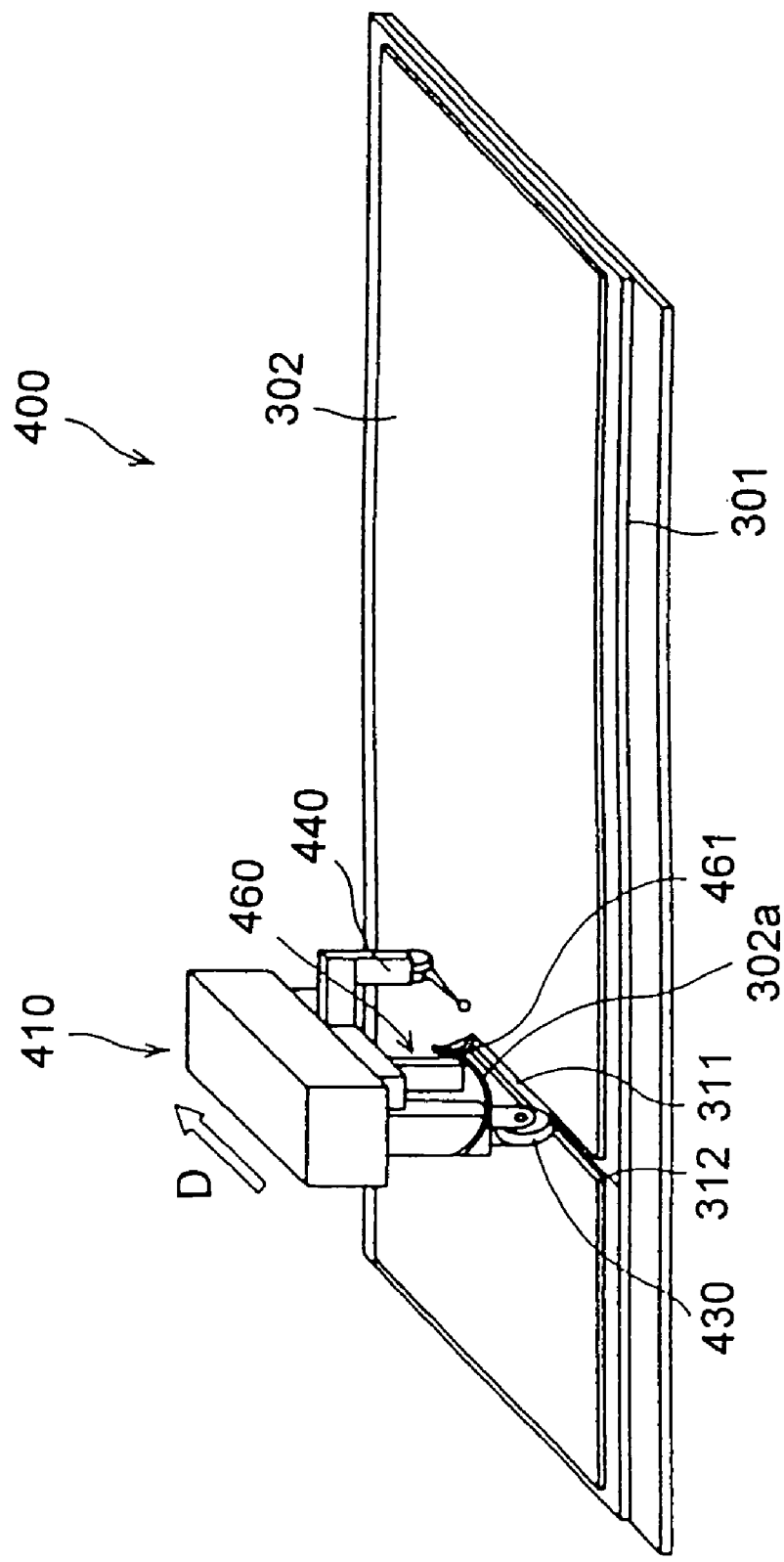
FIG. 31 is a perspective view schematically showing the appearance of the liquid crystal panel fabricating apparatus of an eighteenth embodiment of the invention.

Next, the liquid crystal panel fabricating apparatus of an eighteenth embodiment of the invention will be described with reference to FIGS. 31 and 32. The eighteenth embodiment differs from the sixteenth embodiment in that the laser radiating mechanism 420 is replaced with a cutting mechanism 460. As shown in FIG. 31, the movable unit 410 has, in the stage preceding the wheel cutter 430, a cutting mechanism 460 composed of a blade 461 that protrudes at a predetermined angle relative to the polarizer plate 302.

This liquid crystal panel fabricating apparatus 400 operates basically in the same manner as that of the sixteenth embodiment described above, but operates differently therefrom when removing portions of the polarizer plate 302. The difference is as follows. As the cutting mechanism 460 moves along the boundary between cells on the glass substrate 301, a portion of the polarizer plate 302 is shaved off by the blade 461 as if by a wood chisel, and a strip-shaped region 311 is exposed on the glass substrate 301. The waste strip 302a of the polarizer plate 302 shaved off is ejected along the blade 461.

With this liquid crystal panel fabricating apparatus 400, it is easy to form strip-shaped regions 311. In addition, the cutting mechanism 460 requires only a mechanical structure. This makes the control of the cutting depth and maintenance easy.

Now, examples of the shape of the cutting edge of the blade 461 will be described with reference to FIG. 32. With a blade having a C-shaped cross section as shown in FIG. 32(a), it is possible to shave the polarizer plate 302 with a constant width. This helps stabilize the width of the strip-shaped regions 311 exposed on the glass substrate 301. With a blade having a trapezoidal cross section as shown in FIG. 32(b), in addition to the same advantages as obtained with the blade having a C-shaped cross section described above, the cut surfaces of the polarizer plate 302 left on the glass substrate 301 are inclined. This makes the polarizer plate 302 less likely to exfoliate accidentally. Moreover, the friction drag exerted by the blade 461 on the waste strip 302a of the polarizer plate 302 shaved off is reduced. This permits smooth ejection of the waste strip 302a along the blade 461.

With a blade having a semicircular cross section as shown in FIG. 32(c), in addition to the same advantages as obtained with the blades described above, the friction drag exerted by the blade 461 on the waste strip 302a shaved off is further reduced, and the blade 461 itself can be produced easily. It should be noted, however, that the strip-shaped regions 311 are exposed with a smaller width. With a blade having a circular cross section as shown in FIG. 32(d), in addition to the same advantages as obtained with the blade having a semicircular cross section described above, it is possible, by additionally providing a rotation mechanism for rotating the cutting edge, to use the whole circumference of the cutting edge for cutting. This helps prolong the working life of the blade 461. In this case, however, it is also necessary to additionally provide a mechanism for ejecting the waste strip 302a.

Figure 33:
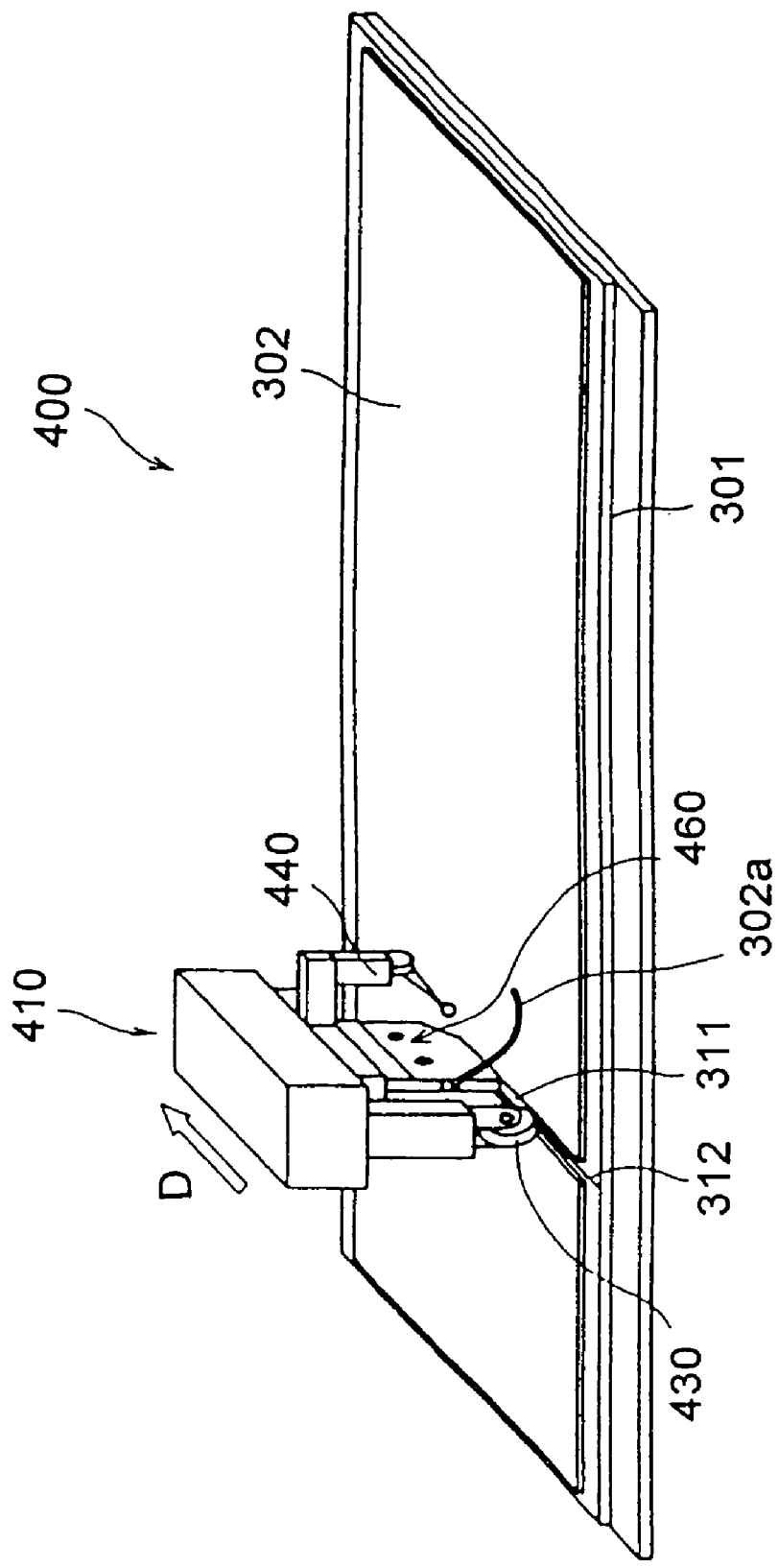
FIG. 33 is a perspective view schematically showing the appearance of the liquid crystal panel fabricating apparatus of a nineteenth embodiment of the invention.
Figure 34:
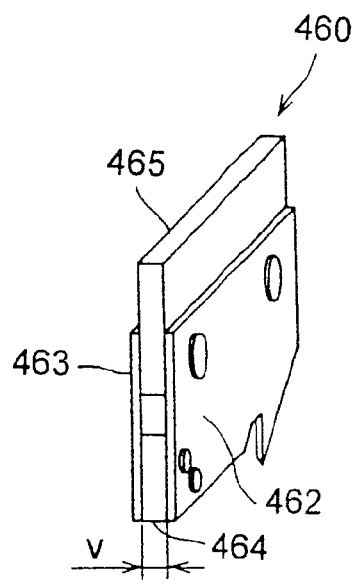
FIG. 34 is a perspective view schematically showing the appearance of the blade used in the liquid crystal panel fabricating apparatus of the nineteenth embodiment.
Figure 35:
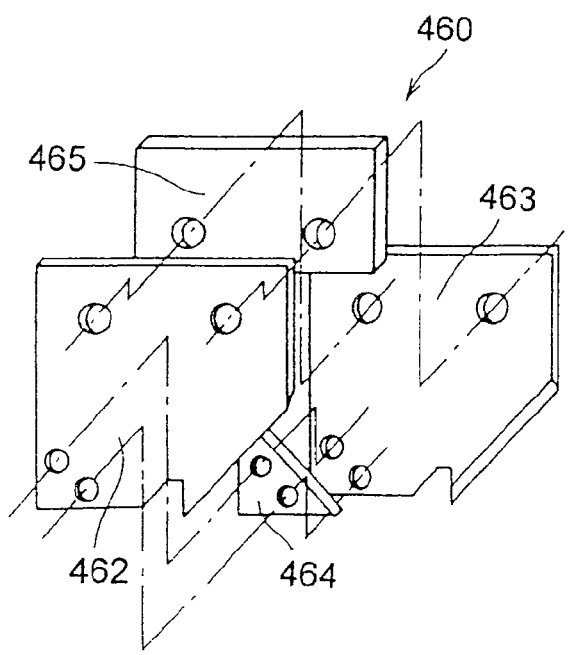
FIG. 35 is an exploded perspective view of the blade shown in FIG. 34.

Next, the liquid crystal panel fabricating apparatus of a nineteenth embodiment of the invention will be described with reference to FIGS. 33 to 36. The nineteenth embodiment differs from the eighteenth embodiment in that the cutting mechanism 460 has a modified construction. As shown in FIG. 33, the movable unit 410 has the cutting mechanism 460 in the stage preceding the wheel cutter 430, and, as shown in FIGS. 34 and 35, the cutting mechanism 460 has a pair of blades 462 and 463 arranged at a predetermined interval v so as to face each other and each having a cutting edge and a blade 464 arranged between those blades 462 and 463 at their bottom. The blade 464 has a width equal to the predetermined interval v, and thus serves to keep the blades 462 and 463 constantly at the interval v. Between the blades 462 and 463 at their top, a support member 465 is arranged that has, like the blade 464, a width equal to the predetermined interval v. The support member 465 is supported by the movable unit 410. These blades 462, 463, and 464 and the support member 465 are built into a single unit with screws or rivets for easy replacement.

Figure 36:
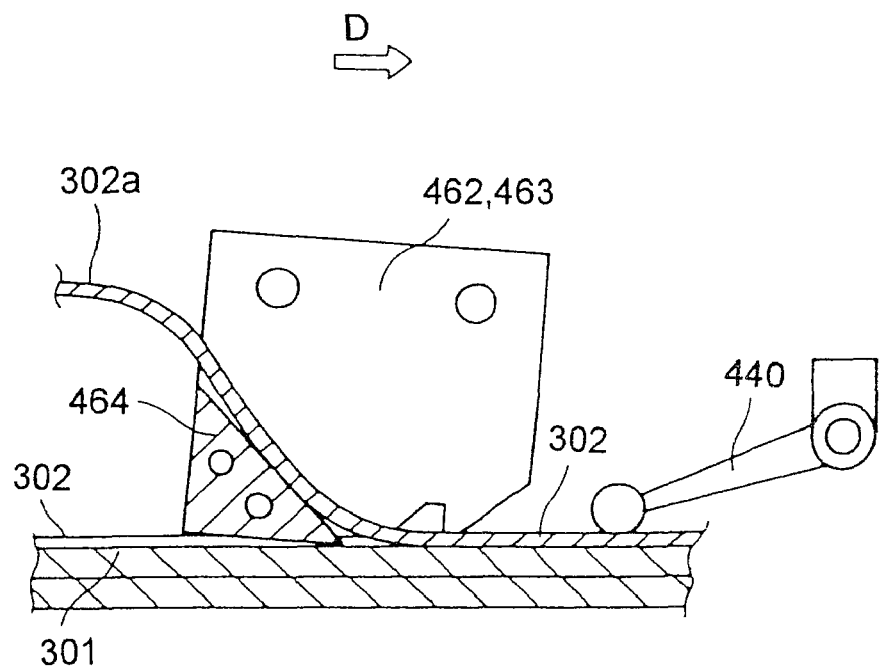
FIG. 36 is a sectional view illustrating the operation of the liquid crystal panel fabricating apparatus of the nineteenth embodiment.

The liquid crystal panel fabricating apparatus 400 structured as described above operates basically in the same manner as that of the eighteenth embodiment described above, but operates differently therefrom when removing portions of the polarizer plate 302. The difference is as follows. As shown in FIGS. 33 and 36, as the cutting mechanism 460 moves along a boundary between cells on the glass substrate 301 in the direction of the shorter sides thereof, first, the blades 462 and 463 cut apart a strip-shaped portion of the polarizer plate 302. Next, the strip-shaped portion of the polarizer plate 302, thus cut apart, is shaved off the glass substrate 301 by the blade 464, and is removed, as a waste strip 302a, along the blade 464. Simultaneously, a strip-shaped region on the glass substrate 301 is exposed.

With this cutting mechanism 460, the same advantages as achieved by the eighteenth embodiment described above are achieved. In addition, since the cutting mechanism 460 is composed of a plurality of blades, for example, the width of the strip-shaped region 311 on the glass substrate 301 can be changed simply by interchanging the blade 464. Moreover, when one or two of the blades have worn out, only those can be replaced individually. That is, varying widths of the strip-shaped region 311 can easily be coped with, and the running costs of the blades themselves are effectively reduced.

Figure 37:
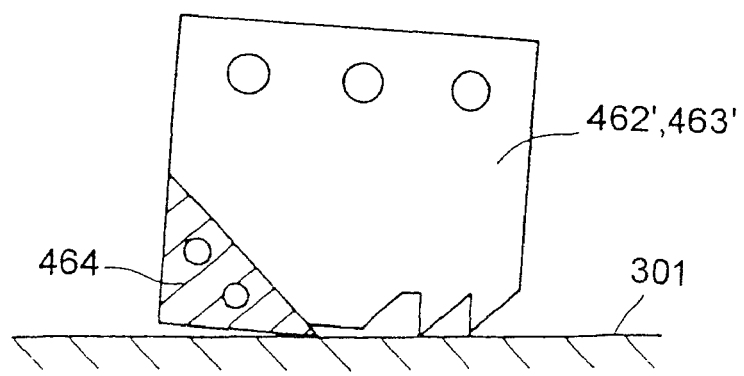
FIG. 37 is a sectional view showing the blade used in the liquid crystal panel fabricating apparatus of a twentieth embodiment of the invention.

Next, the liquid crystal panel fabricating apparatus of a twentieth embodiment of the invention will be described with reference to FIG. 37. The twentieth embodiment differs from the nineteenth embodiment in that the pair of blades 462 and 463 are given modified shapes so as to reduce the cutting resistance to the polarizer plate 302. When the blades 462 and 463 each have a single cutting edge as in the nineteenth embodiment, cutting a thick polarizer plate 302 with them inevitably results in a high cutting load imposed on their cutting edges. In other words, the cutting resistance to the polarizer plate 302 is high, and this invites the polarizer plate 302 to be deformed while being cut or causes delta-shaped chipping at the end of cutting. To overcome these problems, in this embodiment, as shown in FIG. 37, the blades 462' and 463' are each provided with a plurality of (in the figure, two) cutting edges having smaller and smaller cutting depths in the direction of cutting (in the figure, the direction indicated by an arrow D). This reduces the cutting load imposed on each cutting edge, and thus reduces the cutting resistance to the polarizer plate 302, making the above-described problems less likely.

Figure 38:
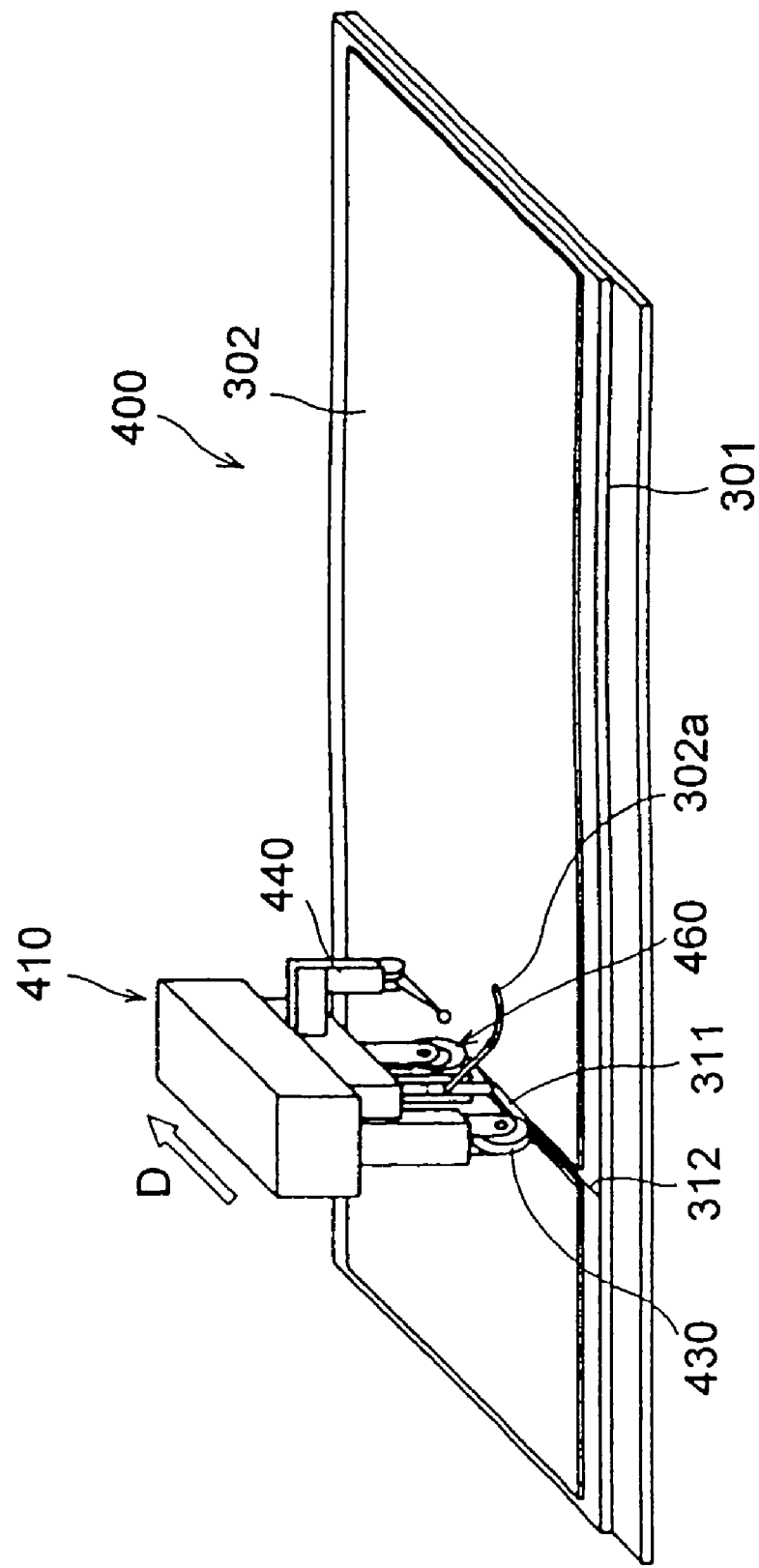
FIG. 38 is a perspective view schematically showing the appearance of the liquid crystal panel fabricating apparatus of a twenty-first embodiment of the invention.
Figure 39:
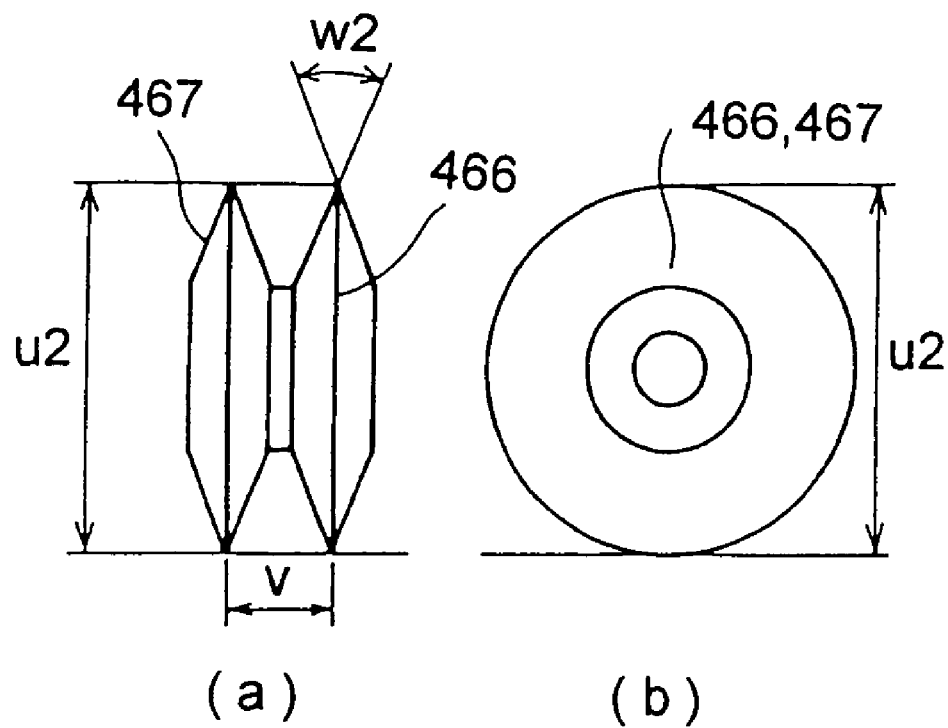
FIG. 39 is an external view showing the blade used in the liquid crystal panel fabricating apparatus of the twenty-first embodiment.

Next, the liquid crystal panel fabricating apparatus of a twenty-first embodiment of the invention will be described with reference to FIGS. 38 and 39. The twenty-first embodiment differs from the nineteenth embodiment in that the pair of blades 462 and 463 are replaced with wheel cutters. As shown in FIG. 38, the movable unit 410 has, in the stage preceding to the wheel cutter 430, a cutting mechanism 460, and, as shown in FIG. 39, this cutting mechanism 460 has a pair of wheel cutters 466 and 467 arranged coaxially at a predetermined interval v so as to face each other, instead of the pair of blades 462 and 463 shown in FIGS. 34 and 35. With this structure, it is possible to further reduce the cutting resistance to the polarizer plate 302. Here, the wheel cutters 466 and 467 are given an acute cutting edge angle w2 in the range of from 30 to 90° to secure a sufficient cutting depth while preventing the polarizer plate 302 left on the glass substrate 301 from exfoliating accidentally at a cut edge thereof. The wheel cutters 466 and 467 are given a diameter u2 in the range of from 5 to 10 mm to secure sufficient space for their rotation shaft, to secure sufficient peripheral speed for fast cutting, and secure sufficient mechanical strength in the wheel cutters 466 and 467 themselves.

Now, supplementary descriptions common to the eighteenth to twenty-first embodiments will be given. In a liquid crystal panel fabricating apparatus 400 according to the invention, strip-shaped portions of the polarizer plate 302 are shaved off and removed by a blade or wheel cutter. Meanwhile, if the blade or the like reaches the glass substrate 301, the cutting edge of the blade or the like may chip, or the surface of the glass substrate 301 may be scratched. Such a scratch, in particular, is undesirable because it causes the glass substrate 301 to break at an unexpected place and causes degradation in its quality. On the other hand, in reality, between the glass substrate 301 and the polarizer plate 302, there exits a very thin adhesive layer that bonds them together. Therefore, the cutting edge of the blade or the like is initially so set as to be located within the adhesive layer so as not to reach the glass substrate 301, and in addition, in the middle of cutting, it is monitored and controlled by a position sensor 440. Alternatively, it is also possible to use as the material of the blade a material that is harder than the polarizer plate 302 but softer than the glass substrate 301.

The strip-shaped regions 311 on the glass substrate 301 are given a width in the range of from 1 to 3 mm, preferably in the range of from 1 to 2.5 mm. This helps secure a sufficient effective area on the polarizer plate 302 in each individual liquid crystal panel, and permits cracks 312 for cutting apart to be formed easily without degradation in quality. Thus, the dimensions of the blade or the like need to be set accordingly. This can be achieved easily, in the nineteenth to twenty-first embodiments in particular, by setting the interval v between the pair of blades 462 and 463 or wheel cutters 466 and 467 in the range stated above.

Moreover, to permit the waste strips 302a of the polarizer plate 302 shaved off to be ejected smoothly without accumulating on the blade or the like, the blade or the like is coated with Teflon (R) or diamond to prevent the wastes 2a from adhering thereto. This prolongs the working life of the blade or the like.

A liquid crystal panel fabricating apparatus according to the invention may be structured in any other manner than specifically described above as embodiments, and many variations and modifications are possible within the scope of what is claimed as the invention. For example, the glass substrate 301 and the polarizer plate 302 are bonded together with any type of adhesive, examples including common acrylic- or silicone-based adhesives. In the nineteenth to twenty-first embodiments in particular, the polarizer plate 302 is shaved off by the blade 465, and therefore it is advisable to select a type of adhesive that can easily be shaved off while offering sufficiently strong adhesion to produce acceptable products. It is advisable to bond a protective laminate film on the surface of the polarizer plate 302, because then, by removing the protective laminate film when products are shipped, it is possible to remove molten particles and cullet (fine glass particles used when glass is cut) deposited on the surface. In the embodiments described above, the movable unit 410 moves relative to the bed; alternatively, the bed may be made movable together with the glass substrate 301 placed thereon.

Figure 40:
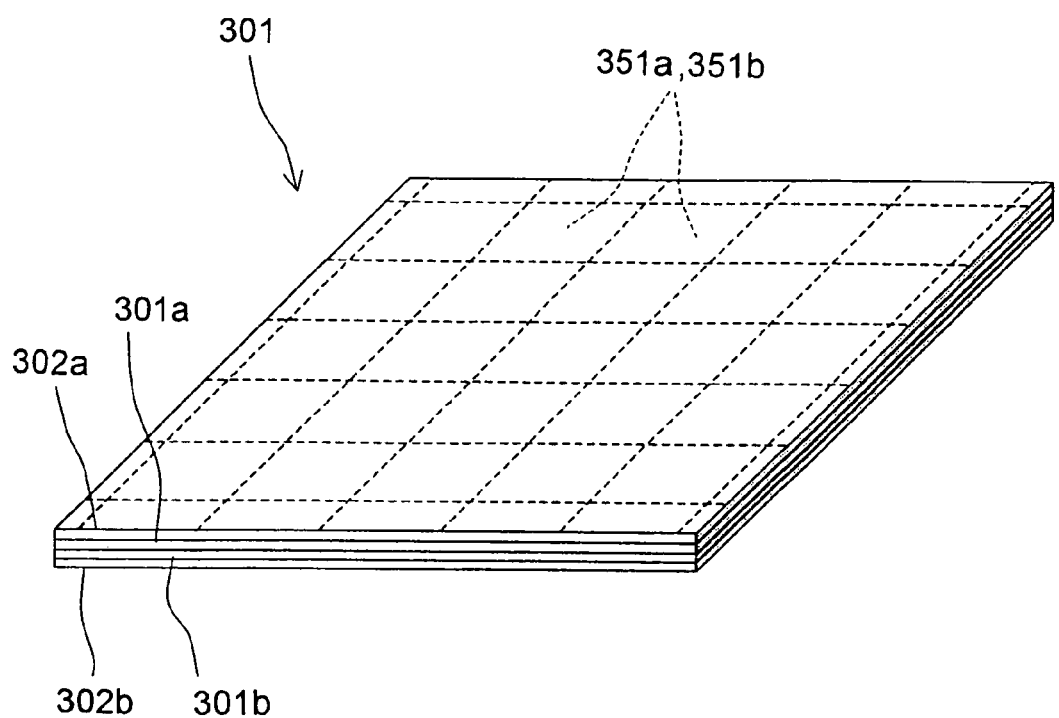
FIG. 40 is a perspective view showing the appearance of a glass substrate used as the material of a liquid crystal panel embodying the invention.
Figure 41:
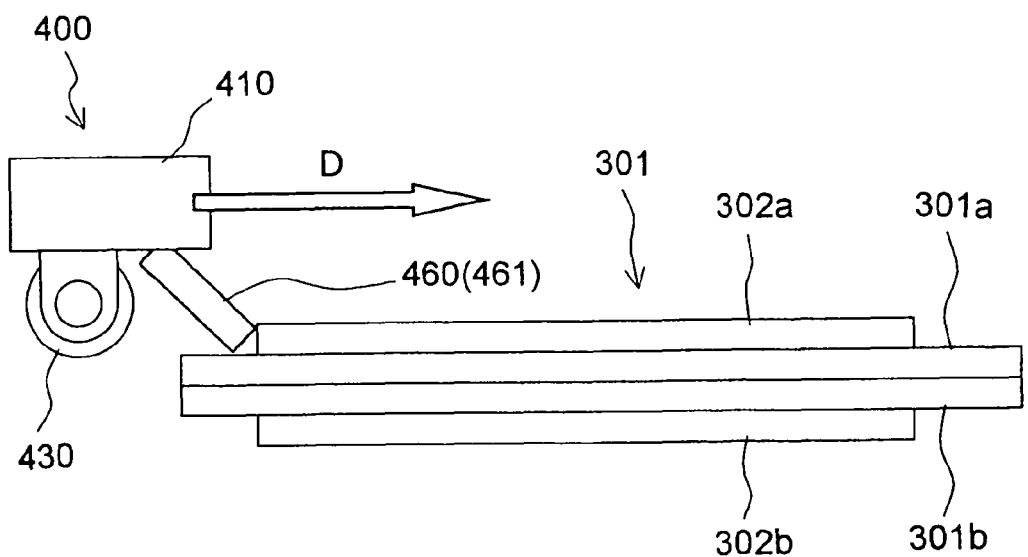
FIG. 41 is a side view schematically showing an example of a liquid crystal panel fabricating apparatus with respect to the glass substrate shown in FIG. 40.
Figure 42:
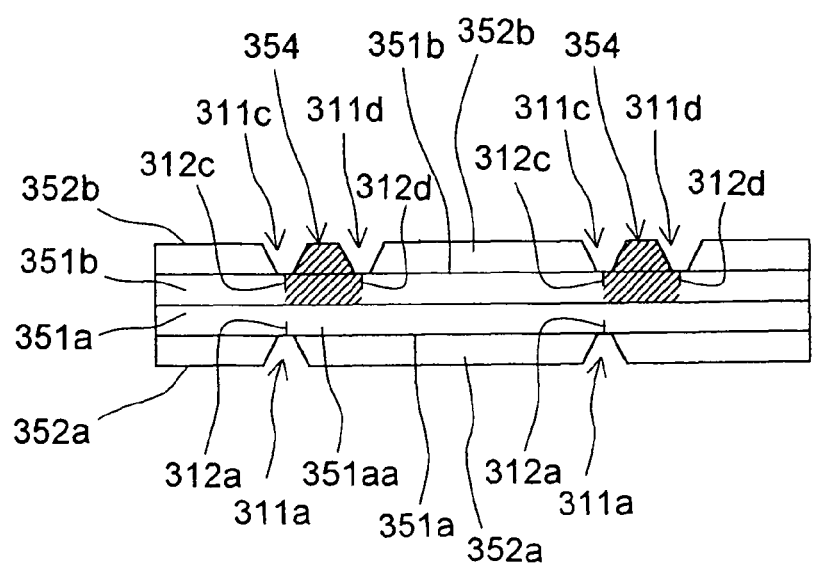
FIG. 42 is a vertical sectional view of the glass substrate after being treated by the liquid crystal panel fabricating apparatus shown in FIG. 41.
Figure 43:
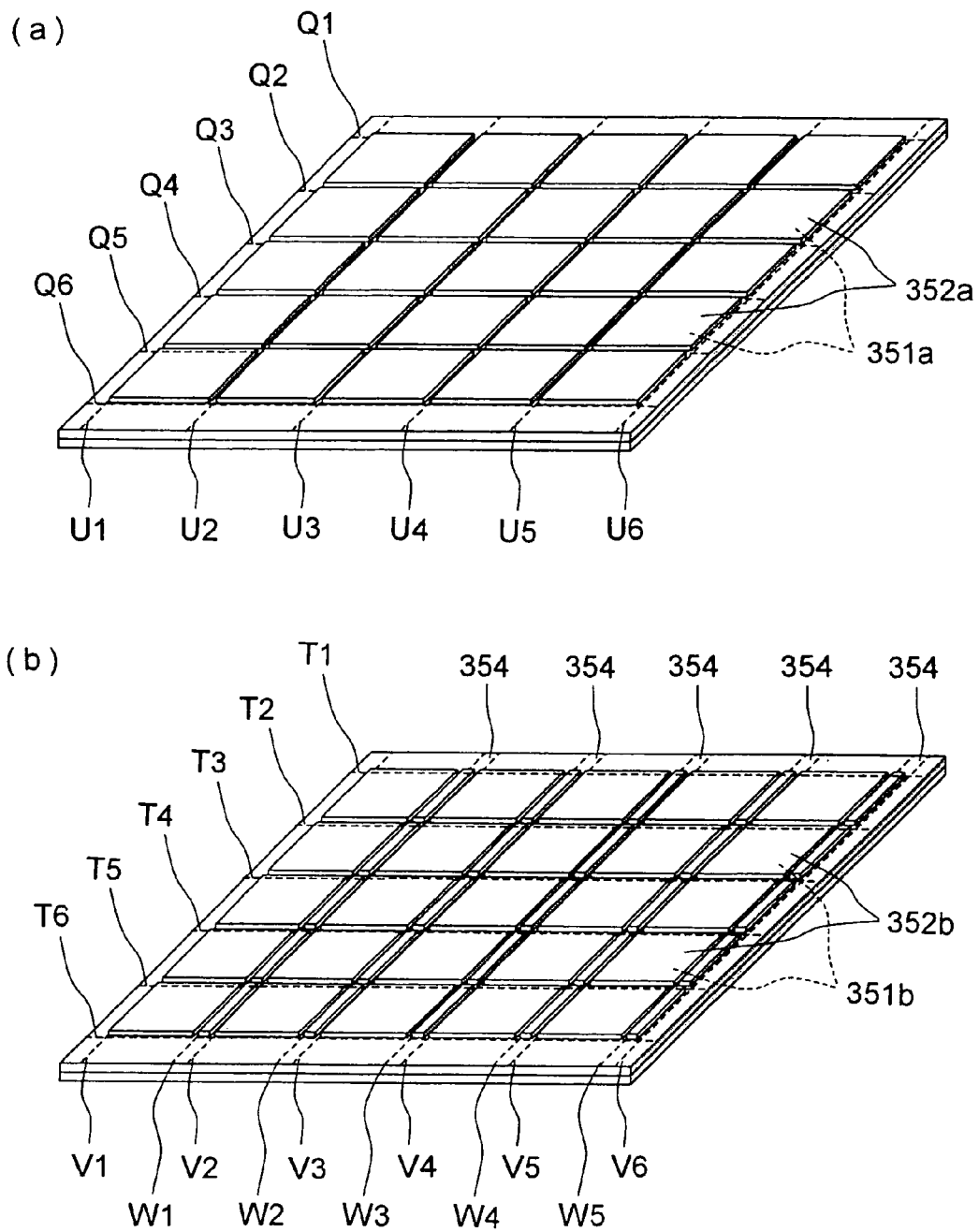
FIG. 43 is perspective view showing the appearance of the glass substrate after being treated by the liquid crystal panel fabricating apparatus shown in FIG. 41.

Next, how the liquid crystal panel 350 described earlier is fabricated by the use of a liquid crystal panel fabrication apparatus 400 as described above will be described in detail with reference to the drawings. FIG. 40 is a perspective view showing the appearance of a glass substrate of which the liquid crystal panel 350 is formed, FIG. 41 is a side view schematically showing the liquid crystal panel fabricating apparatus with respect to the glass substrate, and FIG. 42 is a vertical sectional view of the glass substrate after the operation of the liquid crystal panel fabricating apparatus. FIG. 43 is a perspective view showing the appearance of the glass substrate, with the TFT-side surface thereof shown at (a) and the cutting positions on the color-filter-side surface thereof shown at (b). Here, as representatives, the liquid crystal panel fabricating apparatus 400 of the eighteenth embodiment (see FIG. 31) is used, and, as the blade 461 of its cutting mechanism 460, a blade having a cutting edge with a trapezoidal cross section (see FIG. 32(b)) is used.

First, as the material of which the liquid crystal panel 350 is formed, a glass substrate 301 is prepared that is composed of a pair of a TFT substrate 301*a* and a color filter substrate 301*b* bonded together. This glass substrate 301 has a plurality of TFT substrate cells 351*a* and a plurality of color filter substrate cells 351*b* arranged adjacent to one another in a grid-like pattern. Between each pair of a TFT substrate cell 351*a* and a color filter substrate cell 351*b* is sealed liquid crystal. Moreover, to the outer surfaces of the TFT substrate 301*a* and the color filter substrate 301*b*, a TFT-side polarizer plate 302*a* and a color-filter-side polarizer plate 302*b* are respectively bonded so as to cover all the TFT substrate cells 351*a* (FIG. 40). The TFT-side polarizer plate 302*a* and the color-filter-side polarizer plate 302*b* have protective films laid on the outer surfaces thereof.

Next, the glass substrate 301 is placed on the bed of the liquid crystal panel fabricating apparatus 400, with the TFT substrate 301*a* up. Then, the movable unit 410 is moved in one direction (in the direction indicated by the arrow D in FIGS. 31 and 18) from one edge of the glass substrate 301 to another along one U1 of the mutually parallel boundaries U1, U2, . . . (see FIG. 43) between adjacent TFT substrate cells 351*a*. As a result, a portion of the TFT-side polarizer plate 302*a* is shaved off by the blade 461, and a strip-shaped region 311*a* (see FIG. 42) is exposed on the TFT substrate 301*a*. Subsequently, the wheel cutter 430 is moved along the strip-shaped region 311*a* to form a scribed line 312*a* (see FIG. 42).

Thereafter, the glass substrate 301 is moved translationally within a horizontal plane so that the above operation is repeated along the boundaries U2, U3, . . . successively. Next, the glass substrate 301 is rotated through 90° within a horizontal plane so that the above operation is repeated along the boundaries Q1, Q2, . . . (see FIG. 43) perpendicular to the boundaries U1, U2, . . . to form scribed lines 312*b* (see FIG. 43).

Next, the glass substrate 301 is turned upside down, and the above operation is repeated on the color filter substrate 301*b*. Here, however, the operation is performed differently from when performed on the TFT substrate 301*a*. Specifically, it is performed not only along the boundaries V1, V2, . . . (see FIG. 43) between the color filter substrate cells 351*b*, which are located right opposite to the above-mentioned boundaries U1, U2, . . . , but also along the boundaries W1, W2, . . . (see FIG. 43) running parallel to and at a predetermined distance from those boundaries V1, V2, . . . in order to form protruding portions 351*aa*. Thus, the movable unit 410 is moved in one direction (in the direction indicated by the arrow D in FIGS. 31 and 41) from one edge of the glass substrate 301 to another along the two kinds of boundaries alternately, in the order V1, W1, V2, W2, . . . .

As a result, portions of the color-filter-side polarizer plate 302*b* are shaved off by the blade 461, and strip-shaped regions 311*c* and 311*d* (see FIG. 42) are exposed alternately on the color filter substrate 301*b*. Subsequently, the wheel cutter 430 is moved along the strip-shaped regions 311*c* and 311*d* to form scribed lines 312*c* and 312*d* (see FIG. 42).

Thereafter, the glass substrate 301 is rotated through 90° within a horizontal plane so that the above operation is repeated along the boundaries T1, T2, . . . (see FIG. 43) between the color filter substrate cells 351*b*, which are located right opposite to the above-mentioned boundaries Q1, Q2, . . . , to form scribed lines 312*e* (see FIG. 43).

Then, as required, a load is applied to the glass substrate 301 to cut it apart along the scribed lines 312*a* to 312*e* into pairs of a TFT substrate cell 351*a* and a color filter substrate cell 351*b*. At this time, the portions 354 (hatched in FIG. 42) of the color filter substrate 301*b* (including the color-filter-side polarizer plate 302*b*) located between the scribed lines 312*d* and the scribed lines 312*d* are removed as unnecessary portions. This produces, in each pair, the protruding portion 351*aa* in the TFT substrate cell 351*a*. Lastly, a COG or FPC is connected to the connection terminals 353 formed on the inner surface of the protruding portion 351*aa* to produce the liquid crystal panel 350 as an end product (see FIG. 24).

In the liquid crystal panel 350 fabricated in this way, the TFT-side polarizer plate cell 352*a* is so bonded as to cover almost the entire outer surface of the TFT substrate cell 351*a* including the protruding portion 351*aa*, and the color-filter-side polarizer plate cell 352*b* is so bonded as to cover almost the entire outer surface of the color filter substrate cell 351*b*.

Moreover, the TFT-side polarizer plate cell 352*a* and the color-filter-side polarizer plate cell 352*b* are so cut as to have, at their edges 352*aa* and 352*ba*, inclined surfaces which reflect the rising angle of the side cutting edges of the blade 461. Moreover, the width with which the TFT substrate cell 351*a* and the color filter substrate cell 351*b* are exposed at the edges on their outer surfaces is equal to about half the width of the bottom cutting edge of the blade 461. Accordingly, by adjusting the shape and dimensions of the blade 461, it is possible to obtain a structure as described above that offers the desired mechanical strength of the liquid crystal panel and the desired resistance to exfoliation of the polarizer plates.

Needless to say, the liquid crystal panel fabricating apparatus 400 of any other embodiment than the eighteenth embodiment may be used to fabricate the liquid crystal panel 350 by the same procedure as described above.

Figure 44:
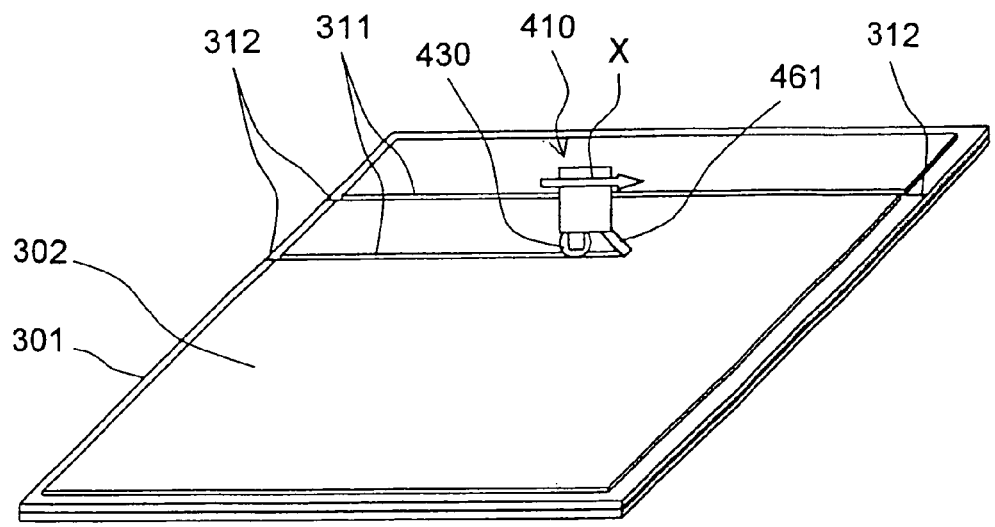
FIG. 44 is a perspective view showing the liquid crystal panel fabricating apparatus of the invention running in the X direction.
Figure 45:
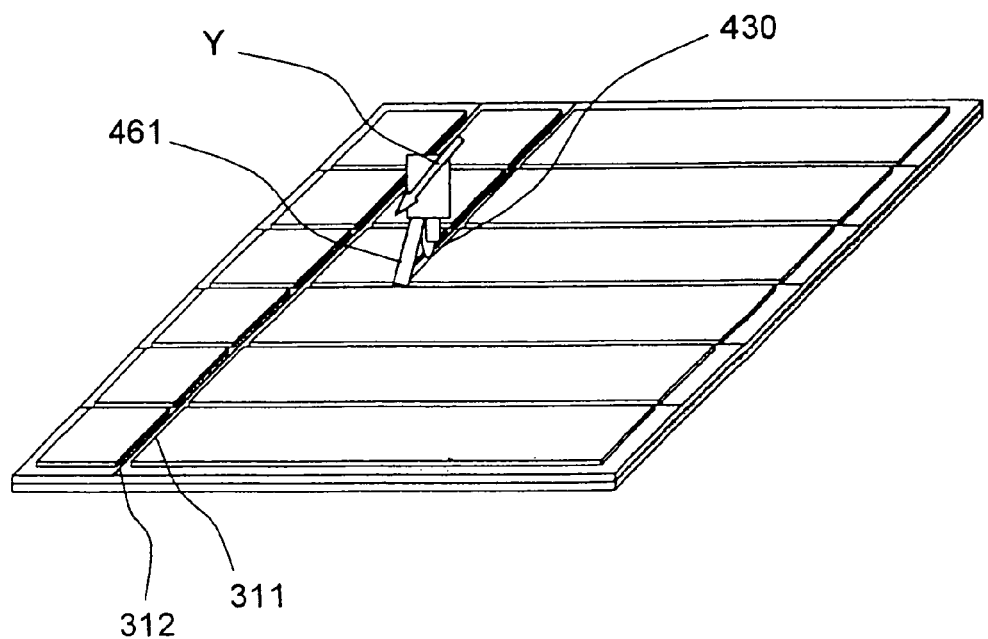
FIG. 45 is a perspective view showing the liquid crystal panel fabricating apparatus of the invention running in the Y direction.

Incidentally, when a large-format glass substrate is cut apart into individual liquid crystal panels in this way, the cutting operation described above needs to be performed in both of the lateral and longitudinal directions (X and Y directions). Depending on the order in which the glass substrate is sectioned, however, the following problem arises. Now, how this problem arises will be described with reference to FIGS. 44 to 48. First, as shown in FIG. 44, when a glass substrate 301 having a polarizer plate 302 bonded thereto is sectioned in the X direction, a movable unit 410 having a cutting mechanism 460, composed of, for example, a blade 461 to serve as a glass substrate exposing means, followed by a wheel cutter 430 is moved in the X direction to shave off and remove the polarizer plate 302 and simultaneously perform scribing. Then, at the same time that the polarizer plate 302 is shaved off to expose a strip-shaped region 311, a scribed line (a crack along which to cut apart) 312 is formed along the mid line on the strip-shaped region 311. Then, as shown in FIG. 45, the movable unit 410, having the blade 461 followed by the wheel cutter 430, is moved in the Y direction perpendicular to the X direction in the same manner as in the X direction to shave off and remove the polarizer plate 302 and simultaneously perform scribing. In this cutting method, the blade 461 is run in front of the wheel cutter 430. This makes it possible to cut apart a glass substrate having a polarizer plate bonded thereto in a period of time roughly equal to the time required by a step of simply cutting apart a glass sheet.

Figure 46:
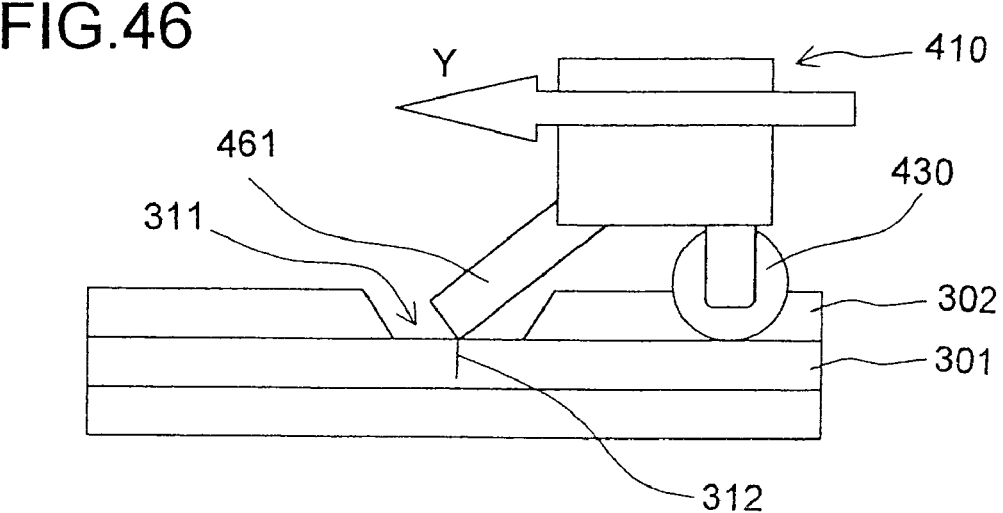
FIG. 46 is a vertical sectional view showing the liquid crystal panel fabricating apparatus of the invention running in the Y direction.
Figure 47:
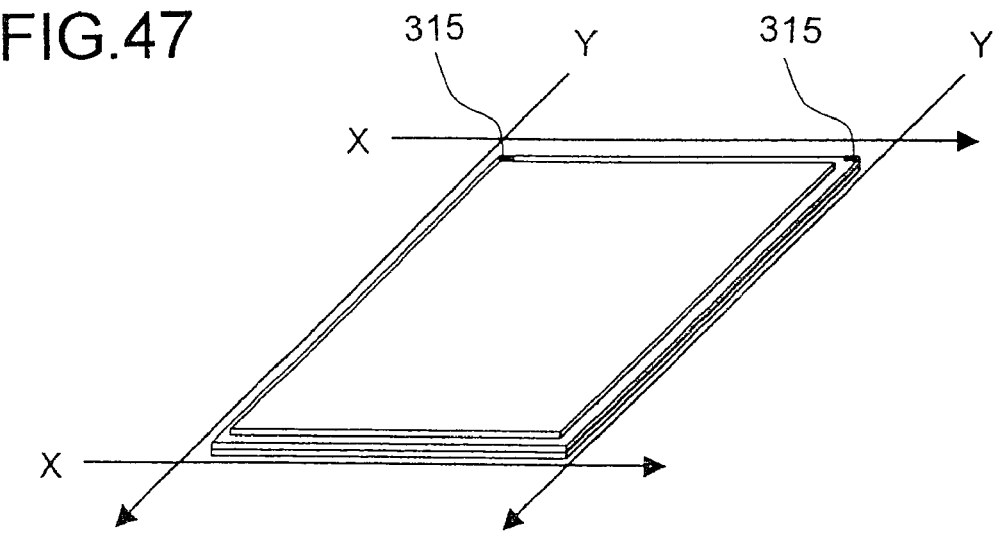
FIG. 47 is an external perspective view of a liquid crystal panel produced by the operation of the liquid crystal panel fabricating apparatus shown in FIGS. 44 to 46.
Figure 48:
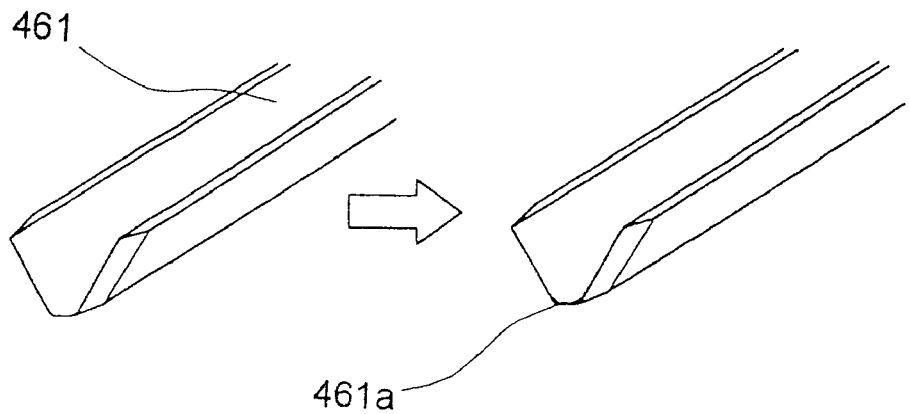
FIG. 48 is an external perspective view of the blade used in the operation of the liquid crystal panel fabricating apparatus shown in FIGS. 44 to 46.

However, as shown in FIG. 46, when the blade 461 is moved in the Y direction perpendicular to the scribed lines 312 formed previously in the X direction, the cutting edge of the blade 461, which is pressed against the strip-shaped region 311 on the glass substrate 301, collides perpendicularly with the shoulders of the cracks (scribed lines 312) formed by scribing. As a result, as shown in FIG. 47, the liquid crystal panel may chip at the corners, i.e. at the cross sections between the cutting lines, or, as shown in FIG. 5, the cutting edge of the blade 461 may chip 461a. This shortens the working life of the blade 461, thereby increasing the running costs, and also degrades the quality of the liquid crystal panel 350. Thus, when the polarizing plate 312 is shaved off and removed, it is advisable to run the blade 461 in such a way that it does not cross the scribed lines 312 formed previously.

Figure 49:
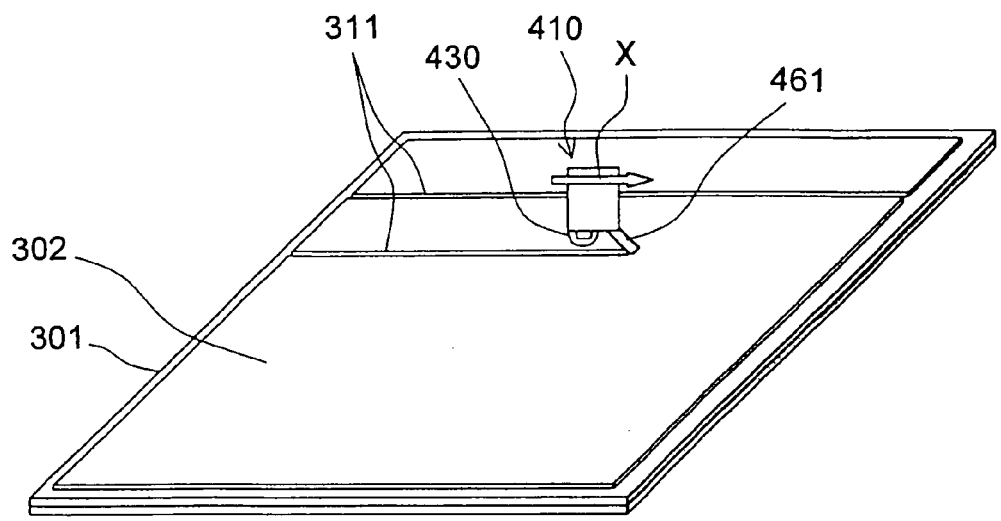
FIG. 49 is a perspective view showing the liquid crystal panel fabricating apparatus of the invention running in the X direction, as an example of the preferred operation thereof.

A cutting method that avoids this problem will be described below with reference to FIGS. 49 to 51. First, as shown in FIG. 49, the wheel cutter 430 for scribing is retracted, and the movable unit 410 is moved in the X direction with only the blade 461 pressed against the glass substrate 301. That is, when the movable unit 410 is moved in the X direction for the first time, the polarizer plate 302 is shaved and removed to form a strip-shaped region 311, but no scribed line 312 is formed in this strip-shaped region 311.

Figure 50:
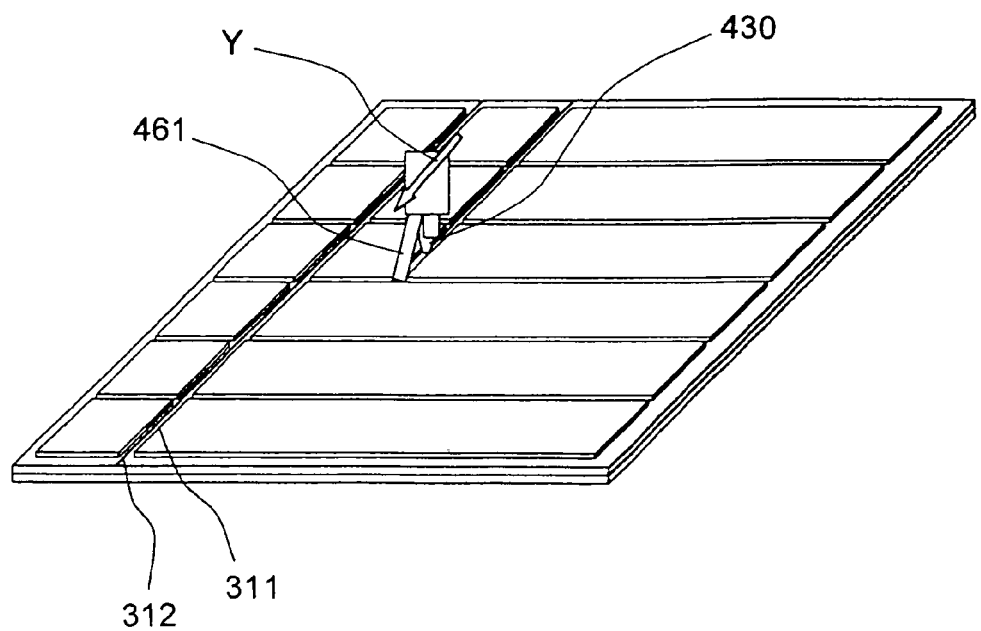
FIG. 50 is a perspective view showing the liquid crystal panel fabricating apparatus shown in FIG. 49 now running in the Y direction after running in the X direction.

Next, as shown in FIG. 50, the polarizer plate is shaved and simultaneously scribing is performed in the Y direction of the glass substrate 301 in the manner described earlier. That is, strip-shaped regions 311 and scribed lines 312 are formed. Here, there are no scribed lines where the polarizer plate 302 is going to be shaved, i.e., in the strip-shaped regions 311 formed when the movable unit 410 was moved in the X direction for the first time. Thus, the blade 461 can smoothly shave the glass substrate 301 without colliding with scribed lines 312.

Figure 51:
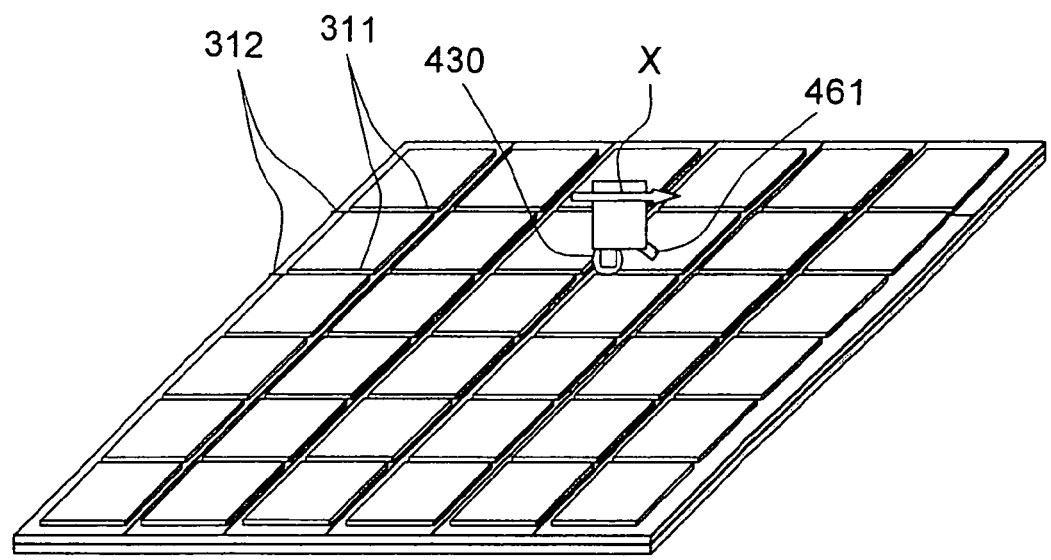
FIG. 51 is a perspective view showing the liquid crystal panel fabricating apparatus shown in FIG. 50 now running in the X direction for the second time after running in the Y direction.
Figure 52:
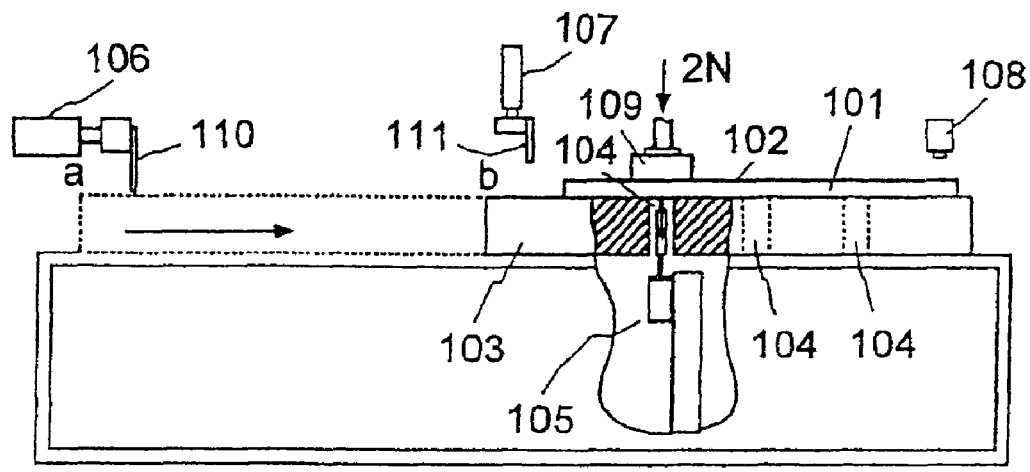
FIG. 52 is a front view showing an example of a conventional glass substrate cutting apparatus.
Figure 53:
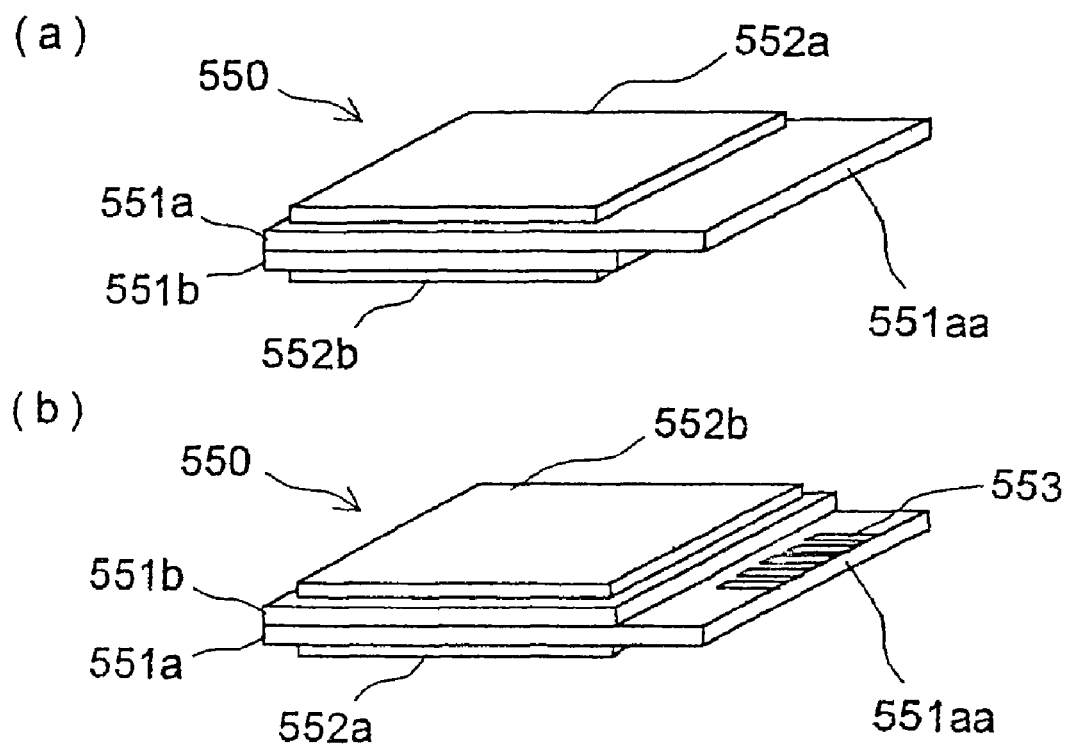
FIG. 53 is a perspective view showing the appearance of a conventional liquid crystal panel.

Lastly, as shown in FIG. 51, with the blade 461 retracted this time, only the wheel cutter 430 is run along the strip-shaped regions 311 formed when the movable unit 410 was moved in the X direction for the first time so that scribing is performed in the X direction of the glass substrate 301 to form scribed lines 312 to achieve cutting. In this way, by performing sectioning in the X direction, then in the Y direction, and then in the X direction in this order, through with increased operation time, it is possible to greatly prolong the working line of the blade and enhance the quality of the liquid crystal panel.

In a case where more time is allowed, it is also possible to shave the polarizer plate 302 in the X and Y directions first to form strip-shaped regions 311 in both directions and then perform scribing. Alternatively, it is also possible to separately build an apparatus dedicated to the shaving and removal of the polarizer plate and another dedicated to scribing so that the two processes are performed separately.

INDUSTRIAL APPLICABILITY

Methods and apparatuses for cutting apart a glass substrate, liquid crystal panels, and apparatuses for fabricating a liquid crystal panel according to the present invention are useful in technical fields related to liquid crystal display devices.

The invention claimed is:
1. A liquid crystal panel composed of a pair of substrate cells bonded together with liquid crystal sealed in between and with polarizer plates bonded to outer surfaces of the substrate cells,
   wherein at least one end of one of the substrate cells protrudes from at least one end of the other of the substrate cells so as to form a protruding portion, the polarizer plates comprising a first polarizer plate bonded to the outer surface of the substrate cell that forms the protruding portion and a second polarizer plate bonded to the outer surface of the other of the substrate cells,
   connection terminals by way of which the liquid crystal panel is driven are formed on an inner surface of the protruding portion, and the first polarizer plate, bonded to the outer surface of the substrate cell that forms the protruding portion, so extends as to cover almost all of the entire areas of an outer surface of the protruding portion, and
   wherein edges of the polarizer plates are so formed as to have a vertical section that becomes thinner and thinner in a direction away from a center portion of the polarizer plates, and
   wherein the edges are inclined at an angle larger than 90° but not larger than 135° relative to the outer surfaces of the substrate cells.
2. The liquid crystal panel according to claim 1,
   wherein edges of the polarizer plates are located 1 mm or less inward from edges of the substrate cells.
3. The liquid crystal panel according to claim 1,
   wherein removable protective films are laid on outer surfaces of the polarizer plates so as to be integral therewith.

* * * * *